(12) United States Patent
Hutzel et al.

(10) Patent No.: US 7,293,888 B2
(45) Date of Patent: Nov. 13, 2007

(54) REARVIEW MIRROR ASSEMBLY WITH UTILITY FUNCTIONS

(75) Inventors: Barry W Hutzel, Holland, MI (US); Niall R Lynam, Holland, MI (US); Darryl P DeWind, Holland, MI (US); John O'Lindahl, Fruitport, MI (US)

(73) Assignee: Donnelly Corporation, Holland, MI (US)

( * ) Notice: Subject to any disclaimer, the term of this patent is extended or adjusted under 35 U.S.C. 154(b) by 99 days.

(21) Appl. No.: 11/145,253

(22) Filed: Jun. 3, 2005

(65) Prior Publication Data

US 2006/0002123 A1 Jan. 5, 2006

Related U.S. Application Data

(60) Division of application No. 10/307,929, filed on Dec. 2, 2002, now Pat. No. 6,902,284, which is a division of application No. 09/585,379, filed on Jun. 1, 2000, now abandoned, which is a continuation-in-part of application No. 09/449,121, filed on Nov. 24, 1999, now Pat. No. 6,428,172.

(51) Int. Cl.
*G02B 7/182* (2006.01)
*B60R 1/04* (2006.01)

(52) U.S. Cl. ........................ 359/871; 359/838

(58) Field of Classification Search ............... 359/838, 359/871, 872
See application file for complete search history.

(56) References Cited

U.S. PATENT DOCUMENTS

| | | | | |
|---|---|---|---|---|
| 1,479,428 A | * | 1/1924 | Coon | 116/50 |
| 1,518,232 A | * | 12/1924 | Teitz | 116/53 |
| 1,909,362 A | | 5/1933 | Keith | |
| 1,969,415 A | | 2/1934 | Ostroff | 45/97 |
| 2,140,069 A | | 12/1938 | Bostwick | 88/89 |
| 2,149,598 A | * | 3/1939 | Girl et al. | 362/144 |
| 2,573,127 A | * | 10/1951 | Von Bredow | 74/503 |
| 2,609,578 A | | 9/1952 | Andary | |
| 2,649,028 A | | 8/1953 | Lenta | 88/87 |
| 2,802,394 A | | 8/1957 | Krone | 88/86 |
| 3,099,797 A | | 7/1963 | Piccinini | 325/312 |
| 3,131,251 A | | 4/1964 | Ryan | |
| 3,228,640 A | | 1/1966 | Wolsh | |
| 3,377,880 A | * | 4/1968 | Carter, Jr. | 74/491 |
| 3,494,689 A | | 2/1970 | McGlincky | |
| 3,543,018 A | | 11/1970 | Barcus et al. | 240/4.2 |
| 3,588,233 A | | 6/1971 | Lambert | |
| 3,667,833 A | | 6/1972 | Baldwin, Sr. | |

(Continued)

FOREIGN PATENT DOCUMENTS

DE 941408 4/1956

(Continued)

*Primary Examiner*—Ricky D. Shafer
(74) *Attorney, Agent, or Firm*—Van Dyke, Gardner, Linn & Burkhart, LLP

(57) ABSTRACT

An interior rearview mirror assembly for a vehicle includes a housing having a mirror casing and a support for mounting said mirror casing to a vehicle. The rearview mirror assembly further includes a retractable cord for use by an occupant of the vehicle for coupling to an accessory and which is adapted to couple the accessory to a vehicle system via the housing to provide a link between the accessory and the vehicle system.

27 Claims, 29 Drawing Sheets

U.S. PATENT DOCUMENTS

| | | | |
|---|---|---|---|
| 3,827,152 A | 8/1974 | Dailey | |
| 3,926,470 A | 12/1975 | Marcus | |
| 3,983,602 A | 10/1976 | Barry | |
| 4,000,404 A | 12/1976 | Marcus | |
| 4,019,812 A | 4/1977 | Carnine | 350/304 |
| 4,068,930 A | 1/1978 | Marcus | |
| 4,247,850 A | 1/1981 | Marcus | 340/694 |
| 4,254,931 A | 3/1981 | Aikens et al. | |
| 4,267,430 A * | 5/1981 | Downey | 219/222 |
| 4,394,065 A | 7/1983 | Swanson | |
| 4,435,042 A | 3/1984 | Wood et al. | |
| 4,436,371 A | 3/1984 | Wood et al. | 350/281 |
| 4,443,057 A | 4/1984 | Bauer et al. | 350/281 |
| 4,443,831 A | 4/1984 | Godfrey et al. | |
| 4,447,808 A | 5/1984 | Marcus | 340/696 |
| 4,486,075 A | 12/1984 | Cohen | |
| 4,518,192 A | 5/1985 | Canadas et al. | |
| 4,524,941 A | 6/1985 | Wood et al. | 248/544 |
| 4,593,878 A | 6/1986 | Stewart | |
| 4,624,499 A | 11/1986 | Flowerday | 296/97 |
| 4,646,210 A | 2/1987 | Skogler et al. | 362/142 |
| D289,989 S | 5/1987 | Skogler et al. | D12/188 |
| 4,695,138 A | 9/1987 | Epstein | |
| 4,702,572 A | 10/1987 | Cossey | |
| 4,733,336 A | 3/1988 | Skogler et al. | 362/142 |
| 4,768,870 A | 9/1988 | Chen | 350/631 |
| 4,781,436 A | 11/1988 | Armbruster | 350/281 |
| D299,491 S | 1/1989 | Masuda | D12/188 |
| 4,807,096 A | 2/1989 | Skogler et al. | 362/142 |
| D304,920 S | 12/1989 | Schifrin | D12/188 |
| 4,902,118 A | 2/1990 | Harris | |
| 4,917,130 A * | 4/1990 | Sweder | 132/288 |
| 4,917,485 A | 4/1990 | Baldwin, Sr. | |
| 4,974,129 A | 11/1990 | Grieb et al. | |
| 5,059,015 A | 10/1991 | Tran | 359/844 |
| D325,554 S | 4/1992 | Min-Jenn | |
| 5,110,078 A | 5/1992 | Gary | |
| 5,151,828 A | 9/1992 | Sugimura | |
| 5,165,081 A | 11/1992 | Drumheller | |
| 5,178,448 A | 1/1993 | Adams et al. | 362/83.1 |
| 5,195,668 A | 3/1993 | Kunes et al. | |
| 5,285,060 A | 2/1994 | Larson et al. | 250/214 |
| 5,321,556 A | 6/1994 | Joe | |
| D351,370 S | 10/1994 | Lawlor et al. | D12/187 |
| 5,391,104 A * | 2/1995 | George | 446/177 |
| 5,432,496 A | 7/1995 | Lin | |
| 5,479,155 A | 12/1995 | Zeinstra et al. | 340/825.22 |
| 5,490,708 A | 2/1996 | Lee | |
| 5,530,240 A | 6/1996 | Larson et al. | 250/214 |
| 5,566,224 A | 10/1996 | ul Azam et al. | 379/58 |
| 5,572,354 A | 11/1996 | Desmond et al. | 359/265 |
| 5,576,687 A | 11/1996 | Blank et al. | 340/438 |
| 5,615,857 A | 4/1997 | Hook | 248/549 |
| 5,649,756 A | 7/1997 | Adams et al. | 362/83.1 |
| 5,669,698 A | 9/1997 | Veldman et al. | 362/83.1 |
| 5,671,996 A | 9/1997 | Bos et al. | 362/83.1 |
| 5,673,994 A | 10/1997 | Fant, Jr. et al. | 362/831 |
| 5,691,848 A | 11/1997 | Van Lente et al. | |
| 5,708,410 A | 1/1998 | Blank et al. | 340/438 |
| D390,524 S | 2/1998 | DeLine et al. | D12/187 |
| 5,719,714 A | 2/1998 | Ackeret | |
| 5,748,395 A | 5/1998 | Rendi, Jr. | 359/841 |
| 5,762,246 A | 6/1998 | Drew | |
| 5,812,321 A | 9/1998 | Schierbeek et al. | 359/601 |
| 5,813,745 A | 9/1998 | Fant, Jr. et al. | 362/83.1 |
| 5,820,245 A | 10/1998 | Desmond et al. | 362/83.1 |
| D400,481 S | 11/1998 | Stephens et al. | D12/187 |
| D402,950 S | 12/1998 | Fitzpatrick | |
| 5,878,353 A | 3/1999 | ul Azam et al. | 455/550 |
| 5,938,321 A | 8/1999 | Bos et al. | 362/494 |
| 5,940,503 A | 8/1999 | Palett et al. | 379/454 |
| 5,946,149 A | 8/1999 | Hoffman | 359/854 |
| 6,000,823 A | 12/1999 | Desmond | 362/494 |
| 6,026,162 A | 2/2000 | Palett et al. | 379/454 |
| 6,039,107 A * | 3/2000 | Pittard | 160/370.22 |
| 6,042,253 A | 3/2000 | Fant, Jr. et al. | 362/494 |
| 6,124,886 A | 9/2000 | DeLine et al. | 348/148 |
| 6,170,956 B1 | 1/2001 | Rumsey et al. | |
| 6,183,119 B1 | 2/2001 | Desmond et al. | 362/494 |
| 6,264,339 B1 * | 7/2001 | von Glasow | 359/872 |
| 6,428,172 B1 | 8/2002 | Hutzel et al. | |
| 6,746,140 B2 * | 6/2004 | Ichikawa et al. | 362/494 |
| 6,811,288 B2 * | 11/2004 | Hutzel | 362/494 |
| 6,902,284 B2 * | 6/2005 | Hutzel et al. | 359/865 |

FOREIGN PATENT DOCUMENTS

| | | |
|---|---|---|
| DE | 2332885 | 1/1975 |
| DE | 3605704 A1 | 8/1987 |
| DE | 3614882 A1 | 11/1987 |
| DE | 295 07 372 U1 | 8/1995 |
| EP | 0381016 A1 | 8/1990 |
| EP | 0 890 479 A1 | 1/1999 |
| FR | 1021987 | 2/1953 |
| FR | 1571768 | 6/1969 |
| GB | 2004418 A | 3/1979 |
| GB | 2192370 A | 1/1988 |
| GB | 2210836 A | 6/1989 |
| GB | 2297632 A | 8/1996 |
| GB | 2332185 | 6/1999 |
| JP | 58180347 | 10/1983 |
| JP | 3231044 | 10/1991 |
| JP | 09039660 | 10/1997 |
| WO | WO 8202448 | 7/1982 |

* cited by examiner

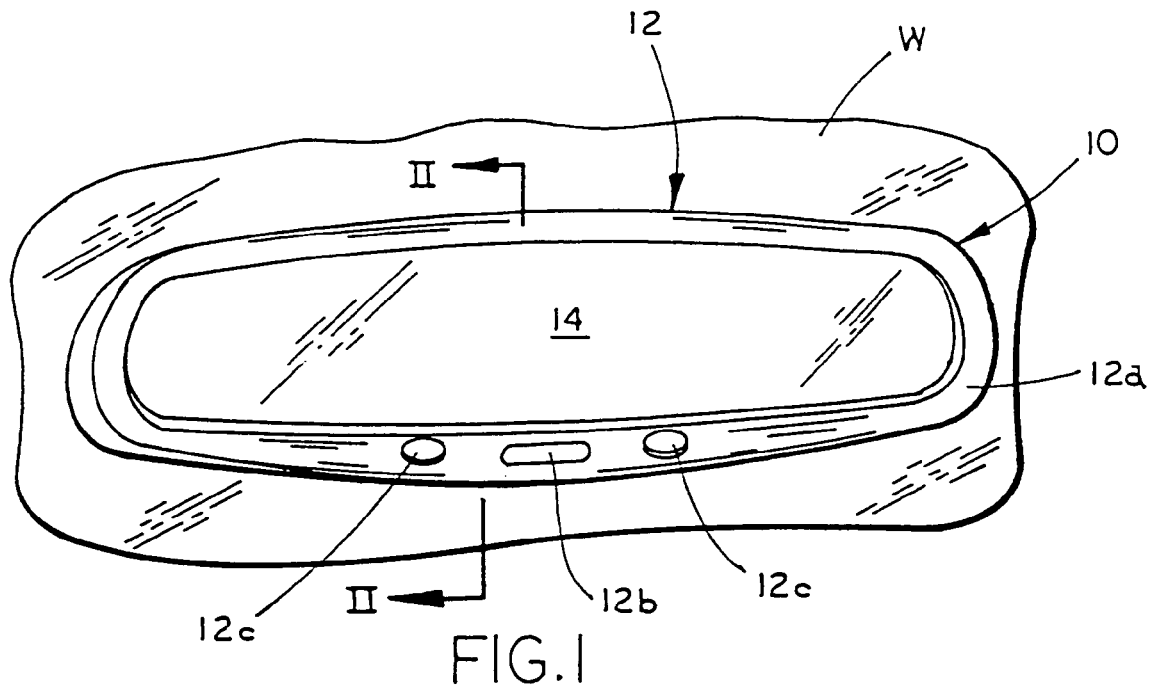
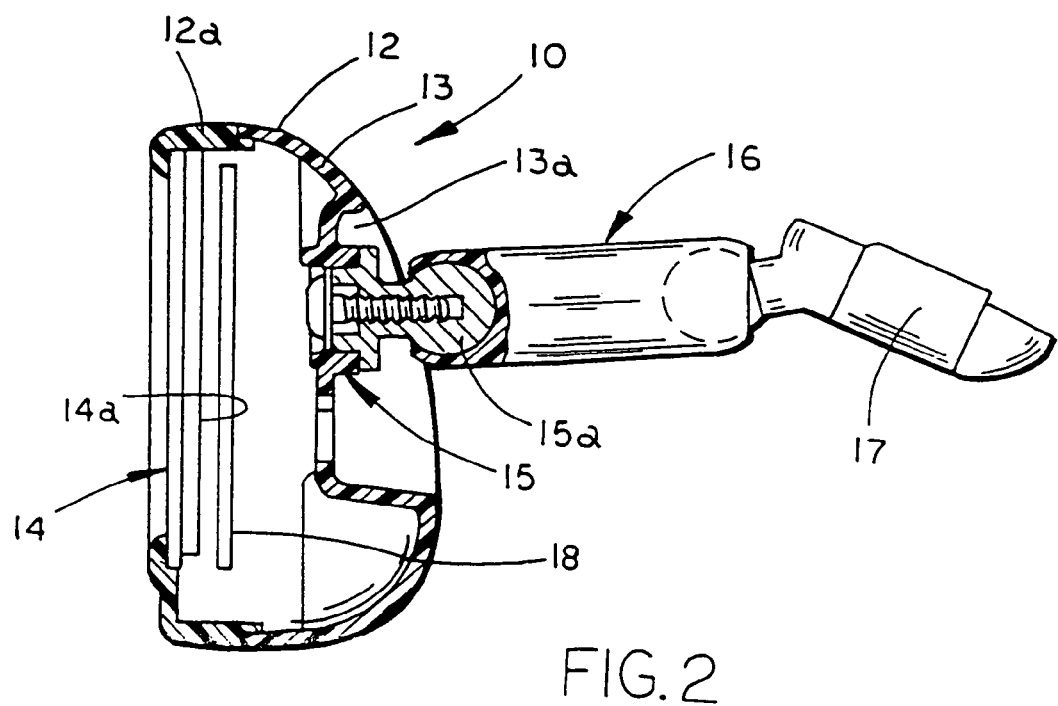

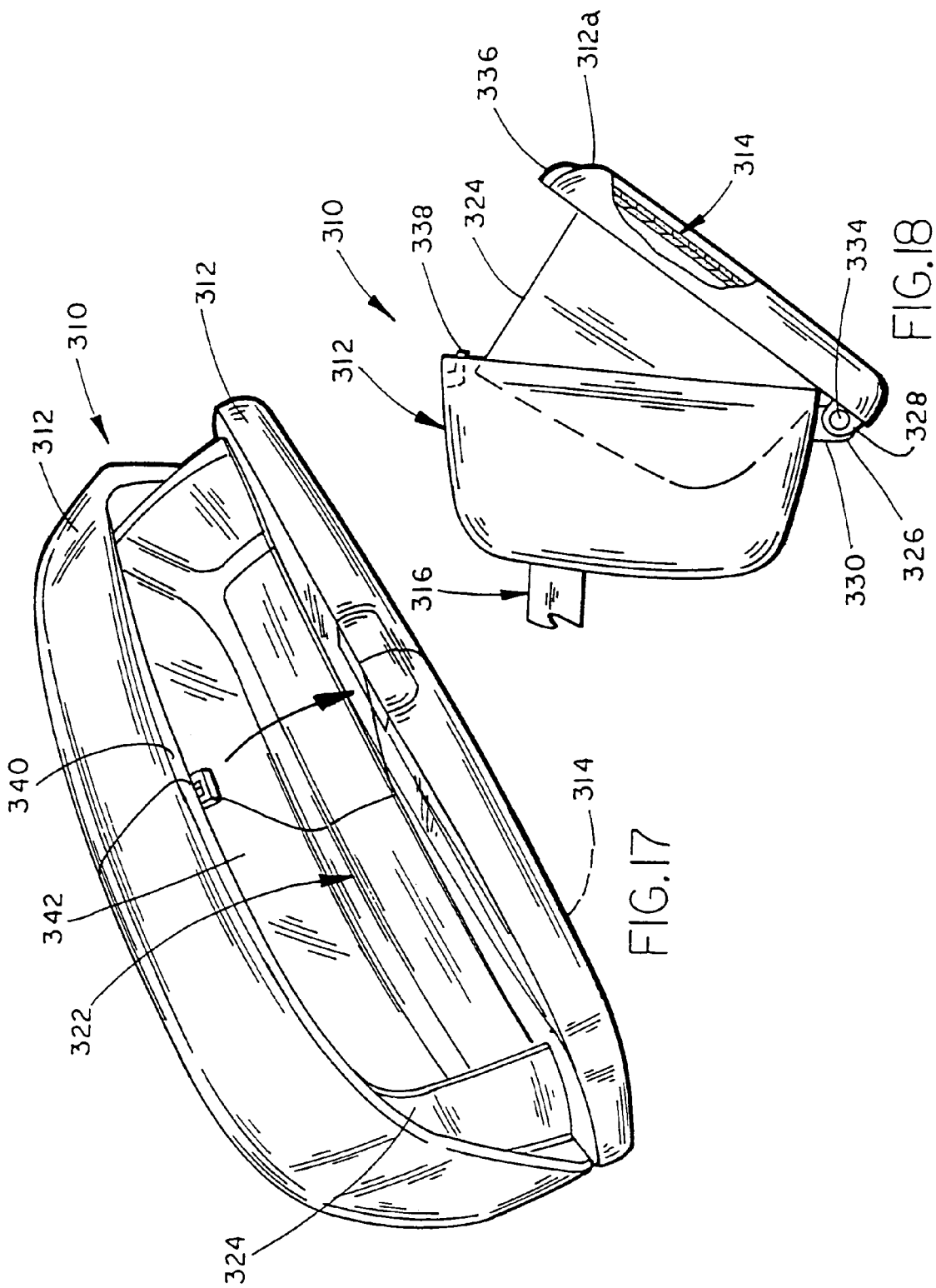

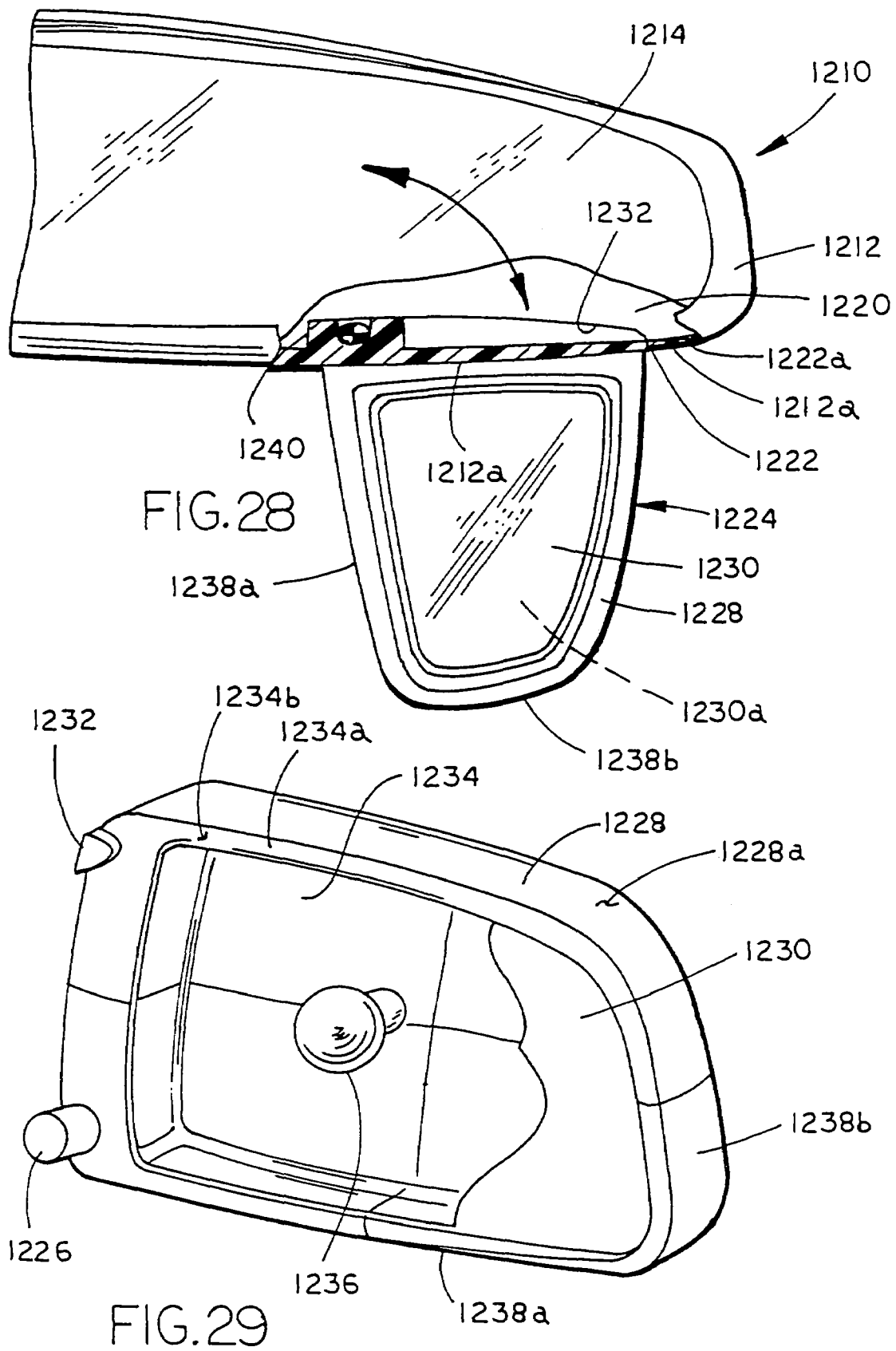

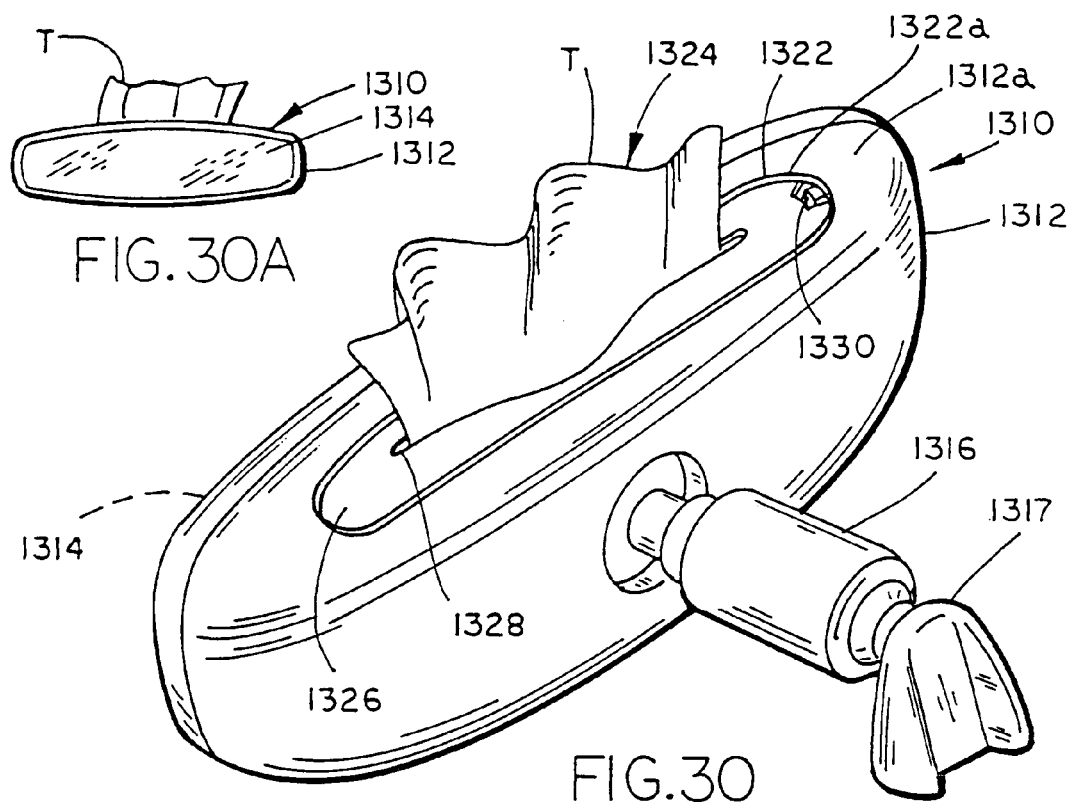
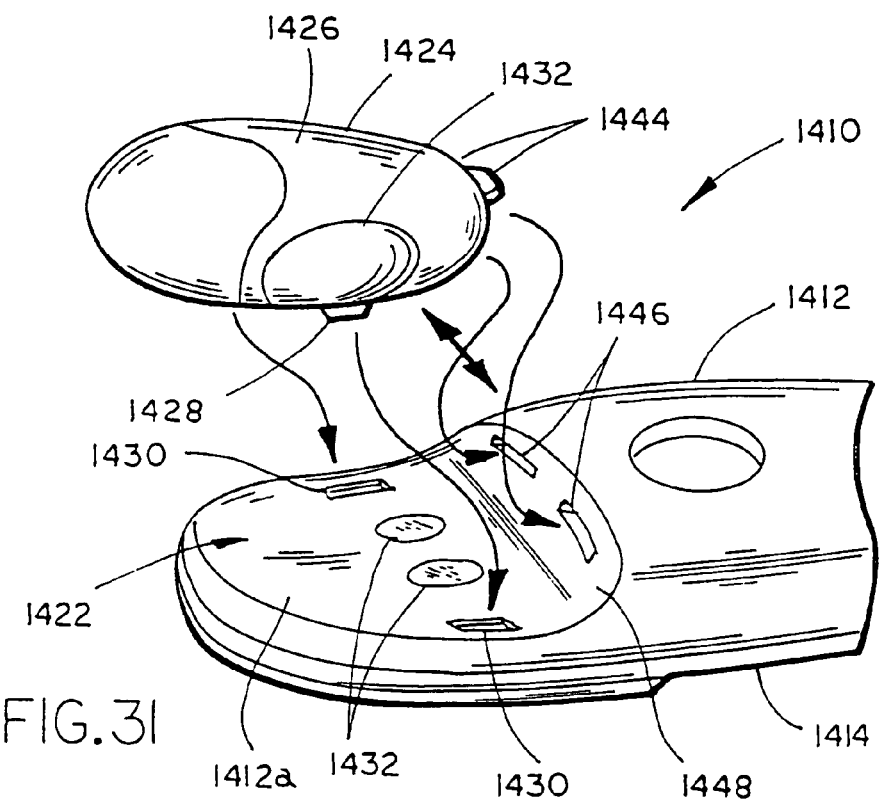

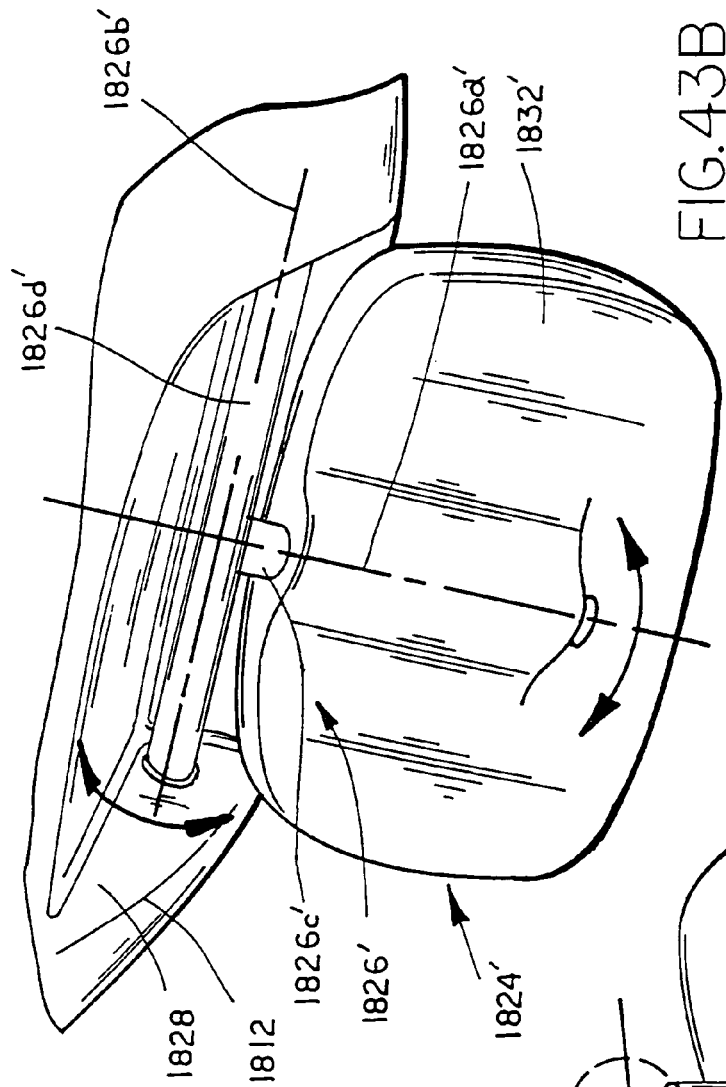
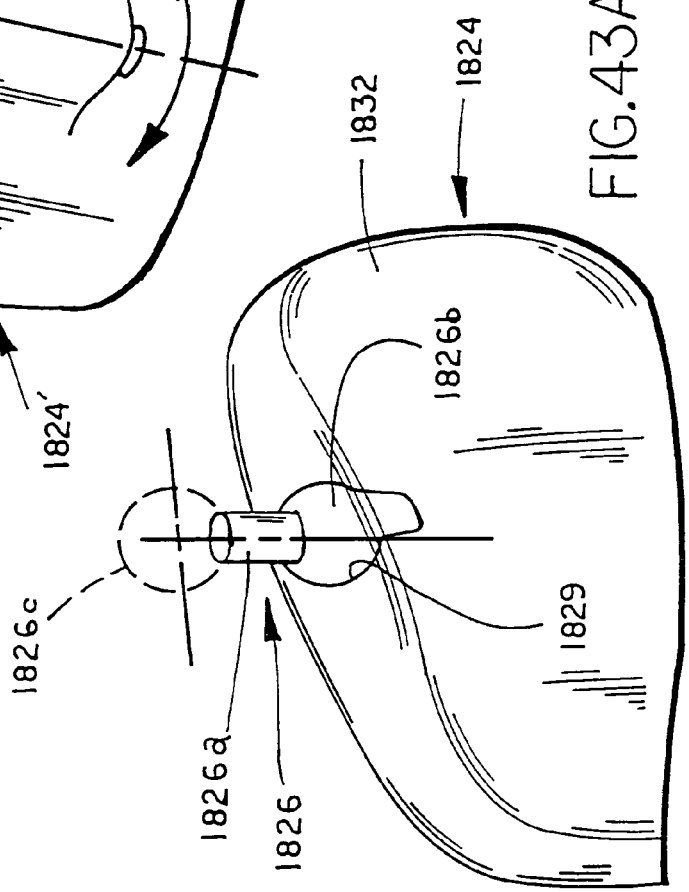
FIG. 43B
FIG. 43A

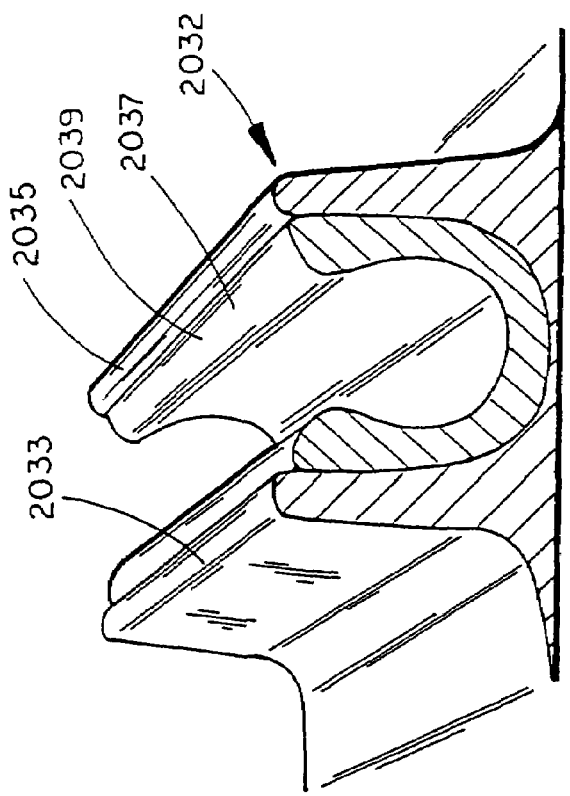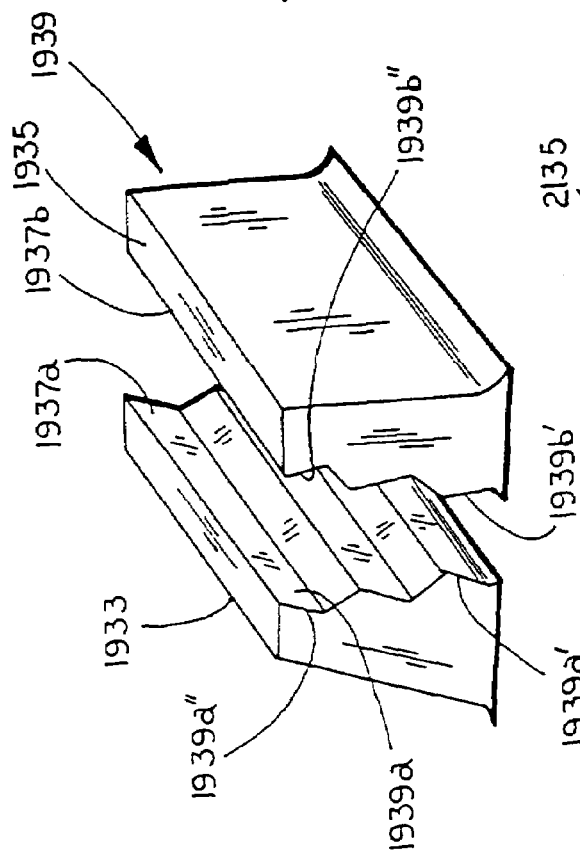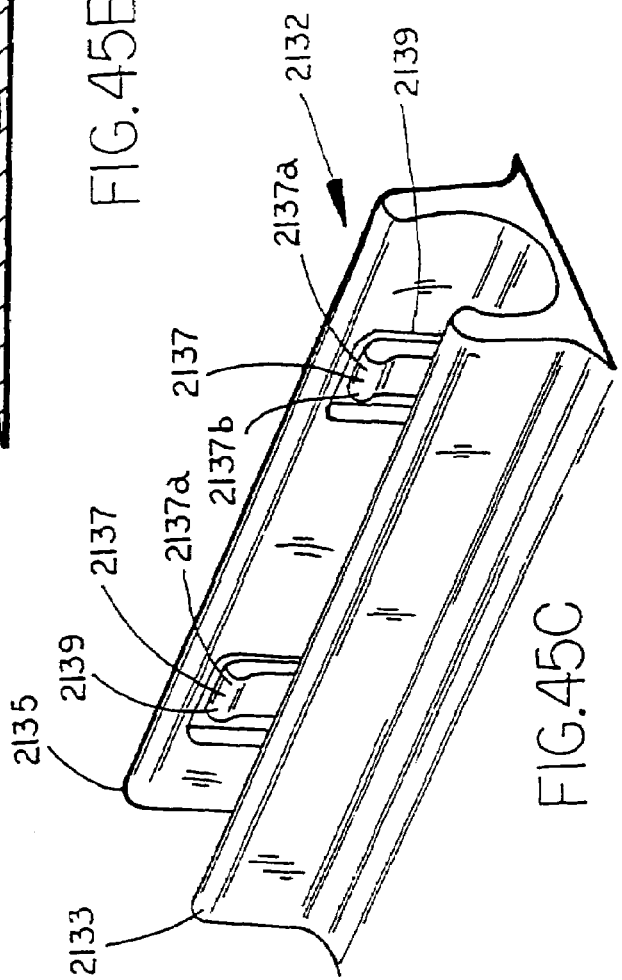

REARVIEW MIRROR ASSEMBLY WITH UTILITY FUNCTIONS

This application is a divisional application of application Ser. No. 10/307,929, filed Dec. 2, 2002 now U.S. Pat. No. 6,902,284, by Barry W. Hutzel, Niall R. Lynam, Darryl P. DeWind, and John O'Lindahl, entitled AN INTERIOR REARVIEW MIRROR SYSTEM INCLUDING A PENDENT ACCESSORY, which is a divisional application Ser. No. 09/585,379, filed on Jun. 1, 2000, by Barry W. Hutzel, Niall R. Lynam, Darryl P. DeWind, and John O'Lindahl, entitled REARVIEW MIRROR ASSEMBLY WITH UTILITY FUNCTIONS, now abandoned, which is a continuation-in-part application of U.S. patent application Ser. No. 09/449,121, filed Nov. 24, 1999, now U.S. Pat. No. 6,428,172, which are herein incorporated by reference in their entireties.

TECHNICAL FIELD AND BACKGROUND OF THE INVENTION

The present invention relates to a rearview assembly and, more specifically, to an interior rearview mirror assembly for use in vehicles incorporating utility functions, such as storage space for holding or housing various accessories.

Until recently, rearview mirror assemblies have been used primarily for rear vision. More recently, electronic, electric and various additional functional features have been added to the rearview mirror assembly, for example map reading lights, reflective elements with displays, controls for actuating garage doors, or the like, which have consumed much of the available space in the interior rearview mirror assembly.

However, with the advent of electro-optic mirrors, such as electrochromic mirrors, a new generation of rearview mirrors has afforded the possibility of a slim reflector package. Since a day/night actuator mechanism is no longer needed in such mirrors, the size of the reflective element assembly is defined by the thickness of the electrochromic mirror element and by its associated electronics thereby increasing the amount of available space in the interior rearview mirror assembly.

In addition, today drivers and occupants of the vehicle engage in more and more non-driving activities, such as telephone conversations, note taking, remote transactions, and the like. As a result, many of these activities take the driver's attention away from the front of the vehicle because the activity involves the driver looking to locations in the vehicle remote from the windshield, typically, for example on the dashboard of the vehicle. While note pad holders have been devised to attach to the windshield, by suction cups or the like, these holders often hamper or obstruct the view through the windshield and may come loose or detach. As a result, the driver of the vehicle may have an obstructed view.

Also, when exiting the vehicle or when driving conditions change a driver or vehicle occupant often removes eyeglasses or sunglasses. After removing the eyeglasses or sunglasses, the driver or occupant typically seeks a storage place where the glasses may be left and readily retrieved for later use. Again, when the driver engages in such activities while driving, these activities often draw the driver's eyes away from the front of the vehicle thus distracting the driver.

Over time, the location of interior rearview mirror assemblies have not significantly changed. As a result, interior rearview mirror assemblies are mounted in a location in the vehicle that is a known entity. Furthermore, since interior rearview mirror assemblies are typically centrally located within the vehicle, they are a great location for mounting various accessories. From an automaker's point of view, the interior rearview mirror assembly is an ideal location because it does not require the driver of the vehicle to relearn its location and, furthermore, it does not consume the automaker's space for basic vehicle systems and functions.

Consequently, there is a need to optimize the available space in a vehicle for storing and locating objects and accessories, such as sunglasses, flashlights, map holders, writing surfaces, pen holders and the like, and, furthermore, to provide accessories in a location that is easy to reach but which does not cause the driver of the vehicle to redirect his or her eyes far from the front of the vehicle, thus minimizing or eliminating the driver's distraction. In addition, it is desirable that the space which is used to store or locate these objects and accessories does not obstruct the driver's view or consume the automaker's space for basic vehicle systems and functions.

SUMMARY OF THE INVENTION

The present invention provides an interior rearview mirror assembly, which includes one or more storage spaces for storing, locating or holding objects and/or accessories all in a manner that provides quick and easy access to the objects or accessories without displacing other components or consuming valuable automaker space, such as in the dashboard of the vehicle.

In one form of the invention, an interior rearview mirror assembly for a vehicle includes a casing, which includes a reflective element, and a storage space provided at the casing. The mirror assembly further includes a dockable accessory, which is insertable into and retrievable from the storage space whereby the dockable accessory can be docked in the storage space and yet is accessible to an occupant of the vehicle so that the occupant can remove the dockable accessory from the storage space and use the dockable accessory independently of the rearview mirror assembly.

In one aspect, the storage space is provided in the casing. In further aspects, the dockable accessory comprises a light assembly. The light assembly includes a light assembly housing and at least one light source, which is positioned in the housing. The light source is actuatable when the light assembly is removed from the storage space so that the light assembly can be used independently from the interior rearview mirror assembly, for example, as a flashlight. The light assembly optionally includes a switch, which provides actuation of the light source when the light assembly is removed from the mirror casing.

In other aspects, the casing includes an opening, which is in communication with the storage space. The light source is preferably actuatable when the light assembly is docked in the storage space whereby the light assembly is adapted to project light though the opening to provide a light source when the dockable accessory is docked in the storage space so that the light assembly may be used as a mirror assembly light, such as a map illumination light. In further aspects, the casing includes a reflector, which is positioned in the storage space for directing light from the light assembly through the opening when the light assembly is in the storage space and the light source is actuated to provide a light pattern. Preferably, the casing includes a switch for actuating the light source of the light assembly when the light assembly is docked in the casing. Optionally, the casing includes a cover over the opening, for example an optical lens for projecting light from the light assembly in a light pattern.

In yet further aspects, the light assembly includes a light assembly housing having a transparent portion, at least one light source for directing light through the transparent portion, and a light assembly voltage supply. The light source is electrically coupled to the light assembly voltage supply by a first drive circuit. Optionally, the casing of the interior rearview mirror assembly includes a second drive circuit having a casing switch. The second drive circuit is adapted to couple to a vehicle-based power supply and is adapted to recharge the voltage supply of the light assembly. Preferably, the second drive circuit is adapted to electrically decouple from the light source whereby the light assembly is actuated by the light assembly voltage supply independently of the vehicle-based power supply.

According to another aspect, the first drive circuit includes a light assembly switch for actuating the light source when the light assembly is retrieved from the storage space so that the light assembly may be used as, for example, a flashlight independently from the interior rearview mirror assembly. Preferably, the second drive circuit is adapted to override the switch logic of the first drive circuit and actuate the light source in the light assembly in accordance with a second switch logic of the second drive circuit when the light assembly is docked or positioned in the storage space. For example, when the light assembly is removed from the rearview mirror assembly, the light assembly's drive circuit switch will determine whether the light source is on or off. However, when the light assembly is docked in the interior rearview mirror assembly, the mirror assembly drive circuit switch will determine whether the light source is on or off rather than the light assembly drive circuit switch. So if the light source in the light assembly is on when it is returned for storage to the mirror casing and the mirror casing switch is in the off-position, the light source will turn off once it is docked in the mirror case. Similarly, if the light source in the light assembly is off and the mirror casing switch is in the on-position, the light source will turn on when the light assembly is docked in the mirror casing.

In yet other aspects, the light source comprises a solid state light source. Preferably, the light assembly includes a plurality of solid state light sources, such as a plurality of light emitting diodes, including at least one white light emitting diode and, preferably, a plurality of white light emitting diodes. Preferably, the light emitting diodes are connected in series.

In still further aspects, the voltage supply preferably comprises one of a battery and a capacitor, and, more preferably, a battery, and, most preferably, a rechargeable battery. In which case, the interior rearview mirror assembly preferably includes a recharge drive circuit adapted to recharge the rechargeable battery preferably when the light assembly is docked in the storage space.

According to another form of the invention, an interior rearview mirror assembly includes a casing having a reflective element. The casing includes a storage space, which provides storage capacity for holding at least one workpiece for storing the workpiece in a location accessible by an occupant of the vehicle whereby the workpiece can be inserted into or removed from the storage space for use by an occupant of the vehicle. The storage space includes a variable engagement element for engaging the workpiece so that the storage space can hold a plurality of workpieces having varying dimensions.

In one form, the storage space includes a resilient member, which provides the variable engagement element. For example, the resilient member may comprise an elastomeric member, which compresses when a workpiece is inserted in the storage space thereby applying a spring-like force to the workpiece to hold the workpiece.

In other aspects, the resilient member comprises at least one flexible finger, which deflects and applies a spring-like force to the workpiece to hold the workpiece when the workpiece is inserted into the storage space.

In yet other aspects, the storage space includes a pair of spaced apart members for frictionally holding the workpiece therebetween, thereby providing the variable engagement element. For example, at least one of the spaced apart members may include a stepped surface defining a plurality of engagement surfaces for holding one of a plurality of workpieces having a range of dimensions.

In one preferred aspect, the casing includes a bezel portion, which includes the storage space, for example the storage space may be molded with the bezel portion.

In another form of the invention, an interior rearview mirror assembly for a vehicle includes a casing, a reflective element located in the casing, and a casing support. The casing support includes a mounting bracket for mounting the casing to a vehicle. The casing or the support includes a storage space for holding at least one accessory therein, which is movable to and from the storage space by an occupant of the vehicle for use of the accessory.

In one aspect, the accessory comprises a pendent accessory. For example, the pendent accessory may include an element, such as a reflective element or a display element. Preferably, the pendent accessory further includes an accessory housing, which supports the element.

In further aspects, the accessory housing is supported from the casing by a pendent support. The accessory housing is preferably pivotally mounted to the pendent support to permit repositioning of the element about at least a vertical axis for viewing by an occupant of the vehicle.

In yet other aspects, the pendent accessory is pivotal from a viewing position to a stored position in the storage space. Preferably, the casing includes a recessed portion, which defines the storage space. For example, the recessed portion may be positioned at a bottom wall of the casing. Preferably, the pendent accessory includes an accessory housing, which has an outer surface that generally follows the contour of the casing when the pendent accessory is moved to the storage space to minimize the distraction to the driver.

According to yet another form of the invention, an interior rearview mirror assembly for a vehicle includes a housing having a mirror casing, which includes a reflective element, and a support for mounting the mirror casing to a vehicle. The housing further includes a retractable cord, for coupling an accessory, such as a phone, a computer, a fax machine, or the like, to a vehicle system to provide a link between the accessory and the vehicle system.

In further aspects, the retractable cord includes a coupler for coupling to the accessory. In another aspect, the retractable cable includes at least one electrical wire and/or at least one fiber-optic cable. Preferably, the cable comprises a universal serial bus cable.

Advantages provided by the present invention include a high mounted storage location which is easily accessible to an occupant of the vehicle and which stores a plurality of accessories, which can form a part of the interior mirror assembly or can provide a separate function or both. In addition, by incorporating the storage space into an interior rearview mirror assembly the distraction caused by retrieval from or placement into the storage space is minimized as the effort or action to retrieve or store is equivalent to the action of adjusting the position of the rearview. Further, the location of the storage space is not readily discernible from the outside of the vehicle enhancing the security of the vehicle.

These and other objects, advantages, purposes, and features of the invention will become more apparent from the study of the following description taken in conjunction with the drawings.

BRIEF DESCRIPTION OF THE DRAWINGS

FIG. 1 is a front perspective view of the rearview mirror assembly for a vehicle of the present invention showing an interior rearview mirror assembly in a viewing position in a front windshield of a vehicle;

FIG. 2 is a sectional end view of the assembly of FIG. 1 taken along line II-II of FIG. 1;

FIG. 17 is a top perspective view of a fourth embodiment of the mirror assembly of FIG. 1 illustrating a storage space within the mirror assembly housing;

FIG. 18 is a cross-sectional view taken along line XVIII-XVIII of FIG. 17;

FIG. 28 is a partial front view of a third embodiment of the interior rearview mirror assembly illustrated in FIGS. 1-8 illustrating a pivotally mounted pendent accessory;

FIG. 29 is an enlarged perspective view of the pendent accessory housing of FIG. 28;

FIG. 30 is another embodiment of the rearview mirror assembly illustrated in FIGS. 15, 15A, and 16;

FIG. 30A is a forward elevation view of the mirror assembly of FIG. 30;

FIG. 31 is a partial rear exploded perspective view of a second embodiment of the mirror assembly of FIGS. 9-14;

FIG. 43A is a perspective view of the pendent accessory of FIGS. 41 and 42 illustrating a pivot support for the accessory;

FIG. 43B is a similar view to FIG. 43A illustrating a second embodiment of a pendent accessory;

FIG. 45A is an enlarged view of the workpiece holder of FIG. 44;

FIG. 45B is a similar view to FIG. 45A of a second embodiment of the workpiece holder;

FIG. 45C is a similar view to FIG. 45A of a third embodiment of the workpiece holder.

DESCRIPTION OF THE PREFERRED EMBODIMENTS

Figure 3:
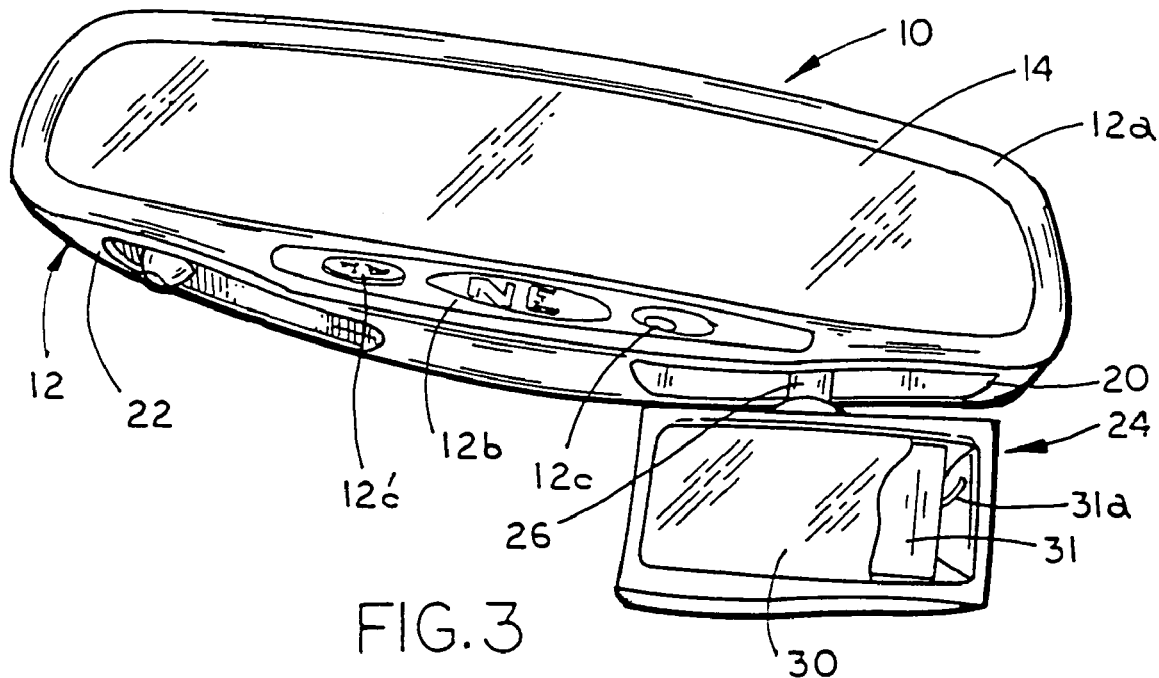
FIG. 3 is a bottom perspective view of the rearview mirror assembly of FIG. 1, with portions broken away, illustrating a pendent accessory in an extended position.
Figure 4:
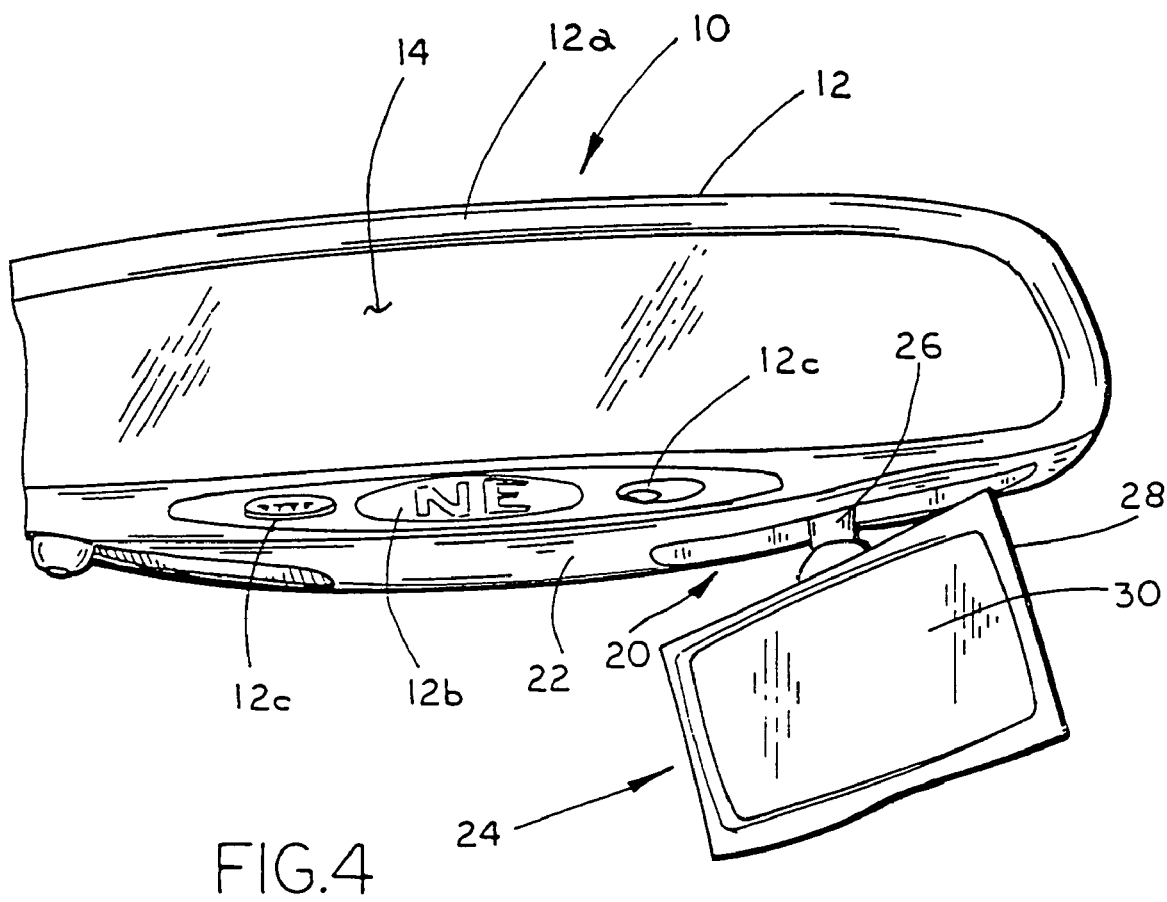
FIG. 4 is a bottom perspective view of the mirror assembly of FIG. 3 illustrating the pendent accessory moved to a second orientation.
Figure 5:
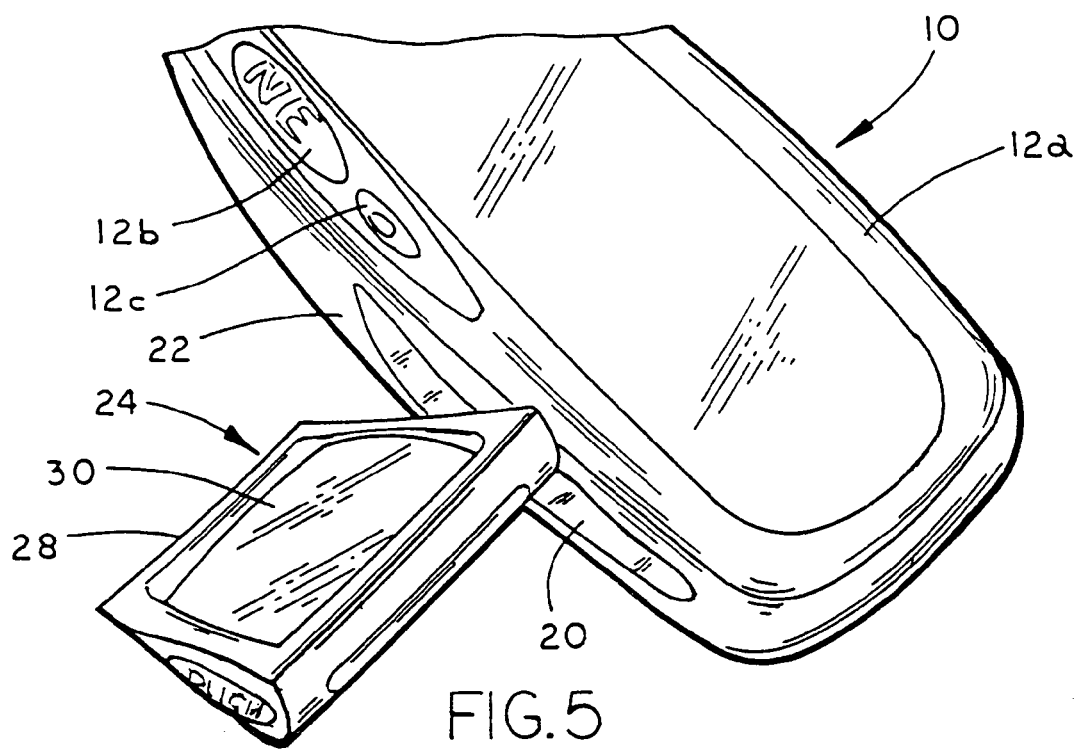
FIG. 5 is an enlarged bottom perspective view of the mirror assembly of FIG. 4, with the pendent accessory positioned in a third orientation.

Referring to FIG. 1, the numeral 10 generally designates a first embodiment of the interior rearview mirror assembly of the present invention. Assembly 10 is adapted to be releasably secured or coupled to the front windshield W of a vehicle in a conventional manner. Alternatively, assembly 10 can be adapted to secure or couple to the header portion of the vehicle above the windshield, as is known in the art. Assembly 10 includes a mirror casing or housing 12 and a reflective element 14 which is supported in or on casing 12 in a conventional manner. Referring to FIG. 2, in the illustrated embodiment, mirror assembly 10 is mounted to windshield W by a support arm 16 and a break-away mounting bracket or mirror mount 17 which releasably mounts to a conventional mirror button on windshield W. Preferably support arm 16 is a conventional double ball type support arm which permits multi axis positioning of casing 12 about bracket 17. It should be understood that any suitable type of support arm may be employed for supporting mirror subassembly 10 within the vehicle, for example a single ball mount support or the like. In addition, break-away mounting bracket 17 may take one of several forms, such as those described and shown in U.S. Pat. Nos. 5,820,097; 5,615,857; 5,330,149; 5,100,095; or 4,936,533; the disclosures of which are incorporated by reference herein in their entireties.

Mirror casing or housing 12 is preferably molded from a resinous plastic material, such as an engineering polymer material, for example a fiber reinforced nylon plastic or an ABS plastic, or a polypropylene or other similar thermoplastic or thermoset materials. Mirror casing 12 preferably includes a front bezel or bezel portion 12a, which extends around a rearward facing opening 12a' (FIG. 2) of casing 12 and around a peripheral portion of reflective element 14. As used in this application, the terms rearward facing and forward facing are used to define directions relative to a vehicle when the mirror assembly is mounted in the vehicle. "Rearward facing" means the object is facing to the rear of the vehicle towards the driver and occupants of the vehicle. "Forward facing" means that it is facing forward of the vehicle towards the windshield and so is typically (but not always) not substantially visible to the driver. Bezel 12a, which is formed separately from casing 12, is preferably molded from a resinous plastic material similar to casing 12.

It should be understood that casing 12 may include a retaining rim in lieu of separate bezel 12a.

Rear surface 13 of casing 12 includes a recessed area 13a in which is disposed a mounting boss 15 and a ball member 15a on which support arm 16 is mounted to enable the mirror assembly 10 to be releasably secured via bracket 17 to the vehicle windshield. Alternately, casing 12 may include a socket for receiving a ball member from support arm 16. Reference is made to U.S. Pat. No. 4,930,742 for one example of a preferred break-away mounting. Another example of such a coupling is disclosed in commonly assigned U.S. Pat. No. 5,100,095 to Haan et al. An alternate method of securing support 16 is by attaching support 16 to a header, for example of the type disclosed in U.S. Pat. Nos. 5,487,522; 5,615,857; or 5,671,996; which are commonly assigned to Donnelly Corporation, and which are herein incorporated by reference in their entireties. U.S. Pat. No. 5,487,522 discloses a mirror support bracket and illustrates a bracket which can be used on either a header or windshield mounted mirror assembly. In the illustrated embodiment, a conventional mounting button is adhered to the windshield surface by a layer of conventionally known metal to glass adhesives, such as polyvinyl butyral available from Monsanto Company of St. Louis, Mo. or by a silicone adhesive or the like.

Reflective element 14 preferably comprises a variable reflectance element, such as an electro-optic element. In most preferred form, reflective element 14 comprises an electrochromic mirror element, for example one of several types of electrochromic mirror elements, such as an element of the electrochemichromic type which is disclosed in U.S. Pat. No. 5,140,455, or the solid-state type such as disclosed in, for example, U.S. Pat. No. 4,712,879, U.S. Pat. No. 5,910,854, and U.S. patent application Ser. No. 08/238,521, filed May 5, 1994, by Varaprasad et al. now U.S. Pat. No. 5,668,663, all commonly assigned with the present application to Donnelly Corporation of Holland, Mich., the disclosures of which are herein incorporated by reference in their entireties. Other suitable electrochromic elements and/or mirror reflector elements are described in U.S. Pat. Nos. 5,151,816, 5,142,407, 6,305,807, 6,210,008, and 6,196,688, the disclosures of which are incorporated by reference herein in their entireties.

Mirror assembly 10 may house a plurality of electrical or electronic devices, such as antennas, including global positioning system (GPS) or cellular phone antennas, such as disclosed in U.S. Pat. No. 5,971,552, and pending U.S. Pat. application entitled COMPLETE MIRROR-BASED GLOBAL-POSITIONING SYSTEM (GPS) NAVIGATION SOLUTION, Ser. No. 60/187,960, filed Mar. 9, 2000, communication modules or systems, such as disclosed in U.S. Pat. No. 5,798,688, and copending U.S. Pat. application entitled VEHICLE MIRROR ASSEMBLY COMMUNICATING WIRELESSLY WITH VEHICLE ACCESSORIES AND OCCUPANTS, Ser. No. 60/199,676, filed Apr. 21, 2000, displays such as shown in U.S. Pat. No. 5,530,240 or in U.S. application Ser. No. 09/244,726, filed Feb. 5, 1999, now U.S. Pat. No. 6,172,613, and application entitled REARVIEW MIRROR ASSEMBLY WITH ADDED FEATURE MODULAR DISPLAY, Ser. No. 09/448,700, filed Nov. 24, 1999, by Timothy Skiver et al., now U.S. Pat. No. 6,329,925, blind spot detection systems, such as disclosed in U.S. Pat. No. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, and U.S. Pat. application entitled MEMORY MIRROR SYSTEM FOR VEHICLE, Ser. No. 09/572,008, filed May 16, 2000, now U.S. Pat. No. 6,698,905, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. patent application Ser. No. 09/361,814, filed Jul. 27, 1999, now U.S. Pat. No. 6,201,642; Ser. No. 09/396,179, filed Sep. 14, 1999, now U.S. Pat. No. 6,278,377; and Ser. No. 09/199,907, filed Nov. 25, 1998, now U.S. Pat. No. 6,717,610, speakers, a compass, such as disclosed in U.S. Pat. No. 5,924,212, seat occupancy detector, a trip computer, an ONSTAR System or the like, with all of the above referenced patents and applications commonly assigned to Donnelly Corporation, the disclosures of which are herein incorporated by reference in their entireties.

Referring to FIG. 2, mirror assembly 10 preferably includes a circuit board 18, which includes electronic or electrical circuitry for actuating the variable reflectance of reflective element 14 and for operating other electrical or electronic functions supported in rearview assembly 10. Circuit board 18 may support, for example, light emitting diodes (LEDs) for illuminating indicia on display elements 12b, 12c or 12c' provided on chin of bezel 12a or display areas provided on reflective element 14, or map or dash board lights 540, 542 (shown in FIG. 20). Circuit board 18 may be independently supported from reflective element 14 or in casing 12 or may be mounted to reflective element's rear surface 14a on a separate plate or may be directly adhered to the rear surface by a suitable adhesive. Reference is made to U.S. Pat. Nos. 5,671,996 and 5,820,245, the disclosures of which are herein incorporated by reference in their entireties. Though the illustrated embodiment illustrates the displays and/or buttons provided at the chin of the mirror housing bezel 12a, it should be understood that one or more of these buttons or displays may be located elsewhere on the mirror assembly or separately in a module, for example of the type disclosed in pending U.S. patent application Ser. No. 09/244,726 entitled REARVIEW MIRROR ASSEMBLY INCORPORATING VEHICLE INFORMATION DISPLAY, filed by Jonathon E. DeLine and Niall R. Lynam, which is assigned to Donnelly Corporation of Holland, Mich., now U.S. Pat. No. 6,172,613, and may comprise the touch-sensitive displays as disclosed in U.S. Pat. application entitled INTERACTIVE AUTOMOTIVE REARVIEW SYSTEM, Ser. No. 60/192,721, filed Mar. 27, 2000, the disclosures of which are herein incorporated by reference in their entireties. Note that button inputs can be provided along the lower bezel region of the interior mirror assembly such that, when actuated, a display appears within the mirror reflector region of the mirror reflective element. Preferably, the display appears local to the physical location of the particular button accessed by the driver or vehicle occupant (typically, immediately above it) so that the person accessing the mirror associates the appearance and information of the display called up by that individual button with the user's actuation of the button. Multiple actuations of that button can cause the display to scroll through various menu items/data displays, allowing the user to access a wide range of information. The button and associated circuitry can be adapted to recognize when a particular menu item is desired selected (such as holding down a particular input button for longer than a prescribed period, for example longer than about 1 second or longer than about 2 seconds or the like; if the button is held down for less than the prescribed period, the display scrolls to the next menu item). Preferably, whatever information is being displayed is displayed by a substantially reflecting and substantially transmitting reflective/transmissive reflector of the mirror reflective element such as the display on demand constructions disclosed in U.S. Pat. No. 5,724,187 titled "Electrochromic Mirrors and Device" to Varaprasad et al. of Donnelly Corporation, issued Mar. 3, 1998, the entire disclosure of which is hereby incorporated by reference.

Figure 6:
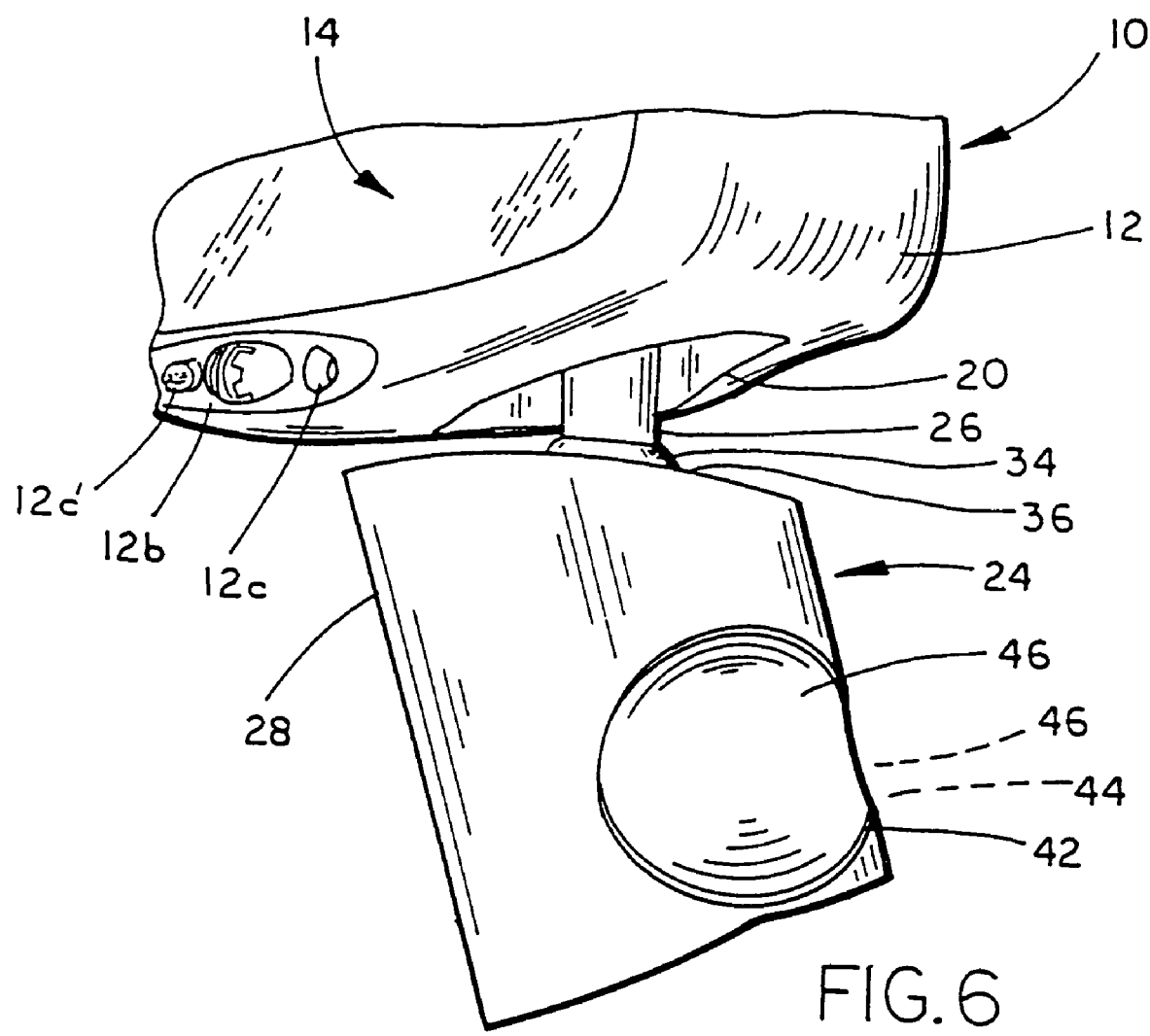
FIG. 6 is an enlarged end perspective view of the mirror assembly of FIG. 5.

Referring to FIG. 3, casing 12 includes a storage space which is provided by a cavity or recess 20 formed in bottom wall 22 of casing 12. Mounted in cavity 20 is a pendent accessory 24, which is preferably mounted in cavity 20 for movement between a fully retracted position (FIG. 8), in which a lower surface 24a of pendent accessory 24 generally follows the contour of casing 12 and is preferably substantially flush with a lower outer surface 22a of lower wall 22 of casing 12, and an extended position. In the illustrated embodiment, pendent accessory 24 is mounted in cavity 20 on an extendible support arm 26 so that dependent accessory 24 may be moved between its retracted and extended positions. For example, support arm 26 may comprise an extendable jack arm or spring-loaded telescoping arm or the like such as is known in the art. As best seen in FIG. 6, support arm 26 includes a ball joint 34 which extends into a receiving structure 36, for example a socket structure, provided in housing 28. In this manner, display accessory 24 is pivotally mounted to support arm 26 to permit repositioning of the display accessory about ball 34. Thus, pendent accessory 24 can be repositioned for easy access or viewing by the driver of the vehicle or by a passenger of the vehicle other than the driver. While in the illustrated embodiment pendent accessory 24 is illustrated as being positioned offset from the center of mirror case, it should be understood that pendent accessory 24 may be centrally located or located on a side of the case. Also, while illustrated in the Figures as an accessory that extends downwards from the bottom of the rearview mirror assembly (i.e. towards the vehicle floor) when mounted in the vehicle, a pendent accessory can extend upwards from the top of the mirror assembly (i.e. towards the vehicle roof area) or sideways (i.e. towards the vehicle side) from either end of casing 12.

Referring to FIGS. 3-8, pendent accessory 24 includes a housing 28 and an element 30, which is positioned in a rearward facing opening 32 of housing 28. Element 30 may comprise a reflective element or mirror (such as a flat, compound curvature, aspheric or convex mirror reflector) for use by an occupant of the vehicle as a vanity mirror or as a mirror to view rear seat passengers, such as a baby in a baby seat. Alternately, pendent accessory 24 can form a viewing screen for a baby minder system, such as the vehicle interior monitoring system described in U.S. Pat. Nos. 5,877,897 and 5,760,962 or the rear vision system described in U.S. patent application Ser. No. 09/361,814 filed Jul. 27, 1999, now U.S. Pat. No. 6,201,642; Ser. No. 09/199,907, filed Nov. 25, 1998, now U.S. Pat. No. 6,717,610; and U.S. patent application Ser. No. 09/433,467, now U.S. Pat. No. 6,326,613, filed Nov. 4, 1999, entitled VEHICLE INTERIOR MIRROR ASSEMBLY to Patrick Heslin and Niall R. Lynam, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible. For example, a camera, such as a CMOS or CCD camera, can be mounted to view the rear seat area of the vehicle so that the driver can view what is occurring, such as in a rear seat mounted baby seat or with a rear seat passenger, such as a child. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic or inorganic light emitting material, electroluminescent sources, and the like. Most preferably such non-incandescent sources are low power and are directed low intensity sources, such as described in U.S. Pat. No. 5,938,321 and application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are incorporated herein by reference in their entireties. The baby minder camera may be mounted as a part of the rearview mirror assembly and, most preferably, may be mounted as a part of a header, including a front header of a roof or a rear header of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (such as to form a ring around the camera) with the light projected from the individual LEDs directed to be substantially coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status.

Optionally and desirably, any video screen used in the vehicle, and particularly mirror-mounted video screens, and especially when using liquid crystal display technology, are equipped with contrast enhancement/anti-glare elements to reduce display wash-out from glare during high ambient light conditions such as at noon on a sunny day. For example, a Trivium Diodic Lens can be used, as available from Trivium Technologies of Cleveland, Ohio that uses passive polymer thin film technology.

Alternately, element 30 may comprise an information display element, in which element 30 conveys information to the vehicle operator and/or other occupants of the vehicle or may be a video screen or the like. For example, the information may include information relating to navigation or guidance systems, such as described in U.S. Pat. application entitled VEHICLE BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000, by Eugenie V. Uhlmann et al., now U.S. Pat. No. 6,553,308, the entire disclosure of which is incorporated by reference herein in its entirety. For example, pendent accessory 24 may comprise a personal communication device, such as a PALM organizer or the like, including a video screen, preferably a touch sensitive video screen such as PALM Pilot™ such as is available from 3COM, Corp. or the like, which is adapted for input by the touch of a human finger or stylus. In which case, as described in reference to the following embodiments, assembly 10 may include an accessory attachment member, for example such as attachment member 532 (FIG. 20), 756, (FIG. 24), for holding a stylus pen which interacts with pendent assembly 24. Optionally, the stylus is tethered to the mirror assembly, for example a coiled tether or a retractable tether or by other conventional means.

Display element 30 may perform a single display function or multiple display functions, such as providing indication of an additional vehicle function or functions, for example a compass mirror display function, a temperature display function, a tire pressure/status display function, a status of inflation of tires display function, computer display including e-mails and INTERNET access, a passenger air bag disabled display function, an automatic rain sensor operation display function, telephone dial information display function, highway status information display function, blind spot indicator display function, or the like. Such displays may be an alpha-numeric display or a multipixel display, and may be fixed or scrolling. In addition, display element 30 may comprise a television screen and/or video screen. Display element 30 may comprise a generally planar element or may comprise a convex element. Alternately, display element 30 may be separately formed and include tabs or receiving structures on either side adapted to fit within receiving structures or tabs, respectively, formed in the inside surfaces of housing 26 for assembly after molding of housing 26.

Pendent accessory 24 optionally includes a second circuit board 31 (FIG. 3), which is typically mounted adjacent and behind display element 30, which supports light emitting sources, such as light emitting diodes to provide back lighting of display element 30. Light emitting diodes provide low level non-incandescent white light for illuminating indicia on display element 30. However, it should be understood that other LEDs providing light and colors other than white, such as amber, red, blue, yellow, green, orange or the like may be used. Alternately, other light emitting elements can be used to display information on display element 30, such as incandescent displays, vacuum fluorescent displays, electro-illuminescent displays, light emitting diode displays, cathode ray tube displays, field emission displays, E-ink displays, or organic emitting polymer displays or the like. Examples of displays may be found in copending application entitled REARVIEW MIRROR ASSEMBLY INCORPORATING VEHICLE INFORMATION, Ser. No. 09/244,726, filed Feb. 5, 1999, by Jonathan DeLine and Niall R. Lynam, now U.S. Pat. No. 6,172,613, or U.S. Pat. No. 5,530,240, and U.S. patent application Ser. No. 09/433,467, filed Nov. 4, 1999, entitled VEHICLE INTERIOR MIRROR ASSEMBLY to Patrick Heslin and Niall R. Lynam, now U.S. Pat. No. 6,326,613, commonly assigned to Donnelly Corporation, which are herein incorporated by reference in their entireties. In addition, display element 30 may comprise a touch-sensitive display, such as described in U.S. Pat. application entitled INTERACTIVE AUTOMOTIVE REARVIEW SYSTEM, Ser. No. 60/192,721, filed Mar. 27, 2000. Alternately, circuit board 31 may also share components and provide circuitry for other electrical components in mirror assembly 10, thus eliminating the need for mounting such circuitry within the rearview mirror assembly housing itself.

As noted previously, pendent accessory 24 may also incorporate an in-vehicle train approaching warning system. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in U.S. Pat. application entitled VEHICLE BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000, by Eugenie V. Uhlmann et al., now U.S. Pat. No. 6,553,308 the entire disclosure of which is incorporated by reference herein in its entirety. Vehicle to road-side communication antennas can be attached to railroad signs, crossing barriers, and the like and can transmit to antennas mounted in the vehicle located such as within assembly 10 or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

It is also possible to incorporate low level console or instrumentation lighting for vehicles in assembly 10 by fitting a low level non-incandescent light emitting light source such as a light emitting diode for illuminating an instrument panel or console as disclosed in commonly assigned U.S. Pat. No. 5,671,996, the disclosure of which is hereby incorporated by reference. In this embodiment, a single instrument light 13 may be provided on an opposed end of mirror casing 12 and may include a variety of emitting sources such as high intensity amber and reddish orange light emitting diode sources, such as solid state light emitting diode (LED) sources utilizing double hydro junction AIGaAs/GaAs Material Technology such as very high intensity red (LED) lamps T/1 (5 mm) HLMP-4100/4101 available from Hewlett Packard Corporation of Pallo Alto, Calif., or transparent substrate aluminum indium gallium phosphide (AlInGaP) Material Technology, commercially available from Hewlett Packard Corporation, of Pallo Alto, Calif. Also, blue or white LEDs can be used or a combination of individual different colored diodes can be used with the color mixing therefrom to form a desired color. Optionally, a plurality of LEDs such as a cluster of four, six, eight or the like LEDs can be used to target and illuminate a local area for higher illumination at that area, such as may be useful in a map light (most preferably illuminating the target area with white light). The concepts of this present invention can be used with other interior rearview mirror assemblies which are equipped with a variety of features and accessories, such as a home access transmitter, a high/low (or daylight running beam/low) headlamp controller, a hands free phone attachment, a video device, such as a video camera for internal cabin surveillance and/or video telephone function, a remote keyless entry receiver, a compass, a seat occupancy detection, multiple reading lights, a trip computer, an intrusion detector, and the like. Display element 30 may also include a compass/temperature and a clock display, fuel level display, and other vehicle status and other information displays.

As it would be understood by those skilled in the art, the electrically operated display and other devices optionally provided in pendent accessory 24 are conveniently connected to the electrical system of the vehicle in which the present invention is mounted via electrical wiring 31a (FIG. 3). The use of pendent accessory 24 with display element 30 comprising the instant invention in conjunction with electrically operated interior rearview mirrors has the further advantage of permitting electrical coupling of the display element to the power supply of the vehicle by the pre-existing wire harnesses serving the rearview mirror. Thus, the electrical coupling of the display element can be by direct connection with the existing wire harness or in parallel through an adapter plug. This particularly facilitates a retrofit such as might occur as in the after-market or at a dealership that is a result of an option selection. Alternately, the interior mirror assembly can include a vehicle power socket, connected to the vehicle ignition system or battery electrical system, (such as the cigarette lighter type socket conventional on many automobile) into which other accessories can be plugged (such as in FIG. 25). For example, a "cigarette-lighter" type of socket can be provided at the rear or at the bottom of the interior mirror case, into which a vehicle occupant can plug an electrically operated (typically 12V) accessory such as a radar detector or the like.

Figure 7:
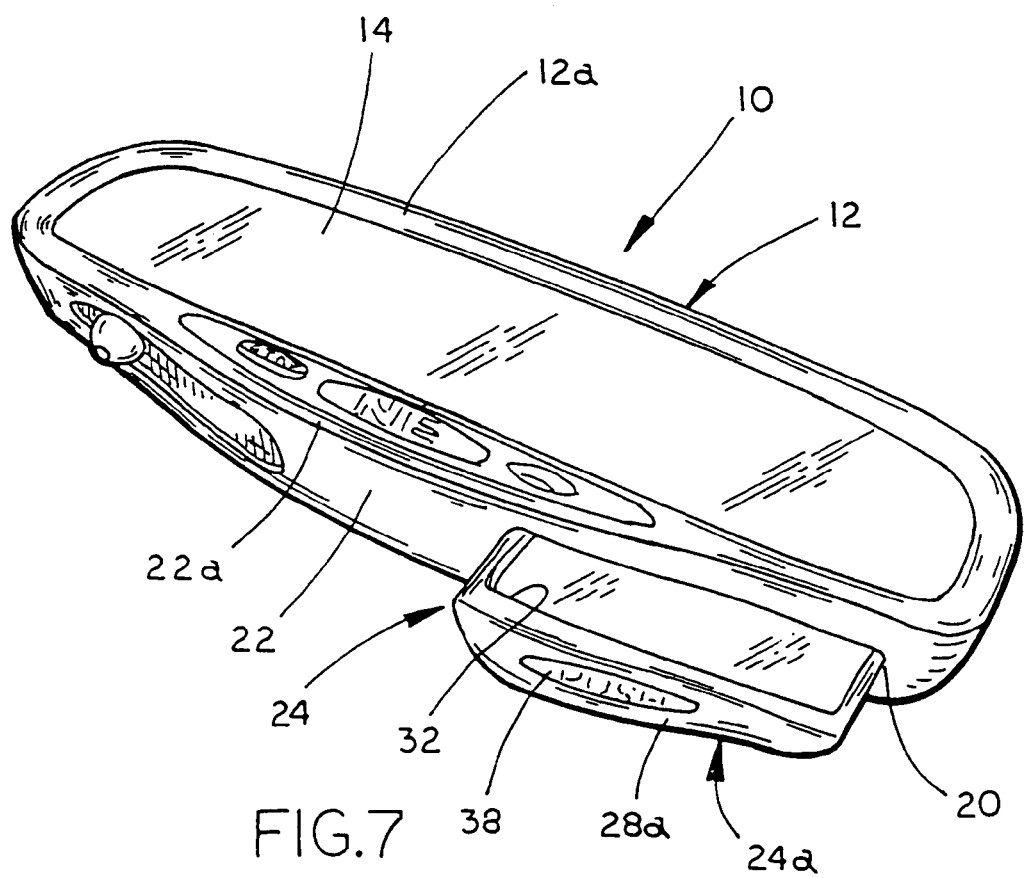
FIG. 7 is a bottom perspective view of FIG. 1 illustrating the pendent accessory of FIG. 3 in a partially retracted position within the mirror assembly housing.
Figure 8:
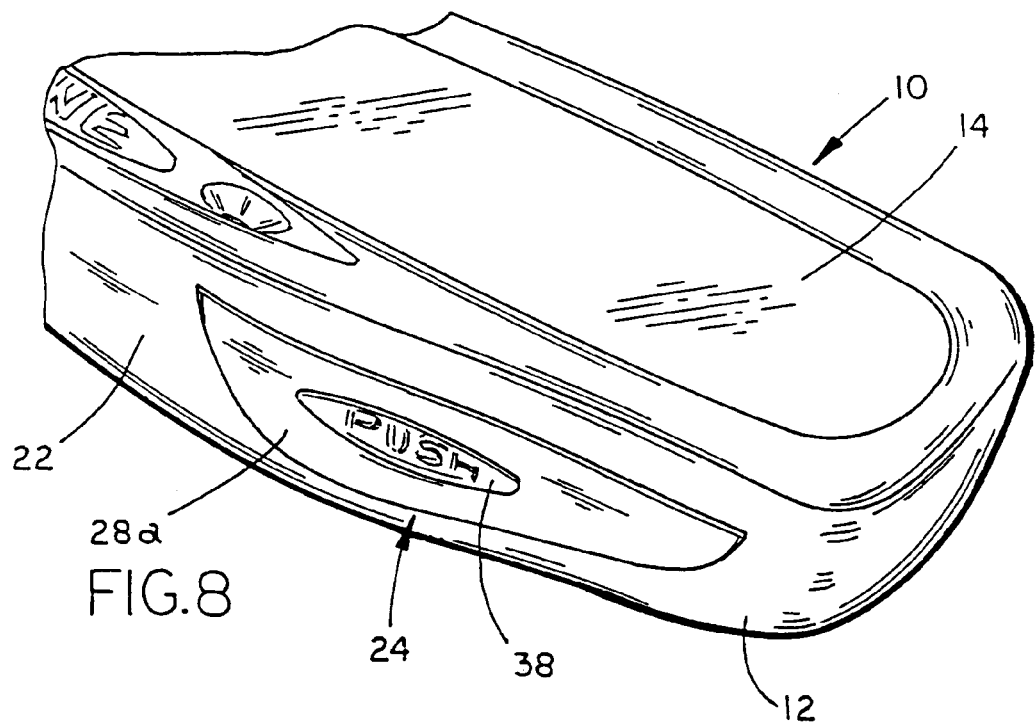
FIG. 8 is an enlarged bottom perspective view of a portion of the exterior rearview mirror assembly of FIG. 1, with the pendent accessory fully retracted within the housing.

Pendent accessory housing 28 preferably comprises a similar material to casing 12 so that when element 30 is moved to its retracted position as shown in FIG. 8, the lower surface 28a of housing 28 will generally match the surface and color of mirror casing 12. Though it can be appreciated that at least the lower surface of housing 28 may incorporate a different color or surface to provide either a visual or tactile identification of housing 28, with the tactile identification providing an "eyes free" identification to the occupant of the vehicle. Referring to FIG. 7a, support arm 26 preferably comprises a spring loaded support arm and includes an elongated shaft 40 on which ball member 34 is mounted. As best seen in FIGS. 7 and 8, housing 28 may include a recessed surface 38, for example an elongated depression which also provides tactile identification of housing 28 and when pushed releases pendent accessory 24 from its retracted position so that pendent accessory 24 can be extended and retracted from the storage space and optionally swiveled and/or universally pivoted about ball member 34 to a desired orientation. Similarly, when returned to its recessed position or storage space, recessed surface 38 is pressed to relatch pendent accessory 24 in its retracted position within casing 12. Such mechanisms are conventional and well known. In this manner, the occupant of the vehicle can quickly selectively insert the pendent accessory into its storage space within case 12 and quickly extend or remove the accessory from its storage space for personal use or use by another occupant of the vehicle.

As best seen in FIG. 6, housing 28 of display assembly 24 includes one or more recessed gripping surfaces 42 and 44 to permit easy adjustment of the position of housing 28 about support arm 26. In the illustrated embodiment, surfaces 42 and 44 comprise round indentations 46, but it should be understood that other shapes or surfaces may be used. Furthermore, surfaces 42 and 44 provide tactile identification of housing 28 to permit quick adjustment with minimal distraction to the driver.

By selectively and extensibly positioning a display element or a vanity mirror below casing 12 on the end of casing 12 closer to the passenger side of the vehicle, as shown in FIGS. 3-8, the obstruction to the vehicle operator is minimized. Furthermore, the accessory is located in a position which is well known to the driver and, therefore, requires little concentration to use, and such movement in reaching for the accessory is almost automatic. Such automatic actions require far less attention than actions requiring new movement and will consequently minimize the distraction to the driver as well. Optionally, pendent accessory 24 may be provided with other electrical or electronic features or accessories, such as previously described in reference to mirror assembly 10.

Figure 8A:
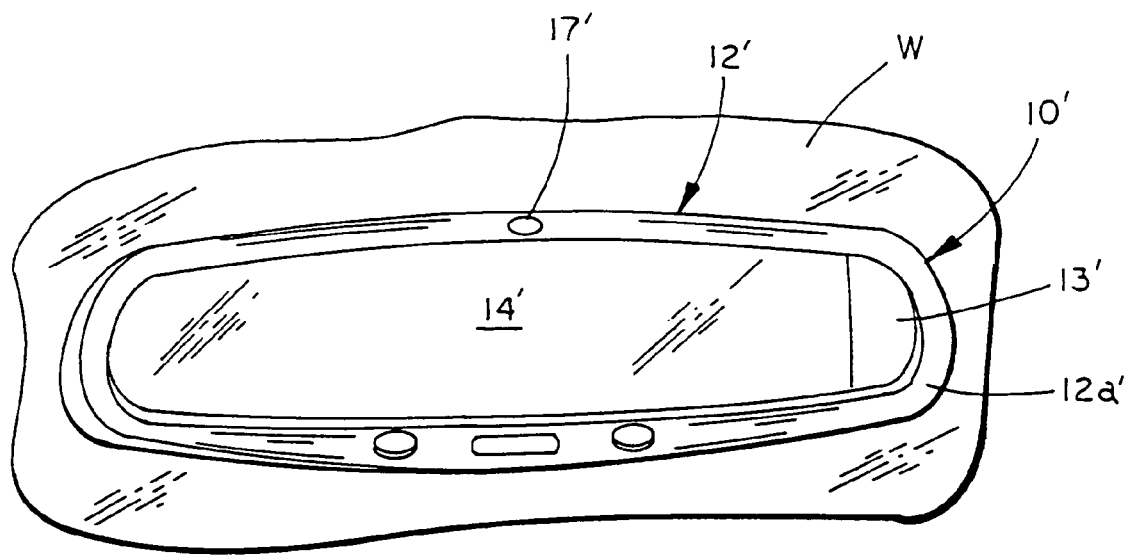
FIG. 8A is a perspective view similar to FIG. 1 illustrating the rearview mirror assembly of FIG. 1 with a display screen adjacent the reflective element.

Referring to FIG. 8A, mirror assembly 10' may include a video screen 13'. In the illustrated embodiment, display screen 13' is placed to the side of reflector 14' in casing 12'. In preferred form, display screen 13' is separate from reflector 14'. Most preferably, video screen 13' is canted toward the driver when mirror housing 12' is in its normally adjusted position. Video screen 13' can display output from such as a rear vision back-up camera (for example, located at or as part of the license plate assembly on the rear of the vehicle), such as disclosed in application Ser. No. 09/199,907, filed Nov. 25, 1998, now U.S. Pat. No. 6,717,610, and Ser. No. 09/361,814 filed Jul. 27, 1999, now U.S. Pat. No. 6,201,642, commonly assigned to Donnelly Corporation, the disclosures of which are herein incorporated by reference in their entireties, a baby minder camera (that can be part of an interior light such as a dome light or rail lamp or can be part of a coat hook assembly or grab handle assembly or similar interior trim item), such as the vehicle interior surveillance camera disclosed previously (that can be part of an interior light such as a dome light or rail lamp or can be part of a coat hook assembly or grab handle assembly or similar interior trim item), vehicle instrument status, such as vehicle information display, including information relating to fuel gauge levels, a compass display indicating directional heading of the vehicle and the like. Reference is made to copending U.S. Pat. application entitled INTERIOR REARVIEW MIRROR ASSEMBLY INCORPORATING A VIDEO SCREEN, Ser. No. 60/186,520, filed Mar. 1, 2000, by Niall R. Lynam, which is incorporated herein by reference in its entirety, for examples of other suitable locations of video screens and, further, for examples of other suitable mirror casings incorporating one or more video screens. For example, a compass display of vehicle directional heading can be displayed as an additional display on an interior cabin video display screen (preferably a mirror-mounted video display) that is showing a video view of a rear seat occupant (such as in a baby minder system) or of a rear back-up event or side and rear lanes as in a panoramic rear vision system.

For example, and as disclosed in copending U.S. Pat. application entitled INTERIOR REARVIEW MIRROR ASSEMBLY INCORPORATING A VIDEO SCREEN, Ser. No. 60/186,520, filed Mar. 1, 2000, by Niall R. Lynam, which is incorporated herein by reference in its entirety, and as shown in FIG. 8A, mirror assembly 10' may include a video screen 13'. It has been suggested and known to equip a vehicle (and especially a large multi-passenger carrying vehicle such as a minivan, van, sports-utility vehicle and the like (and especially when equipped with at least three rows of seating)) with a video display mounted in the header/headerliner/overhead console region of the roof of the interior cabin and that flips down from the cabin headliner region when desired to be viewed by occupants of the vehicle. This interior cabin roof-mounted video display typically includes an integrated DVD video system that allows display on a flat panel (7 inches diagonal dimension) active matrix, thin-film transistor liquid crystal display of movies, video games, computer generated displays, and the like from DVD disks/interactive game disks for the entertainment of passengers typically rearward of the front row of seats of the vehicle where the driver sits (typically, it is undesirable for the driver to be viewing and thus potentially distracted by movies, TV stations, games etc. while driving). Also, it has been suggested to equip such large passenger-carrying (typically 6-9 or more passenger capacity) cabins with microphones adjacent each individual row of rear seats and, optionally, video cameras imaging individual rear seat rows or individual rear seat locations so that rear passengers in the vehicle can readily converse among themselves and with their images shown on the header-mounted display screen and with their conversations amplified via the vehicle audio system. Thus, this known system provides a reconfigurable overhead display that flips down from the headliner of the interior cabin of the vehicle (such as from an overhead console) for viewing by passengers in the rear of the vehicle and that provides an electronic conversation function that uses a video display, interior roof area mounted video cameras and microphones to enhance communication between front- and rear-seat passengers in the vehicle.

As an extension of such a known system, a video camera 17' (see FIG. 8A) can be incorporated into the movable portion of the interior rearview mirror assembly (such as, for example, in bezel portion 12a' of mirror casing 12' of mirror assembly 10' of FIG. 8A). The field of view of the bezel/casing-mounted camera is substantially coaxial with the normal viewing angle of reflective element 14' by the driver of the vehicle such that when casing 12' is adjusted by the driver so that the field of view through the rear window provided by mirror reflective element 14' is correct for that driver, the field of view of camera 17' is automatically aligned so as to substantially view the head portion of the driver, such as is disclosed in U.S. Pat. application entitled REARVIEW MIRROR SUPPORT INCORPORATING VEHICLE INFORMATION DISPLAY, Ser. No. 09/025,712, filed Feb. 18, 1998, now U.S. Pat. No. 6,087,953, which is incorporated by reference herein in its entirety. Thus, the very action by the driver of adjusting the interior mirror to see properly out the rear window automatically aligns the bezel/casing-mounted camera to view the head portion of the driver. This image of the driver can, optionally and preferably, be displayed on a header/headliner/overhead console-mounted video display screen (optionally in a picture-in-picture form as is common on home televisions) so that the rear passengers can have the image of the driver displayed to them, and so the driver can participate in their conversations by visual appearance on the overhead-mounted video screen viewed by the rear passengers. Preferably, a microphone or a plurality of microphones is provided for the driver and front seat occupant(s) to allow them audibly participate as well. Also, when the interior mirror assembly is equipped with a least one video screen (as in FIGS. 8A and 8B, and as disclosed in copending U.S. Pat. application entitled INTERIOR REARVIEW MIRROR ASSEMBLY INCORPORATING A VIDEO SCREEN, Ser. No. 60/186,520, filed Mar. 1, 2000, by Niall R. Lynam, which is incorporated herein by reference in its entirety), images captured of passengers rearward of the front seat row (where the driver sits) by the rear-seat viewing cameras (typically located at the headliner or on the upper side roof portions of the interior cabin) can be displayed by the mirror-mounted video screen provided at the interior mirror assembly so that the driver can view what is happening in the rear seats (and optionally view the status of a child or baby in a rear seat child/baby safety seat). Provision of an interior mirror-mounted camera and/or video screen can extend the usefulness of in-cabin video displays (such as the DVD-equipped electronic conversation system described above) that are overhead/roof mounted or with their screen(s) mounted in the back(s) of headrest(s) and vehicle seat(s) or otherwise positioned outside the immediate forward line of sight of the driver. Such provision of an interior mirror-mounted camera and/or video screen allows the driver to more fully utilize a vehicular overhead video display/electronic conversation system (such as the DVD based system including a video/audio system that is sometimes referred to as a vision-aided conversation system and is available from Johnson Controls Inc. of Holland Mich.) that is largely intended for rear-seat passenger entertainment and/or provision of an interior mirror-mounted camera and/or video screen enhances the value of such a system to rear seat passengers, and the mirror-based video screen can further be used to display to the driver the output of a back-up camera (that can be mounted such as part of a CHMSL stop light and view rearward of the vehicle during reversing via the rear window or can be mounted external to the rear window such as part of a license plate attachment, a trunk lid or a trunk handle assembly) and/or of a dedicated baby minder camera. Display of such back-up images at the interior rearview mirror assembly rather than at, for example, a roof header console-mounted screen is preferred for an ease of driver use and viewability standpoint.

Figure 46:
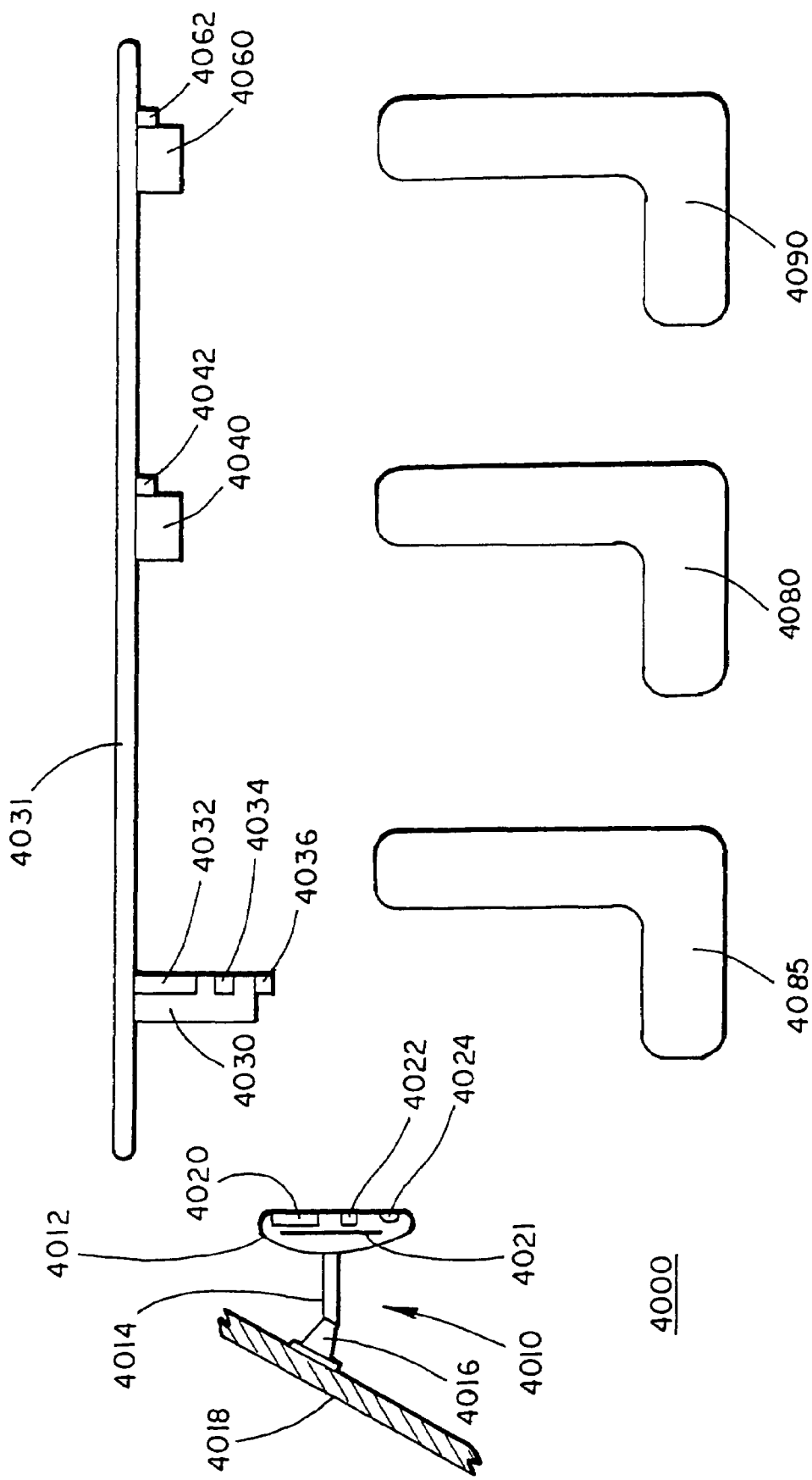
FIG. 46 is a schematic view of an improved electronic conversation system of the present invention.

An improved electronic conversation system 4000 of this present invention (see FIG. 46) includes an overhead video display assembly 4030 that comprises a video display screen 4032, and optionally and preferably, a video camera 4034 and/or a microphone 4036. Preferably, assembly 4030 comprises an overhead console of the vehicle attached to the roof portion 4031 of the vehicle. Display screen 4032 preferably comprises a flat-panel matrix-addressable, reconfigurable display element such as a passive display (such as a liquid crystal display) or, more preferably in order to avoid image wash-out due to glare under high ambient light conditions such as may occur on a sunny day, may comprise an active display comprising individual light-emitting pixels (such as a plasma multi-pixel display or a field-emission multi-pixel display or a light emitting diode multi-pixel display or a electroluminescent multi-element display). The outer surface of screen 4032 is preferably coated with a glare reducing element such as a surface diffuser coating such as is disclosed in U.S. Pat. Nos. 6,001,486 and 5,725,957 and pending U.S. Pat. application entitled TRANSPARENT SUBSTRATE WITH DIFFUSER SURFACE, Ser. No. 09/348,086, filed Jul. 6, 1999, now U.S. Pat. No. 6,087,012, (which are herein incorporated by reference in their entireties), or an interference anti-glare multi-layer thin film, or a low index (less than about 1.4 refractive index measured at the Sodium D line) polymeric film. Camera 4034 preferably comprises a CCD or a CMOS image capture device. Preferably, the field of view of camera 4034 includes a view of passengers seated in rear seat row 4080 (which is the seat row immediately to the rear of the front seat row 4085 where the driver and front-seat passenger(s) sit). Camera 4040 preferably comprises a CCD or a CMOS image capture device. Preferably, the field of view of camera 4040 includes a view of passengers seated in rear seat row 4090 (which is the seat row immediately to the rear of the seat row 4080). Camera 4060 preferably comprises a CCD or a CMOS image capture device. Preferably, the field of view of camera 4060 includes a view of any passengers seated to the rear of seat row 4090, and/or it may also include a view out a rear window of the vehicle in order to capture an image of the area immediately behind the vehicle so as to assist safe backing of the vehicle during a reversing maneuver. Microphones 4036, 4042 and 4062 are adapted to detect voice inputs and conversations of rear seat passengers of the vehicle. Such voice signatures so detected are preferably processed by a digital sound processing system (such as is disclosed in U.S. Pat. application entitled INTERIOR REARVIEW MIRROR INCLUDING DIGITAL SOUND PROCESSING SYSTEM, Ser. No. 09/466,010, filed Dec. 17, 1999, now U.S. Pat. No. 6,420,975, which is incorporated by reference herein in its entirety) to enhance the vocal signature signals of the rear seat passengers and to reduce/eliminate non-vocal noise. Connection of cameras 4040 and 4060 and microphones 4042 and 4062 to assembly 4030 can be by wire connection (such as a CAN or LIN bus connection or a multi-wire cable or a fibre-optic link) and/or can be by wireless connection (such as by radio frequency wireless communication link or by infrared wireless communication link). Video screen 4032 can display the images captured of the rear seat passengers by cameras 4034, 4040 and 4060, and the conversations of rear seat passengers detected by microphones 4036, 4042 and 4062 can be heard throughout the vehicle such as by playback via the vehicle audio system.

Electronic conversation system 4000 further includes an interior rearview mirror assembly 4010 comprising a mirror reflective element (preferably an electrochromic mirror element) housed in a mirror casing 4012 that is pivotally attached to a mirror support arm 4014 that attaches, via bracket 4016, to the front windshield 4018 of the vehicle. Note that, as an alternate, mirror assembly 4010 could attach to the header region above the windshield or be part of an overhead console of the vehicle, as known in the art. Casing 4012 (that is moveably and pivotally adjustable by the driver so as to set the driver-desired rearward field of view of mirror reflective element 4021) preferably includes a video screen 4020, a video camera 4022 and/or a microphone or multiple microphones 4024 (although, optionally, some or all of these can be incorporated elsewhere on/in or at mirror assembly 4010 such as in a pod attached to bracket 4016, or attaching to/incorporated in support arm 4014, or mounted adjacent to the mirror assembly 4010 such as by mounting to the windshield in the region between the point of attachment of mirror assembly 4010 to the windshield and the headliner above). Mirror-mounted display screen 4020 (that preferably has a diagonal screen dimension in the range from about 1 inch to about 4 inches) preferably comprises a flat-panel matrix-addressable, reconfigurable display element such as a passive display (such as a liquid crystal display) or, more preferably in order to avoid image wash-out due to glare under high ambient light conditions such as may occur on a sunny day, may comprise an active display comprising individual light-emitting pixels (such as a plasma multi-pixel display or a field-emission multi-pixel display or a light emitting diode multi-pixel display or a electroluminescent multi-element display). The outer surface of screen 4020 is preferably coated with a glare reducing element such as a surface diffuser coating such as is disclosed in U.S. Pat. Nos. 6,001,486 and 5,725,957 and pending U.S. Pat. application entitled TRANSPARENT SUBSTRATE WITH DIFFUSER SURFACE, Ser. No. 09/348,086, filed Jul. 6, 1999, now U.S. Pat. No. 6,087,012, (which are herein incorporated by reference in their entireties), or an interference anti-glare multi-layer thin film, or a low index (less than about 1.4 refractive index measured at the Sodium D line) polymeric film. Camera 4022 preferably comprises a CCD or a CMOS image capture device, and most preferably, camera 4022 is incorporated in casing 4012 (such as in a bezel or eyebrow region) with the field of view of the camera set so that when the driver adjusts casing 4012 about its pivot connection to support arm 4014 in order to properly set the rearward field of view for mirror reflector 4021, the field of view of camera 4022 substantially includes a view of the head/face region of the driver seated in front seat row 4085 (which is the seat row immediately to the front of seat row 4080). Thus, when the driver aligns the field of view of the mirror reflector to properly see rearward out the rear window of the vehicle, the field of view of the mirror-casing mounted camera is thereby aligned to substantially view the head/face region of the driver. This image of the head/face region of the driver may be displayed on video screen 4032 of overhead video assembly 4030, in conjunction with images captured by any one or several or all of cameras 4034,4040 and 4060. For example, an image of the driver captured by mirror-mounted camera 4022 could be displayed at overhead screen 4032, preferably superimposed upon or merged with (such as by a picture-in-a-picture video display as known in the display art) images of the rear seat occupants captured by cameras 4034, 4040 and/or 4060. In this manner a video image view of the driver can be seen by the rear passengers. Optionally, camera 4022 can capture a video image of a front seat passenger in addition to, or as an alternate to, that of the driver. Also, optionally but less preferably, camera 4022 can be located elsewhere on the interior mirror assembly (such as in a pod attaching to bracket 4016) or elsewhere, high-mounted at the front of the vehicle cabin such as in the region between the mirror attachment point to the windshield to the headliner above or at the joint between the windshield and the headliner, or it can be located as part of the instrument panel or as part of a front body pillar such as the A-pillar in the interior cabin. Microphone 4024 is adapted to detect voice inputs and conversations of front seat occupants of the vehicle such as the driver and/or a front-seat passenger. Such voice signatures so detected are preferably processed by a digital sound processing system (such as is disclosed in U.S. Pat. application entitled INTERIOR REARVIEW MIRROR INCLUDING DIGITAL SOUND PROCESSING SYSTEM, Ser. No. 09/466,010, filed Dec. 17, 1999, now U.S. Pat. No. 6,420,975, which is incorporated by reference herein in its entirety) to enhance the vocal signature signals of driver and/or other front seat row occupant and to reduce/eliminate non-vocal noise. Connection of cameras 4020, 4040 and 4060 and microphones 4024, 4042 and 4062 to assembly 4030 can be by wire connection (such as a CAN or LIN bus connection or a multi-wire cable or a fibre-optic link) and/or can be by wireless connection (such as by radio frequency wireless communication link or by infrared wireless communication link). Thus, and as described above, video screen 4032 can display the image captured of front seat occupants (and especially the head/face view of the driver) and of rear seat passengers by cameras 4020, 4034, 4040 and 4060, and the conversations of front seat occupants (and especially the driver) and of rear seat passengers detected by microphones 4024, 4036, 4042 and 4062 can be heard throughout the vehicle such as by playback via the vehicle audio system. Note that preferably, video screen 4032 is positioned out of the immediate forward line of sight of the driver in order to obviate distracting the driver from the driving task (and thus potentially impair safe driving).

Figure 8B:
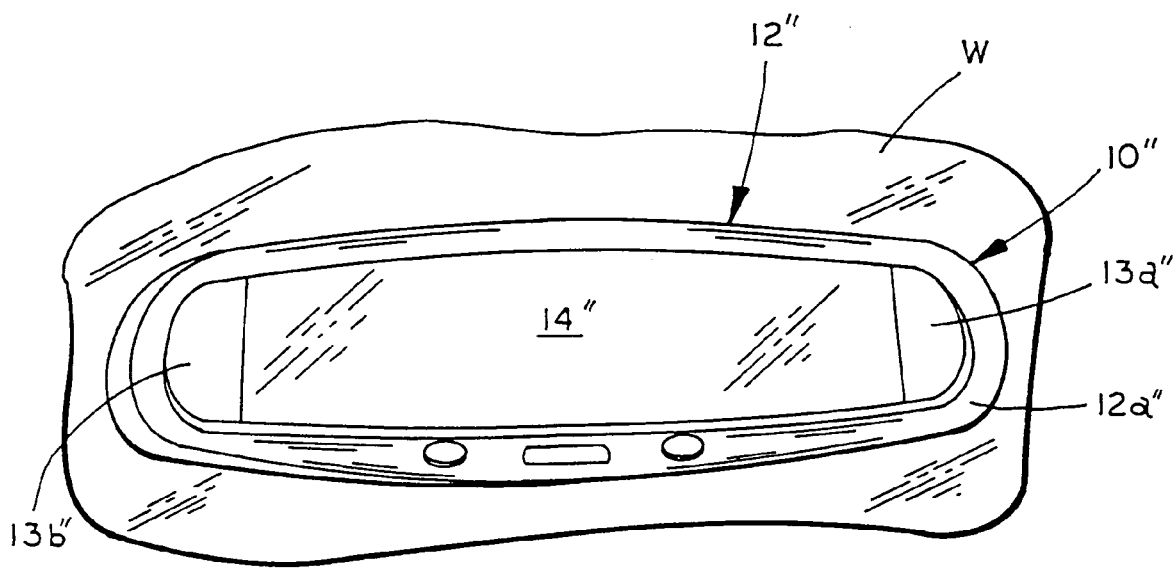
FIG. 8B is a view similar to FIG. 8A illustrating the rearview mirror assembly with a pair of display screens.
Figure 10:
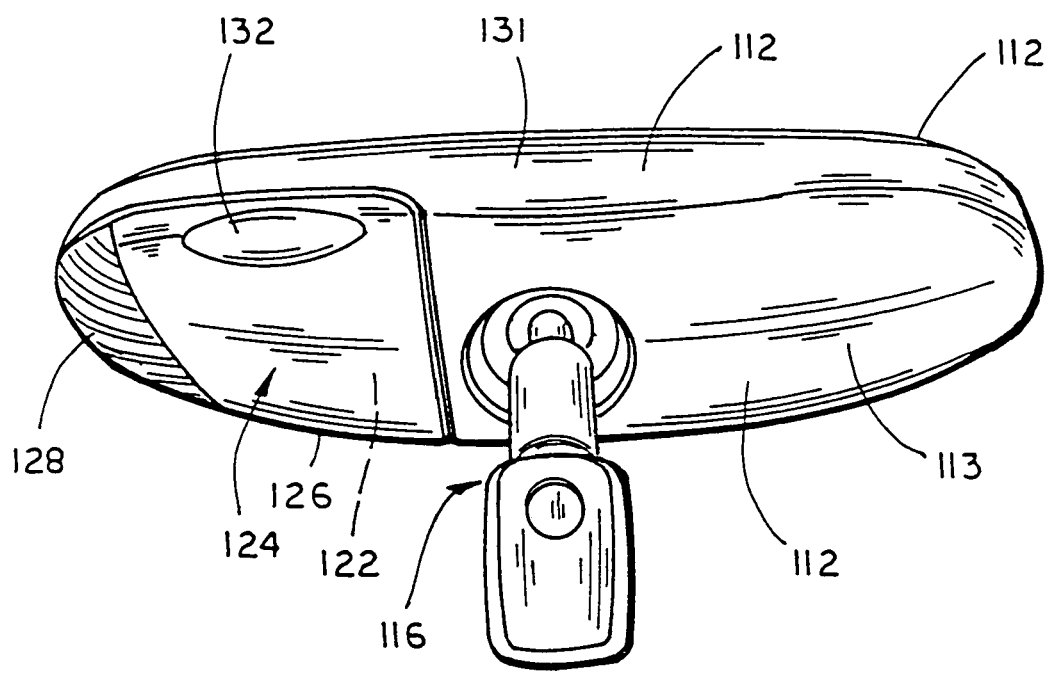
FIG. 10 is a rear perspective view of the mirror assembly of FIG. 9.

Referring to FIG. 8B, mirror assembly 10" may include a pair of screen displays 13a" and 13b". In the illustrated embodiment, displays 13a" and 13b" are positioned in case 12" at opposed sides adjacent reflective element 14". Preferably, displays 13a" and 13b" are similarly positioned behind bezel 12a" so that displays 13a" and 13b" generally lie in the same plane as reflective element 14". Optionally, cameras (not shown) may be mounted in case 12" on either side as part of the interior mirror assembly, with one camera feeding display element 13a" and the other camera feeding display element 13b".

Referring to FIGS. 9-14, the numeral 110 designates a second embodiment of the rearview mirror assembly of the present invention. Mirror assembly 110 includes a mirror casing or housing 112, bezel or retaining rim 112a, and a reflective element 114 supported in mirror housing 112. The material of housing 112 is similar to housing 12; therefore, reference is made to housing 12 for further details of suitable materials. Similar reference is made to the first embodiment for further details of mirror reflective element 114.

Extending rearwardly from housing 112 is a mirror support arm 116, which mounts mirror housing 112 by way of a mounting bracket or mirror mount similar to bracket 17 onto a mirror mounting button (not shown) provided on most conventional windshields to form a break-away assembly. Reference is made to support arm 16 and bracket 17 for details of one preferred support arm and other preferred mounting arrangements.

As best seen in FIGS. 10-13, housing 112 includes a storage space 122 for holding or storing an accessory 124. In the illustrated embodiment, accessory 124 comprises a light assembly, such as a flashlight assembly. However, accessory 124 may comprise a cellular phone, a phone module, pager, INTERNET connector, or the like. In the case of docking a telecommunication device, such as a phone or a pager, the mirror assembly is preferably adapted to connect to the telecommunication device (such as a phone) in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

In preferred form, storage space 122 is provided on forward facing side or back wall 113 of housing 112 and comprises a recessed area which extends from an upper wall 112a of housing 112 to a lower wall 112b of housing 112. In this manner, storage space 122 is hidden from view from the occupant of the vehicle, but readily accessible by the driver or other occupants of the vehicle. In preferred form, light assembly 124 includes a housing 126, and a removable lens 128 which form a unitary body 130. Body 130 preferably includes a suitable battery or batteries, which may be rechargeable. Body 130 is preferably commensurate in shape with the outer surface 131 of housing 112 such that when light assembly 124 is mounted in storage space 122, the outer surfaces 130a of unitary body 130 follow the contours of housing 112 and, further, the outer surfaces 130a of unitary body 130 are generally flush with surface of housing 112 surrounding storage surface 122. In this manner, when light assembly 124 is mounted to housing 112, light assembly 124 forms a unitary body having matched and corresponding contours which are flush with housing 112. As would be understood by those skilled in the art, housing 126 supports a bulb and a battery, preferably a rechargeable battery. In preferred form, housing 126 supports a pair of battery contacts 131a which align with contacts 131b provided on casing 112 to permit quick recharging of the battery or batteries inside housing via the vehicle electrical system without the need for disassembling light assembly 124. Alternately, the interior rearview mirror assembly, such as housing 112, may include a power source, such as a recharger that recharges the battery or batteries in the dockable accessory, which is stored or attached thereto. As previously noted, such dockable accessories can include pagers, cellular phones, flash lights or the like. In this manner, accessory 124 can be docked for recharging. In the case of the light assembly, the light assembly can be docked for use as a map reading light or the like. When undocked, light assembly 124 may be used as a flashlight, as previously noted.

In the case of a dockable phone, housing 112 optionally includes at least one speaker and microphone, such as disclosed in U.S. patent application Ser. No. 09/382,720, filed Aug. 25, 1999, by Niall R. Lynam et al., now U.S. Pat. No. 6,243,003. When the phone is docked, the phone may be optionally connected to the vehicle system such that the vehicle system enables the speakers and microphones to provide hands-free operation of the phone. Actuation of the hands-free phone may be achieved when the phone is docked or by a separate switch mounted, for example on the dashboard or, alternately, to the interior mirror assembly. Furthermore, the interior mirror assembly may optionally incorporate a voice acquisition/recognition/generation system, such as described in U.S. patent application Ser. No. 09/396,179, filed Sep. 14, 1999, entitled INDICATOR FOR VEHICLE ACCESSORY, now U.S. Pat. No. 6,278,377, and U.S. Pat. application entitled VEHICLE BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000, by Eugenie V. Uhlmann et al., now U.S. Pat. No. 6,553,308, the disclosures of which are incorporated by reference herein in their entireties, so that not only can the mirror assembly provide a hands free communication system but also an "eyes free" system. For example, when downloading a facsimile to a vehicle based fax machine, which is located in the vehicle, the message in the facsimile can be transformed into a voice generated signal so that the occupant, especially the driver, can receive the message audially. Note, and as described in U.S. Pat. application entitled COMPLETE MIRROR-BASED GLOBAL-POSITIONING SYSTEM (GPS) NAVIGATION SOLUTION, Ser. No. 60/187,960, filed Mar. 9, 2000 (the disclosure of which is incorporated by reference herein in its entirety, the vehicle can be equipped (and preferably the interior rearview mirror assembly can be equipped) with a language translation system that text and audible messages received by, and sent from, the vehicle to a language understood and/or spoken by the driver or other occupant of the vehicle. The vehicular translation system can include a language translator in the vehicle itself and/or a wireless telematic link to a telematic system (such as General Motor's ONSTAR™ or Ford Motor Company's RESCU™ system) that is located distant and remote from the vehicle.

Alternately, the phone module of a cellular or digital phone may be docked on the mirror housing such that the vehicle system couples the phone module to the speakers and microphones to provide a hands-free phone system. In this manner, the module can be quickly and easily docked and, further, removed for replacement into the phone housing.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in copending provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, and utility application entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, Ser. No. 09/561,023, filed Apr. 28, 2000, by E. Uhlmann, now U.S. Pat. No. 6,553,308, which are herein incorporated by reference in their entireties. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

In addition, the interior rearview mirror assembly of the present invention may incorporate or comprise a component of a security system which employs various cameras, which can be provided at strategic locations around the vehicle, including interior cameras and exterior cameras, and are coupled to a telemetry system and preferably to a navigational system such as a GPS system. As noted above interior viewing (and/or exterior viewing) cameras can be located in or at the interior rearview mirror assembly (and/or in or at either or both of the exterior side view mirror assemblies mounted to the side of the vehicle) along with telemetry and GPS systems. Optionally, one or more of these cameras may be equipped with infrared LED light emitting sources, such as are disclosed in U.S. Pat. application entitled REARVIEW MIRROR SUPPORT INCORPORATING VEHICLE INFORMATION DISPLAY, Ser. No. 09/025,712, filed Feb. 18, 1998, now U.S. Pat. No. 6,087,953, and U.S. Pat. application entitled REARVIEW MIRROR ASSEMBLY INCORPORATING VEHICLE INFORMATION DISPLAY, Ser. No. 09/244,726, filed Feb. 5, 1999, now U.S. Pat. No. 6,172,613, and in U.S. Pat. application entitled VEHICLE BASED NAVIGATION SYSTEM WITH SMART MAP FILTERING, PORTABLE UNIT HOMEBASE REGISTRATION AND MULTIPLE NAVIGATION SYSTEM PREFERENTIAL USE, Ser. No. 09/561,023, filed Apr. 28, 2000, by Eugenie V. Uhlmann et al., now U.S. Pat. No. 6,553,308, and in U.S. Pat. application entitled INTERIOR REARVIEW MIRROR INCLUDING DIGITAL SOUND PROCESSING SYSTEM, Ser. No. 09/466,010, filed Dec. 17, 1999, now U.S. Pat. No. 6,420,975, which are all incorporated by reference herein in their entireties, in order to light up an area in or around the vehicle when it is dark. When an intrusion detector such as a motion detector (preferably a pyrodetector-based intrusion detection system such as is disclosed in and commonly assigned U.S. patent application Ser. No. 08/901,929, filed Jul. 27, 1997, by Gimtong Teowee et al. of Donnelly Corporation entitled PYROELECTRIC INTRUSION DETECTION IN MOTOR VEHICLES, now U.S. Pat. No. 6,166,625, and commonly assigned U.S. Pat. application entitled SAFETY RELEASE FOR A TRUNK OF A VEHICLE, Ser. No. 09/516,831, filed Mar. 1, 2000, now U.S. Pat. No. 6,390,529, and U.S. Pat. application entitled SAFETY HANDLE FOR TRUNK OF VEHICLE, now U.S. Pat. No. 6,390,529, Ser. No. 09/275,565, filed Mar. 24, 1999, now U.S. Pat. No. 6,086,131, the disclosures of which are herein incorporated by reference herein in their entireties) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected. Preferably, the in-vehicle camera-based security system silently and secretly records the events occurring in and/or around the vehicle whole it is operating (such as when idling in traffic or moving on a highway or stopped at a traffic light) and provides a "black box" recording of activities in the interior of the vehicle or exterior of the vehicle. For example, the security system may be used to record or document vehicle status including speed, brake activation, vehicle control status signals (for example, whether the turn signal has been actuated, vehicle traction, tire pressures, yaw and roll, geographic location, time and date) and other vehicle information as well as record visual images detected by the cameras. In an accident, such vehicle performance/function data in combination with a visual recording of the interior and/or exterior vehicular scene (and optionally, a microphone recording of sounds/voices interior and/or exterior to the vehicle) can help insurance and police investigators establish the causes and conditions of an accident. The camera-based vehicle performance/function recording system of the vehicle preferably records data onto a recording medium (such as onto electronic memory or onto digital recording tape) that is rugged and protected from the consequences of an accident so as to survive the impact forces, shocks, fires and other events possible in an automobile accident. Preferably, any electronic memory utilized is non-volatile memory that is non-erasing in the event of electrical power loss in the vehicle. For example, the camera-based in-vehicle security system may include an electronic memory recording medium and/or a video tape (preferably a digital) recording medium so that a pre-determined period of operation of the vehicle, such as up to the last about 1 minute of vehicle operation, more preferably up to the last about 5 minutes of vehicle operation, most preferably up to the last about 15 minutes of vehicle operation, or even greater, is continuously recorded (such as on a closed-loop tape or electronic recording that continually records the most recent events inside and/or outside the road transportation vehicle). The camera-based in-vehicle security system can maintain the stored images and/or vehicle data in the vehicle for downloading when desired such as after an accident. Alternately, the camera-based in-vehicle security system can transmit the images and/or vehicle data by wireless communication to a remote receiver such as a receiver distant and remote from the vehicle (such as at a security system or a telematic service such as ONSTAR™ or RESCU™ or at the vehicle owners home or at a car rental center). This can occur continuously while the vehicle is being operated, so that in the event an accident occurs, retrieval and analysis of the recorded information is not impeded such as by damage or even loss of the vehicle in the accident. Also, the remote receiver of the information can alert authorities (such as a police, fire and/or ambulance service) of an accident immediately when such accident occurs (and thus potentially speed aid to any accident victims and/or dispatch the correct medical aid for the type of accident/injuries recorded by the camera(s)). The recorded information can include the gear in which the driver is operating the vehicle, the activation of the brakes, the speed at which the driver is traveling, the rate of acceleration/deceleration, the time, date and geographic location, the atmospheric conditions including lighting conditions—basically, the system can record what happened during a collision whereby the system provides an information recordation function. For example, when the system is used to record an accident when the vehicle is operating, the cameras may record scenes, vehicle instrument/function status, or the like which are kept on a tape or non-volatile electronic, solid-state memory, for example a continuous loop tape or electronic memory. Alternately, this information can be continuously transmitted or downloaded. For example, the information can be downloaded in response to a selected stimuli or trigger, such as when the brakes are activated, the air bag or bags are activated, when the horn is operated, or when the car de-accelerates, or the like. For example, the system may use accelerometers such as disclosed in U.S. patent application Ser. No. 09/440,497, filed Nov. 15, 1999, now U.S. Pat. No. 6,411,204, and, furthermore, may be combined with the deceleration based anti-collision safety light control system described in the aforementioned application, the disclosure of which is incorporated by reference in its entirety herein. This information recordation function can be used, as noted above, to record both interior activities and exterior activities and, therefore, can be used as noted above as a security system as well. When the system is used as a security system, the telemetry system may contact the security base who in turn can scroll through the camera images to determine whether the alarm is a true or false alarm. In this manner, various existing systems that are provided in the vehicle may be optionally used individually to provide one or more functions or collectively to provide even further or enhanced functions.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C- interior pillar) and seat backs, and such as are disclosed in copending, commonly assigned U.S. Pat. applications entitled ELLIPTICAL APERTURE, Ser. No. 60/187, 961, filed Mar. 9, 2000, copending, commonly assigned U.S. Pat. applications entitled INTERACTIVE AUTOMOTIVE REARVIEW SYSTEM, Ser. No. 60/192,721, filed Mar. 27, 2000, (Attorney Docket No. DON01 P-815); copending, commonly assigned U.S. Pat. applications entitled INTERIOR REARVIEW MIRROR ASSEMBLY INCORPORATING A VIDEO SCREEN, Ser. No. 60/186,520, filed Mar. 1, 2000, and in U.S. Pat. Nos. 5,877,897; 5,760,962; 5,959,367; 5,929,786; 5,949,331; 5,914,815; 5,786,772; 5,798,575; and 5,670,935; and U.S. Pat. applications entitled VEHICLE REARVIEW MIRROR DISPLAY SYSTEM, Ser. No. 09/304,201, filed May 3, 1999; VEHICLE MIRROR DIGITAL NETWORK AND DYNAMICALLY INTERACTIVE MIRROR SYSTEM, now U.S. Pat. No. 6,198,409, Ser. No. 09/375,315, filed Aug. 16, 1999, now U.S. Pat. No. 6,175,164; WIDE ANGLE IMAGE CAPTURE SYSTEM FOR VEHICLES, Ser. No. 09/199,907 filed Nov. 25, 1998, now U.S. Pat. No. 6,717,610; WIDE ANGLE IMAGING SYSTEM, Ser. No. 09/361,814, filed Jul. 27, 1999, now U.S. Pat. No. 6,201,642; VEHICLE IMAGING SYSTEM WITH STEREO IMAGING, Ser. No. 09/372,915, filed Aug. 12, 1999, now U.S. Pat. No. 6,396,397; VEHICLE REARVIEW MIRROR DISPLAY SYSTEM," Ser. No. 09/304,201, filed May 3, 1999, now U.S. Pat. No. 6,198,409; and "REARVIEW VISION SYSTEM WITH INDICIA OF BACKUP TRAVEL, Ser. No. 09/313,139, filed May 17, 1999, now U.S. Pat. No. 6,222,447, which are all commonly assigned to Donnelly Corporation of Holland, Mich., the disclosures of which are herein incorporated by reference in their entireties. For example, a camera, preferably a solid-state CMOS video camera, can be located within the interior cabin of the vehicle (and preferably located at, on or within the interior rearview mirror assembly), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants. Preferably, the vehicle is also equipped with the in-vehicle portion of a wireless communication telematic system such as an ONSTAR™ or RESCU™ system, and the geographic location of the vehicle can also be established by a navigational system, such as an in-vehicle GPS system. Images of the interior vehicle cabin (including images of the various vehicle occupants) can be captured by the in-vehicle image capture device, preferably an interior mirror-mounted video camera, and this information, in conjunction with the geographic location of the vehicle provided by a position locator such as a GPS system, along with various vehicle information/function data such as the state of activation of any air bag in the vehicle, can be communicated by wireless telecommunication to an external service remote from the vehicle such as an ONSTAR™ or RESCU™ service. Such communication can be periodic (such as when the ignition is first turned on during a particular trip, or initially when the ignition is first turned on and intermittently thereafter, such as every about 1 minute or so) or continuous during operation of the vehicle with its engine turned on. Should the receiver at the remote service be alerted that an accident has occurred (such as by receiving from the vehicle via wireless telematic communication an accident alert signal indicative that an air bag has activated), the remote receiver (which can be an ONSTAR™ operator or an automatic computer-based image analyzer or an emergency service such as a "911" service provider) can count, via the video imaged relayed from the vehicle, the number of occupants in the vehicle and can accordingly alert emergency services as to the location of the accident and the number of victims involved (thus ensuring that the appropriate number of, for example, ambulances are dispatched to deal with the actual number of potential victims in the vehicle at the time of the crash). Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR™ or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system. Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR™ or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system.

A variety of other electrical and electronic features can be incorporated into the rearview mirror assembly, such as those disclosed in U.S. patent application Ser. No. 09/433,467, filed Nov., 4, 1999, entitled VEHICLE INTERIOR MIRROR ASSEMBLY, to Patrick Heslin and Niall R. Lynam, commonly assigned to Donnelly Corporation, now U.S. Pat. No. 6,326,613, which is herein incorporated by reference in its entirety. For example, a microphone or a plurality of microphones may be incorporated, preferably to provide hands-free input to a wireless telecommunication system such as the ONSTAR™ system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865, entitled A METHOD FOR INDICATING THE PRESENCE OF SPEECH IN AN AUDIO SIGNAL, issued Sep. 25, 1990, to Stettiner et al. (the disclosure of which incorporated by reference herein), are particularly useful to enhance clarity of vocal signal detection when a single microphone is used, located in the interior mirror assembly such as in casing 12, as part of a vehicular wireless communication system such as General Motors' ONSTAR™ system. Use of digital signal processing and a single mirror-mounted microphone (such as is described in U.S. patent application Ser. No. 09/396,179, filed Sep. 14, 1999, entitled INDICATOR FOR VEHICLE ACCESSORY, now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region), digital sound processing is also beneficial when multiple microphones are used. For example a first microphone, mounted in the mirror casing 12, can be directed principally towards the mouth of the driver and a second microphone can be directed so as to detect vehicular ambient noise such from HVAC, windshield vibration etc. Optionally, a third microphone can be placed at a location on the exterior of the vehicle (such as within an external portion of a window gasket or within an external door handle) to directly pick up road/wind noise external to the vehicle. This can provide a further signal for noise cancellation as described below. A signal indicative of the ambient noise can be generated by processing the output of the second microphone, and this signal can be subtracted from a signal generated by processing the output of the first microphone to form a signal substantially representative of the speech picked up by the first microphone (and optionally, the sounds picked up by the third external microphone can be included as negative feedback to further cancel noise picked up by the first microphone). Techniques and circuitry to achieve such speech enhancement are known in the acoustics art, such as are disclosed in U.S. Pat. No. 5,381,473, issued Jan. 10, 1995, entitled NOISE CANCELLATION APPARATUS, to D. Andrea, the disclosure of which is hereby incorporated by reference herein. Also, noise cancellation techniques such as destructive interference can advantageously be used, whereby the signal as picked up by the microphone is processed, the human vocal signal is distinguished from the noise signal, and whereby the noise signal is fed back 180 degrees out of phase with itself in order to cancel out the noise by destructive interference and so enhance the vocal signal to background noise ratio. Digital sound processing is preferably accomplished using a microprocessor. A variety of microprocessors can be used such as a single-chip microcomputer optimized for digital signal processing and high speed numeric processing such as the ADSP-218x digital signal processors such as the ADSP-2186 single-chip microcomputer, which integrates 40 kilobytes of on-chip memory (including 8K words (24-bit) of program RAM and 8K words (16-bit) of data RAM) along with serial ports, DMA ports, timers, I/O lines, and interrupt capabilities. The ADSP-2186 microcomputer and the ADSP-218x digital signal processors are available from Analog Devices, Inc., Norwood, Mass. In a vehicle wireless communication system installed in a vehicular cabin, location of the microphone(s) in the interior mirror assembly (such as in casing 12) is advantageous. For digital sound processing of the sound signal detected by the mirror-mounted microphone, an analog to digital converter can be also located at the interior rearview mirror assembly (such as in casing 12) that converts the analog microphone sensor output to digital form. The microprocessor for performing the digital sound processing algorithms and analysis can also be located at the interior rearview mirror location (such as in casing 12). Alternately, the microprocessor performing the digital sound processing analysis can be located elsewhere in the vehicle cabin (such as in the vehicle dash, preferably sharing circuitry with other functions of the vehicle wireless communication system), and with the digitized output signal from the A/D converter linked to the mirror-mounted microphone being fed to the microprocessor via a wire link or via a car area network (a.k.a. controlled area network) or via a vehicular local area network or via an in-cabin, short-range radio transmission network such as via the BLUETOOTH system described below.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, use of a directed microphone directed to a potential human speaker in conjunction with a more omnidirectional microphone/sensor microphone intended to detect background noise can be used. Techniques useful to enhance vocal to noise signal ratio include use of analog and/or digital low-pass filtering to limit examination of signal content to, for example, less than 1000 Hz. or less than 750 Hz. (and so help distinguish vocal signal from noise signals), include use of syllabic rate filtering such as is described in U.S. Pat. No. 4,484,344, include use of a hangover time function such as disclosed in U.S. Pat. No. 4,187,396, include use of a digital sound switch and dual threshold detection such as disclosed in U.S. Pat. No. 4,052,568 and include noise canceling microphones and techniques such as disclosed in U.S. Pat. No. 5,909,495 (the disclosures of the above cited U.S. Pats. are incorporated by reference herein). The vehicular microphone can be voice-activated such as by a digital voice operated switch such as is disclosed in U.S. Pat. No. 5,251,263, the disclosure of which is incorporated by reference herein. An adaptive signal processing system can be used to enhance vocal to noise ratio. Adaptive noise cancellation techniques can be used to produce a speech indication signal in response to detection of voice information in the presence of background vehicular noise such as are described in "Adaptive Noise Canceling: Principles and Applications" Proc. IEEE, vol. 63, pp. 1692-1716, December 1975 by B. Widrow et al., and "Adaptive Noise Canceling for Speech Signals", IEEE Trans. Acoust. Speech and Sig. Proc., vol. ASSP-26, No. 5, October 1978, by M. Sambur, and U.S. Pat. No. 5,033,082, entitled COMMUNICATION SYSTEM WITH ACTIVE NOISE CANCELLATION, issued Jul. 16, 1999, to Eriksson et al, and U.S. Pat. No. 5,251,263, entitled ADAPTIVE NOISE CANCELLATION AND SPEECH ENHANCEMENT SYSTEM AND APPARATUS THEREOF, issued Oct. 5, 1993, to Andrea et al, the disclosures of which are hereby incorporated herein in their entirety. Mechanical cancellation of ambient noise can be provided, as can a noise canceling pressure gradient microphone, preferably in conjunction with acoustic ports including voice and noise ports. Such a system is disclosed in World Pat. publication WO 9817046 A1 to D. Andrea, published Apr. 23, 1998, and entitled NOISE CANCELING ACOUSTICAL IMPROVEMENT TO WIRELESS TELEPHONE OR CELLULAR PHONE, the disclosure of which is hereby incorporated by reference. A pressure gradient microphone, as known in the acoustic arts, can be used to reduce the background vehicular noise as detected by a vehicular mirror-mounted microphone, or alternatively, an acoustic feedback system, preferably including compensation filters, can be used. Also, closed-loop active noise reduction techniques and other noise reduction techniques can be used such as disclosed in U.S. Pat. Nos. 2,972,018; 3,098,121; 4,833,719; 4,878,188; 4,977,600; and 5,138,664, and in Japanese Pat. Abstract No. 3-169199, the disclosures of which are incorporated by reference herein. An adaptive noise cancellation and speech enhancement system and apparatus suitable to use a vehicle with a mirror-mounted microphone is disclosed in U.S. Pat. No. 5,251,263, the disclosure of which is incorporated by reference herein. This adaptive noise cancellation system is particularly beneficial when multiple vehicular microphones are used. Other noise cancellation techniques useful for vehicular microphones, and particularly for mirror-mounted microphones that provide input to wireless communication systems, particularly in voice-recognition mode, are disclosed in U.S. Pat. Nos. 5,732,143; 5,825,897; and 5,673,325, the disclosures of which are incorporated by reference herein.

Also, an indicator such as disclosed in U.S. patent application Ser. No. 09/396,179, filed Sep. 14, 1999, entitled INDICATOR FOR VEHICLE ACCESSORY, U.S. Pat. No. 6,278,377, the disclosure of which is incorporated by reference herein, can be incorporated into the interior mirror assembly that indicates to the driver and/or passengers that speech being detected by a mirror-mounted microphone (or a microphone located elsewhere in the vehicle cabin such as in a header console) is being transmitted and received clearly and error-free by a remote wireless receiver such as an ONSTAR™ operator or a voice recognition system such as is common when calling airlines, services and the like. For example, the signal which is wirelessly transmitted from the audio system in the vehicle to the remote receiver may be echoed or retransmitted back to the vehicle where, upon receipt of the retransmitted signal at the vehicle, an in-vehicle voice recognition system interprets the as-received retransmitted signal and either speaks the words/numbers interpreted to the driver for confirmation, or displays the message as received in the vehicle after retransmission so the driver/passenger receives and audible and/or visual indication of what the remote voice recognition transcriber is receiving. If the in-vehicle voice recognition system/in-vehicle indicator is not indicating the expected message, then the driver/passenger will know that the original transmission to the remote voice recognition system was not clear and contained error, and take appropriate action such as repeating the message. By retransmitting back to the vehicle, and confirming in-vehicle, the vehicle occupants can be assured that wireless transmission to the like of a voice recognition system is clear and error-free.

As disclosed in U.S. Pat. No. 4,959,865, entitled A METHOD FOR INDICATING THE PRESENCE OF SPEECH IN AN AUDIO SIGNAL, issued Sep. 25, 1990, to Stettiner et al., and in copending and co-assigned U.S. patent application Ser. No. 09/466,010, filed Dec. 17, 1999, now U.S. Pat. No. 6,420,975; Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4; 1999, now U.S. Pat. No. 6,326,613; Ser. No. 09/448,700, filed Nov. 24, 1999, now U.S. Pat. No. 6,329,925; and Ser. No. 09/446,010, filed Dec. 17, 1999, now U.S. Pat. No. 6,420,975, the entire disclosures of which are hereby incorporated by reference herein, use of a mirror-mounted digital sound processing system that includes a microphone, and preferably a plurality of at least two microphones, incorporated into the vehicular interior rearview mirror assembly has many advantages including placing the voice acquisition system in the vehicle at a high-mounted, central location to the front of the driver and/or the front seat passenger, and with the mirror-mounted microphone(s) at a level and at a position natural to be addressed by the front seat occupants. Also, since the interior mirror assembly is at a location in the vehicle cabin behind the front windshield where it is subject to heating in summer due to solar insolation passing through the front windshield, it is preferable to use a high temperature resistant microphone capable of withstanding a temperature of, and performs well at, at least 80° C., more preferably, at least 90° C., and most preferably, at least 100° C. In this regard, it is preferable to use a ceramic, silicon or similar non-polymeric resin based microphone element in the microphone(s) incorporated into the interior mirror assembly. For example, a preferred microphone element for use in microphone(s) incorporated into the interior mirror assembly is a silicon microphone available from Ruf Electronics GmbH of Hohenkirchen, Germany under the trade name SiSonic™ Silicon microphone. This has an operating temperature in the −40° C. to 125° C. range with a frequency response from 100 Hertz to 18 kilohertz (audible design) and an output noise of 20 microvolt rms. This is provided in a chip package suitable for mounting on a PCB. It is preferable to use printed circuit board (PCB) mountable microphones that most preferably can be placed on the same PCB used for other electronic/electrical functions of the interior mirror assembly (such as automatic electrochromic dimming mirror circuitry, compass sensing and/or display circuitry, telematic input controls such as ONSTAR™ input buttons, digital sound processing circuitry) in order to optimize economy of manufacture. Further, the design of the bezel region and/or the structure of the interior rearview mirror casing that houses the interior reflective element can be adapted to receive and accommodate the mirror-mounted microphone(s). For example, sound insulation, vibration isolation/protection, air draft baffles, acoustic ports, acoustic conduits, acoustic traps, chambers, isolators, baffles, wave guides and traps, microphone angling sockets, voice ports, noise ports, as well as mechanical noise cancellation elements can be molded into or otherwise provided in, or attached to, the bezel and/or casing of the interior rearview mirror assembly such as, and referring to FIGS. 1 and 2, in or on casing 12 and/or bezel 12*a* of rearview assembly 10. Thus, instead of providing a single-element or multi-element microphone module (which preferably has cardioid or super cardioid directionality along with beamforming) as a unitary assembly supplied to the mirror manufacturer by a microphone manufacturer, the sub-elements of the microphone assembly (such as, for example, sound insulation, vibration isolation/protection, air draft baffles, wind protection, acoustic ports/function, acoustic conduits, acoustic traps, chambers, isolators, baffles, wave guides and traps, microphone angling sockets, voice ports, noise ports and the like) can instead be incorporated by the mirror manufacturer into the design and construction of the interior mirror assembly, and preferably in conjunction with mounting of the microphone (s) on any PCB used in the interior mirror assembly so that, when the PCB is mounted within the cavity of the interior mirror casing, the PCB-mounted microphone(s) line up with the mechanical acoustical elements (such as those listed above) incorporated into the mirror bezel/casing so that both cooperate to provide a high performing (with a signal to noise discrimination of at least 15 decibels provided, at least 20 decibels more preferred, and at least 25 decibels most preferred), economical mirror-mounted voice acquisition system, preferably also including digital sound processing noise cancellation/electronic signal conditioning. Note that where an existing electronic feature is already present in the interior mirror assembly (such as automatic electrochromic dimming mirror circuitry, compass sensing and/or display circuitry, telematic input controls such as ONSTAR™ input buttons, digital sound processing circuitry), it is desirable for economy and electronic integrity that the digital sound processing/electronic signal conditioning associated with the voice acquisition/microphones be at least partially placed, and preferably substantially placed, on the same PCB as circuitry for other electronic features of the mirror assembly, preferably with sharing of components/circuit elements such as microprocessors, electronic memory, power supplies, etc.

The interior mirror assembly may include a variety of information displays such as a PSIR (Passenger Side Inflatable Restraint) display, an SIR (Side-Airbag Inflatable Restraint), compass/temperature display, a tire pressure status display (such as described in copending U.S. patent application Ser. No. 09/513,941, filed Feb. 28, 2000, now U.S. Pat. No. 6,294,989, which is incorporated by reference herein in its entirety) or other desirable displays, such as those described in U.S. patent application Ser. No. 09/244, 726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and, more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status (such as described in copending U.S. patent application Ser. No. 09/513,941, filed Feb. 28, 2000, now U.S. Pat. No. 6,294,989, which is incorporated by reference herein in its entirety) can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like) and thereby provide a vehicle speed control function. Thus, for example, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analog communication and vehicle/external wireless connectivity, preferably using the interior and/or exterior mirror assemblies as transceiver/display/user-interaction sites. Electronic accessories to achieve the above can be accommodated in casing 12, and/or elsewhere in the interior mirror assembly (such as in the housing disclosed in U.S. patent application Ser. No. 09/433,467, filed Nov. 4, 1999, entitled VEHICLE INTERIOR MIRROR ASSEMBLY, to Patrick Heslin and Niall R. Lynam, now U.S. Pat. No. 6,326,613.

Providing a docking capability and/or storage space for the like of a cellular phone has several advantages, especially when used in conjunction with an in-vehicle microphone and ONSTAR™ or similar vehicular wireless communication system. In such a system, the vehicle typically comes equipped from the original equipment manufacturer (typically an automaker such as General Motors, Ford or the like) with an excellent radio/CD/tape audio system with good speakers, amplifiers, graphic equalizers etc. Coupled with a high quality microphone, the quality and power of the vehicular audio system typically exceeds that found in a hand-held cellular phone. Also, when the vehicle is equipped with an ONSTAR™ system, the vehicle is typically already provided with a quality wireless transmitting/receiving antenna, and often with a GPS system as well. Thus, providing a docking function (preferably at the interior rearview mirror but at other location such as the header console or the like is contemplated) has advantages beyond providing a recharging power source to the personal hand-held phone (or pager or the like). Once docked (which encompasses linking the portable unit to the interior mirror assembly via a cable or via a cable-less connection such as by a remote IR link), the driver and/or passengers can optionally and preferably make and receive telephone calls via their docked personal phone, but with the audio system being provided by the in-vehicle, pre-existing speakers, amplifiers, microphone etc. Preferably, whenever a phone call is initiated, any radio station or other music or play though the vehicle audio system is turned off for the duration of the phone call. Also, the ringing tone indicating a call is being received at the docked personal phone preferably sounds through the car audio system so that it is audible even if the car audio is playing music or the like. In this manner, the driver and/or passenger can be contacted via their personal cellular phone number while driving on the highway. As regulations increase forbidding the use of cellular phones while driving, unless hands-free, use of the existing vehicle audio system to make and receive calls is advantageous as quality of sound is enhanced thereby. The present invention contemplates a personal cellular phone having a detachable module that includes the circuitry that makes that phone specific and unique in terms of caller identifier. Thus, when the driver, for example, enters the vehicle, he/she detaches the identifier module from the personal mobile hand-held cellular phone and plugs it to a receiving portion of the in-vehicle wireless transmission system (that may comprise an antenna, speakers, an amplifier, a microphone, a keypad etc). Once the identifier module is plugged into the vehicular wireless communication system, the vehicle wireless communication system now emulates the hand-held personal phone, allowing calls be made or received at the personal phone number of the owner of the personal cellular phone. All such in-vehicle communication can be in voice-recognition mode, or a keypad can be provided for the driver to key in a phone number. Although illustrated here for a cellular phone, these concepts have broad application to like of hand-held computers and the like. Also, soon all cellular phone calls will be traceable as to the geographic location of the call. Thus, by making a call from the vehicle, the location of the vehicle is traceable by the likes of the phone service provider such as MCI, SPRINT and the like. Thus, the geographic location of the vehicle can be identified by the driver placing a call. A user-operated "SOS" button can be provided in the vehicle such that, when activated, a cellular phone call is initiated, this call is directed to the cellular phone company, the cellular phone company identifies the vehicle's location, and the cellular service provider, once the vehicle's location is identified, automatically connects the phone to the emergency "911" service particular to the location of the vehicle. Thus, no matter where the call is made from, the driver of the vehicle is automatically connected to the emergency services.

Also, where a dockable accessory is used and in other situations, the interior mirror assembly may include a recharging unit and/or a low voltage (typical less than 10 volts, such as 5 volts or lower) power source (preferably of direct current power) to power the likes of a cellular phone, lap-top computer, or the like. A socket for this purpose may be provided on the mirror casing 12 (or elsewhere on the interior mirror assembly), or a powering and/or recharging cable can be stored in casing 12, and pulled out (preferably under spring-load so as to automatically rewind) as required to power the accessory. Preferably, the recharging unit, including any associated electronic circuitry, is housed in casing 12 of the interior rearview mirror assembly.

Figure 9:
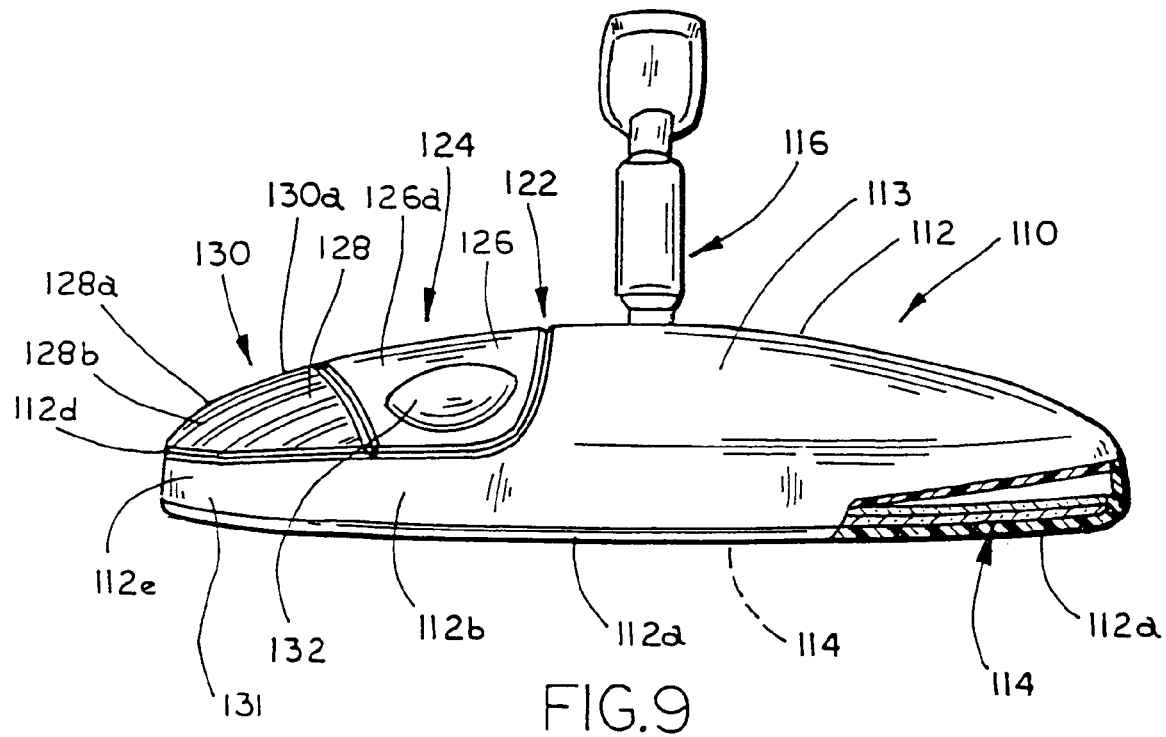
FIG. 9 is a top plan view of an interior rearview mirror similar to FIG. 1 illustrating the mirror housing incorporating a flashlight assembly.

Referring to FIG. 9, housing 126 of light assembly 124 is preferably made from a similar material to housing 112 so that when light assembly 124 is docked or mounted to housing 112, outer surface 126a of housing 126 blends with or matches outer surface 131 of housing 112. Lens 128 preferably includes an outer surface 128a which is substantially continuous with outer surface 126a of housing 126 and, further, includes a rounded end portion 128b, which generally follows the outer periphery 112e of housing 112. In this manner, when light assembly 124 is mounted to housing 112, light assembly 124 follows the contours of housing 112 and provides a smooth substantially continuous surface with outer surface 131 of housing 112. Examples of suitable materials for lens 128 are acrylic and polycarbonate.

Figure 11:
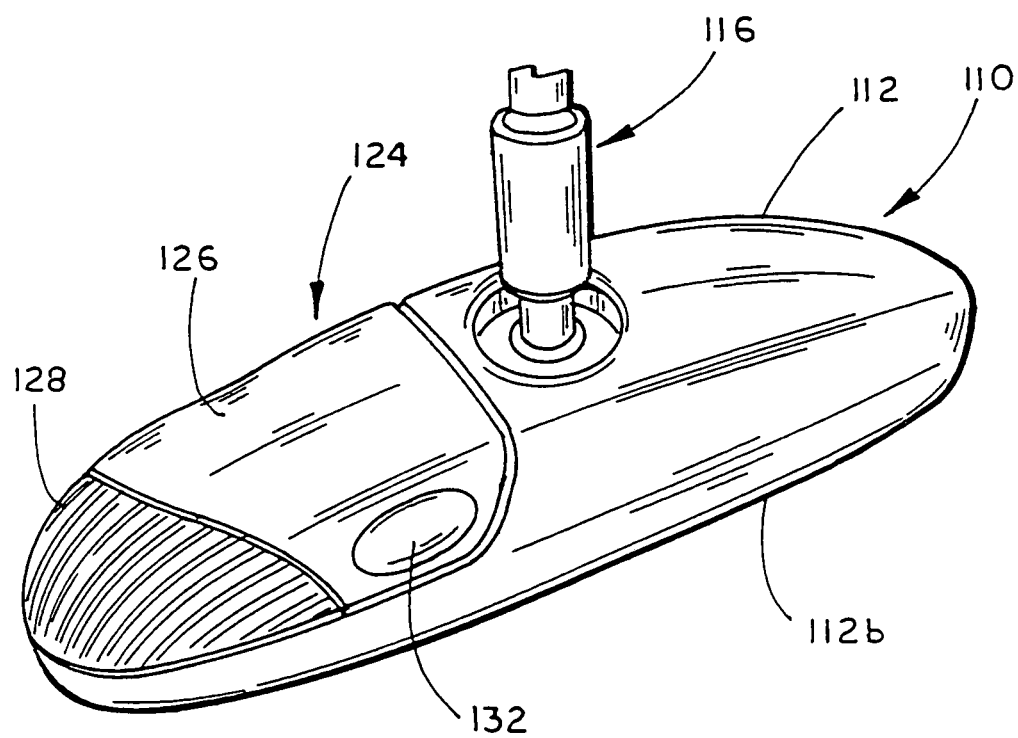
FIG. 11 is a top perspective view of the mirror of FIG. 9.
Figure 12:
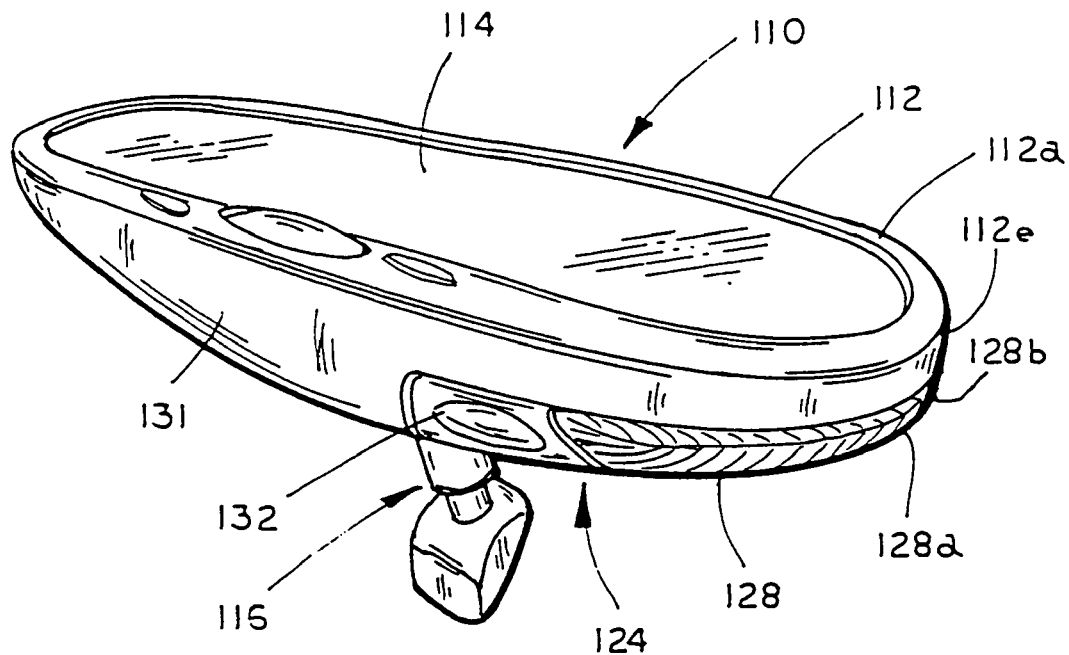
FIG. 12 is a bottom perspective view of the mirror assembly of FIG. 9.

As best understood from FIGS. 9 and 11, light assembly 124 optionally includes a pair of engagement surfaces 132, which provide tactile identification of assembly 124 so that assembly 124 can be quickly located without visual contact. In addition, engagement surfaces 132 provide gripping surfaces for the occupant so that light assembly 124 can be quickly disengaged from housing 112 or returned to or docked in its storage space on the rear wall or forward facing side of housing 112.

Figure 13:
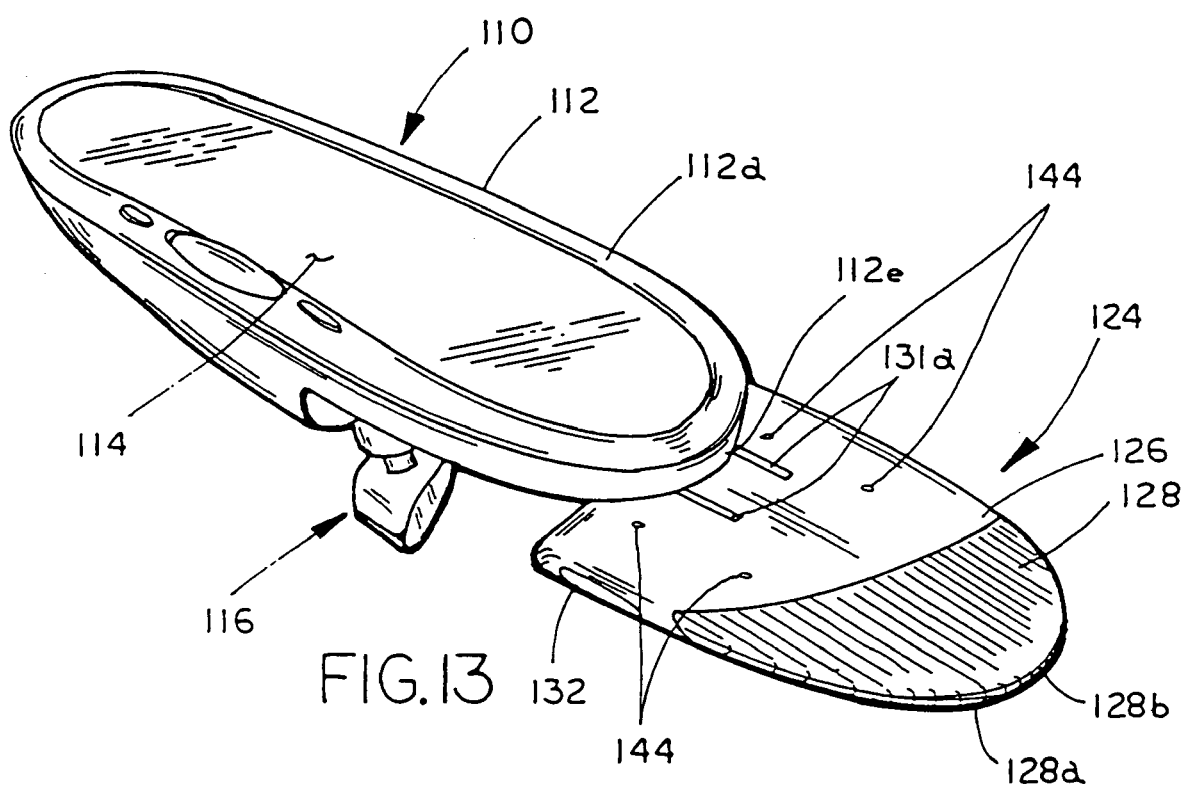
FIG. 13 is an exploded bottom perspective view of the mirror subassembly of FIG. 9.
Figure 14:
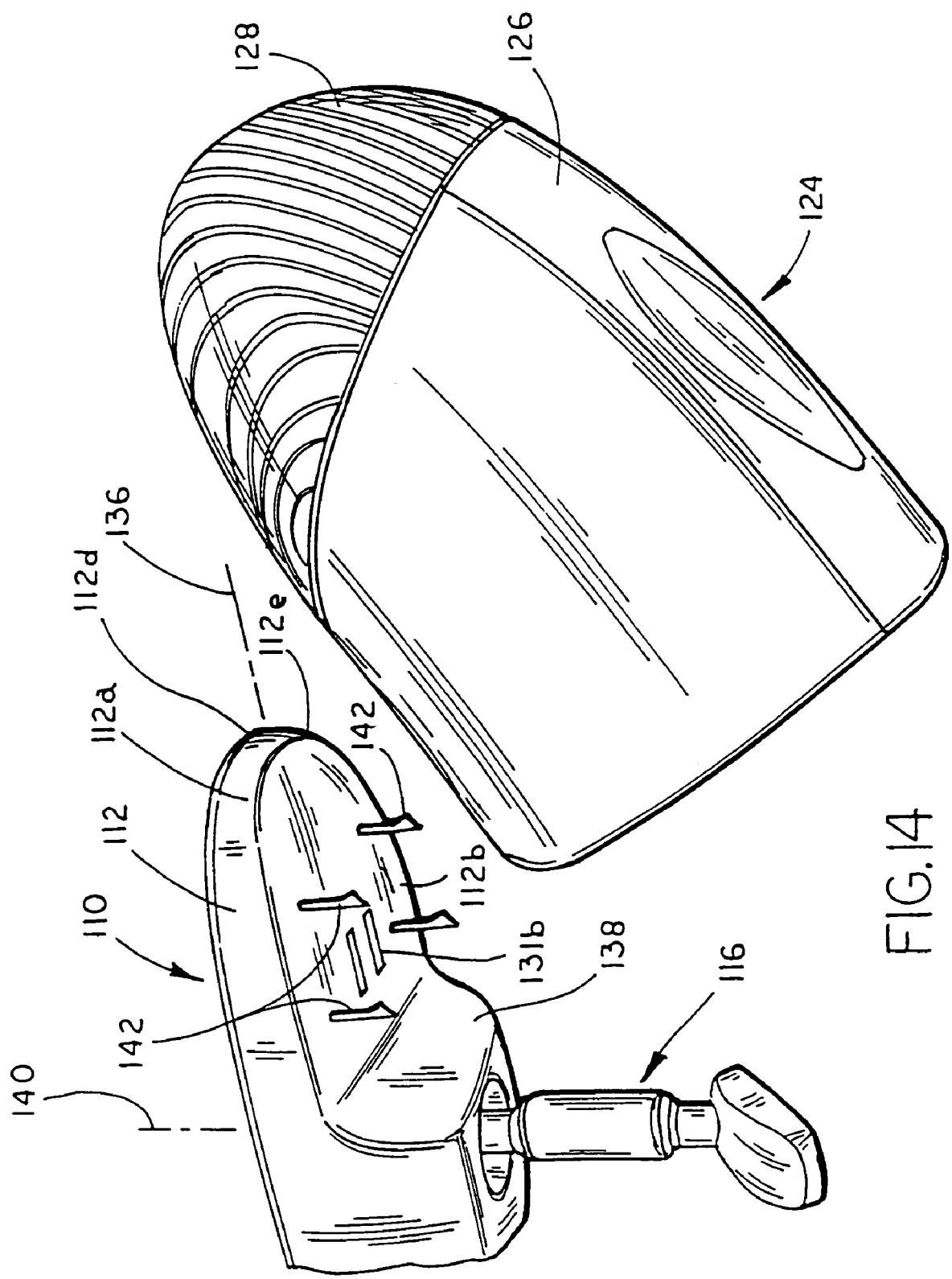
FIG. 14 is a partial rear exploded perspective view of the mirror assembly of FIG. 9.

In preferred form, storage space 122 is defined by a first generally planar recessed wall section 134 (FIG. 14) of housing 112 which extends along an axis 136. Axis 136 is generally parallel to the reflective element assembly 114. Planar surface 134 is bounded by upper and lower walls 112b and 112c and end wall 112d of housing 112 and, further, by a second planar recessed wall 138 of housing 112. In the preferred embodiment, second planar recessed wall 138 extends at a slight angle to an axis 140 (see FIG. 9) which is substantially orthogonal to axis 136 and to upper and lower walls 112b and 112c of housing 112. Similar to planar wall 134, planar wall 138 extends between upper and lower walls 112a and 112b to form with planar wall 134, a slightly open, L-shaped configuration. In preferred form, planar wall 134 includes one or more projecting members 142 (FIG. 14), for example bayonet type connectors, which extend outwardly from planar wall 134. In the illustrated embodiment, planar wall 134 includes four projecting members 142 for engaging corresponding receiving structures, for example openings 144 provided on housing 126 of light assembly 124 (FIG. 13). Receiving structures 144 are configured to receive projecting members 142 and to releasably couple light assembly 124 to housing 112, as would be understood by those skilled in the art. Alternately, housing 112 may include receiving structures with light assembly 124 including projecting members. Other releasable couplers which may be used include rails that provide a sliding arrangement of light assembly 124 onto housing 112. In addition, light assembly 124 may be coupled to housing 112 by a detachable fastener element, such as by Velcro or magnets or a combination of magnets and metal inserts or the like. In this manner, light assembly 124 may be quickly and easily removed from housing 112 for use by the operator or passenger of the vehicle.

Figure 15:
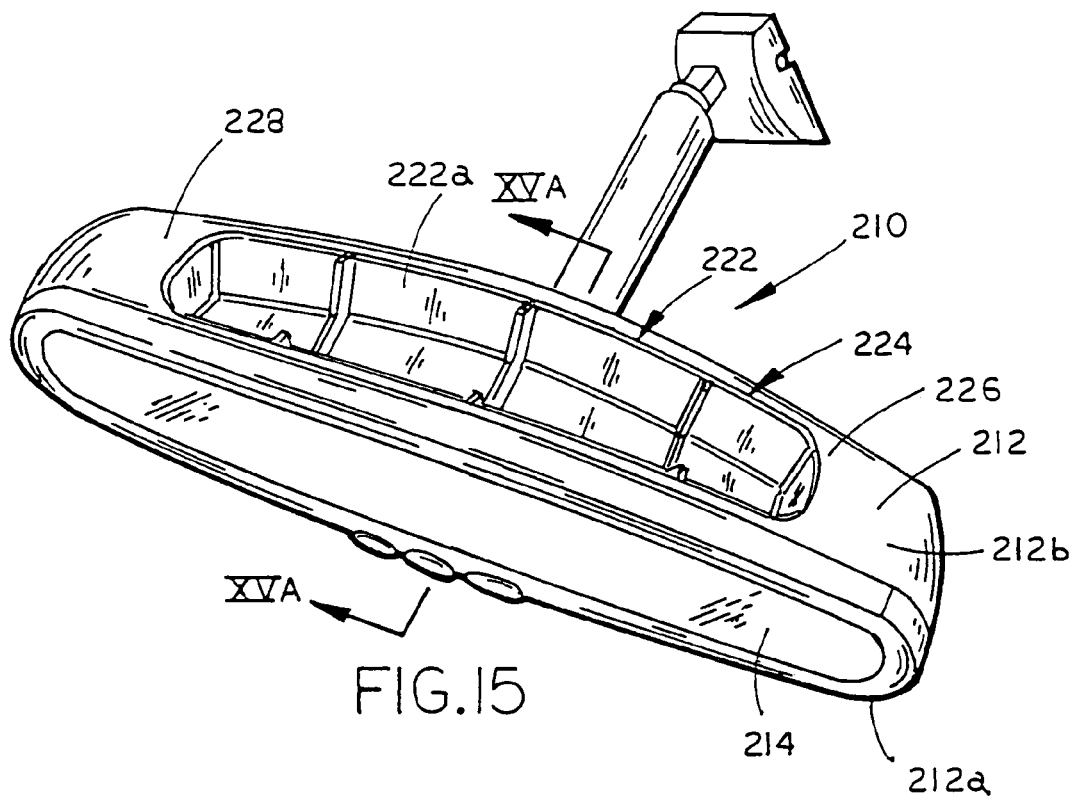
FIG. 15 is a top perspective view of a third embodiment of the rearview mirror assembly of FIG. 1 illustrating a recessed storage space for supporting or holding accessories.
Figure 15A:
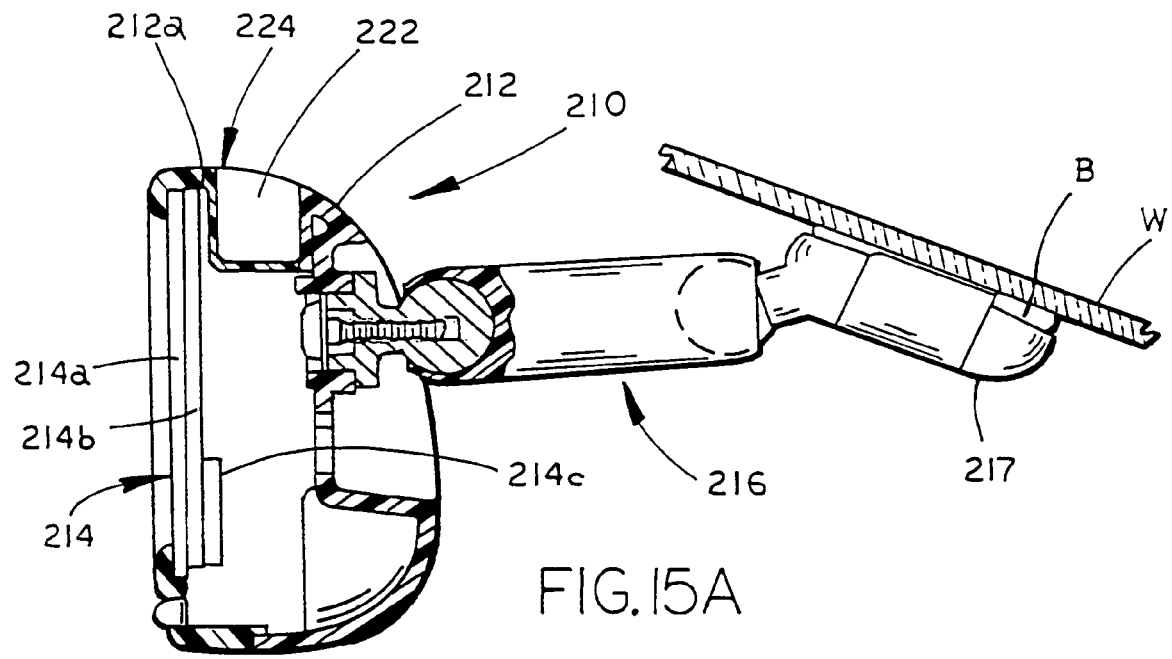
FIG. 15A is a partial fragmentary view taken along line XVA-XVA of FIG. 15.

Referring to FIGS. 15 and 15A, a third embodiment 210 of the rearview mirror assembly of the present invention is illustrated. Rearview mirror assembly 210 includes a mirror casing or housing 212 and a reflective element 214, similar to the first and second embodiments. Housing 212 is mounted to a windshield button B, which is adhered to windshield W in a conventional manner, by a break-away mounting bracket or mirror mount 217 and support arm 216. Reference is made to support arm 16 and bracket 17 for further details. As noted in reference to the first embodiment, mirror assembly 210 may be alternately mounted to a headliner of a vehicle, as would be understood by those skilled in the art. Housing 212 includes a bezel or retaining rim 212a which extends around the periphery of the rearward opening of housing 212 and over a peripheral edge portion of reflective element 214. Bezel 212a may optionally include one or more displays, buttons, or indicators, such as LEDs, as noted in reference to the first embodiment.

In the illustrated embodiment, mirror housing 212 includes a storage space 222 for storing accessories, for example sun glasses, tools, including pocket knives or Swiss army knives, pencils, keys, coins, paper money, credit cards, pass cards, including toll cards, access cards, parking permits, paperwork, such as registration or insurance papers, or the like. In addition, storage space 222 may be used for holding trash, such as scrap paper, food or candy wrappers, or the like. As used herein, "accessories" includes a wide range of objects that can be used by the driver or other occupants of the vehicle, including money, tools, including writing instruments, parking receipts, parking permits, glasses, gloves, cosmetics, paper products, such as writing pads, kleenex, facial tissues, cleaning products, such as wipes, eye glass cleaning supplies, cards, such as business cards, credit cards, access cards, or the like. It should be understood that this list of objects is not exhaustive and merely an example of the various objects that can be stored in the mirror location. In the illustrated embodiment, storage space 222 comprises an open storage space defined by a trough-shaped recess 224 which extends into top wall 212b of housing 212 and which includes an access opening 222a. It should be understood that the shape of the storage space may be adjusted as desired; for example, recess 224 forming the storage space may be cylindrical in order to provide a storage space for a cylindrical accessory such as a cup, container, or the like. In this manner, storage space 222 may provide a cup holding function. In the illustrated embodiment, opening 222a extends over the full length and width of recess 222. But, it should be understood that opening 222a may be reduced over either or both its length and width.

Figure 16:
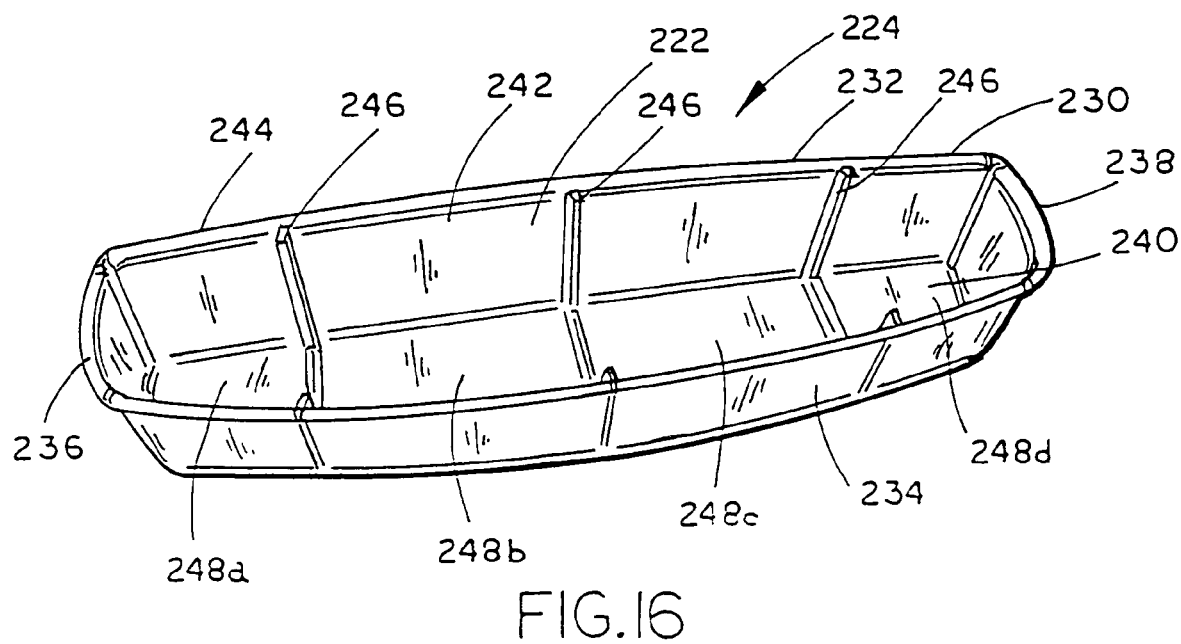
FIG. 16 is an enlarged perspective view of an insert module for inserting into the mirror assembly casing of FIG. 15 defining the recessed storage space.

Referring to FIG. 16, recess 224 comprises a plastic trough-shaped unitary body 230 which includes side walls 232 and 234, end walls 236 and 238, and a bottom wall 240. Extending around the open mouth 242 of body 230 is a lip 244 which may be formed or positioned on upper surface 228 of housing 212 to provide a tactile identification of recess 224. Alternately, lip 244 may be formed generally flush with upper surface 228 of upper wall 212b such that body 230 does not create any irregularities in the outline of casing 212. Optionally, case 212 may be molded with an opening formed in upper wall 212b, with the storage space 222 being separately molded and inserted into the opening of the case 212.

Preferably, the bin or tray may be adapted, such as by sizing, to have a snug fit into the opening whereby the bin or tray is removable for cleaning or substitution with alternate bin configurations. Alternately, the insert may be fixed in the opening, for example, by ultra sonically welding or by other suitable fastening methods, such as suitable adhesives, or releasable couplers such as snap fingers which are known in the art. Alternately, storage space 222 may be molded with the mirror case such that the upper wall of the mirror case is shaped so that the outer upper surface forms the bin.

Referring again to FIG. 16, body 230 may include one or more reinforcing ribs 246. Ribs 246 project inwardly from side walls 232, 234 and bottom wall 240 to form generally U-shaped dividers. In the illustrated embodiment, ribs 246 define four compartments or sub-spaces 248a, 248b, 248c, and 248d, which prevent shifting of smaller articles such as coins, keys, or the like in storage space 222 or along body 230. Furthermore, ribs 246 provide lateral support for glasses placed in body 230.

Referring to FIG. 15A, reflective element 214 may comprise an electrochromic element of an electrochromic element module. The electrochromic mirror element, for example, includes two substrates 214a and 214b (typically glass substrates) with an electrochromic medium 214d sandwiched between the substrates. The electrochromic element module preferably includes a printed circuit board (PCB) 214c which may be attached to its rear surface as shown in FIG. 15A, by for example an adhesive. An example of such an arrangement as disclosed in U.S. Pat. No. 5,820,245, commonly assigned to Donnelly Corporation, which is incorporated in its entirety by reference herein. The PCB optionally includes glare sensing and ambient photo sensors and assembly electrochromic circuitry that automatically dims the reflectivity of the electrochromic mirror element when glare conditions are detected at night time when mounted in the vehicle. Alternately, the PCB may be snap connected, by a clip or otherwise attached, to a plastic plate that itself is adhered to the electrochromic element. Importantly, the electrochromic module comprising the electrochromic reflective element and attached electronics, may provide scatter proofing means, and the like. Preferably, the electrochromic element module forms a relatively slim package, at its widest cross-section the package is preferably less than or equal to about 25 mm in dimension, more preferably less than or equal to about 15 mm in dimension, and most preferably less than or equal to about 8 mm in dimension. By placing, as shown in FIG. 15A, all necessary electronics and the reflector element forward in the case toward the driver, the space between the rear of the reflector module can be utilized for storage, such as by way of recess 224. As illustrated in FIG. 15A, the storage space 222 is located in case 212 at a location behind the reflective element 214. Preferably, the reflective element comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES, to Desaraju V. Varaprasad et al., now U.S. Pat. No. 6,154,306, the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or alloy of silver. Most preferably, the frontmost surface of the rear substrate (the third surface as known in the mirror art) is reflector coated with a high reflecting metal film such as of aluminum or silver, or an alloy of aluminum or alloy of silver. Also, and as illustrated in FIG. 15A, storage space 222 is located behind the reflective element 214, and is positioned in the space between the reflective element and the windshield W of the vehicle, when the interior rearview mirror assembly is mounted in the vehicle. Preferably, the trough-shaped storage space has a length dimension (parallel to the long dimension of casing 212) of at least about 3 inches, more preferably at least about 4 inches, most preferably at least about 5 inches, and a width dimension (perpendicular to the long dimension of casing 212) preferably of at least about 0.75 inches, more preferably at least about 1.5 inches, and most preferably of at least about 2.5 inches. Note that use and operation (such as coloration) of an electrochromic mirror element such as described above can reduce the effect of radio and electromagnetic interference on any electronic circuitry (such as circuitry for a video screen, automatic mirror dimming circuitry, sound processing circuitry, compass circuitry) disposed behind the electrochromic mirror element in the cavity of the casing of the interior rearview mirror assembly.

Optionally, the front surface of the front substrate (i.e. the first surface as known in the mirror art) 214a can be coated with a surface coating or otherwise modified so as to reduce the build-up of condensation or mist such as can occur in humid climates. For example, the front surface of the front substrate 214a (which is the surface upon which condensation/mist might gather or which would be subject to raindrops should the vehicle be a convertible and be driven with hood down during rain) may be optionally coated with a water wetting characteristic modification coating such as a hydrophilic coating such as a photocatalytic hydrophilic coating system such as is disclosed in Japanese Pat. Abstract JP11050006A, issued Feb. 23, 1999, entitled PRETREATMENT OF SURFACE FORMING PHOTOCATALYTIC HYDROPHILIC FILM AND CLEANING AGENT AND UNDERCOATING COMPOSITION USED THEREIN, to Mitsumasa et al. of Toto Ltd, and in JP10330131A, issued Dec. 15, 1998, entitled HYDROPHILIC THIN FILM AND VEHICULAR MIRROR AND GLASS PRODUCT USING THE SAME HYDROPHILIC THIN FILM, to Tsutomu et al of Ichikoh Ind. Ltd, and in JP 10036144A, issued Feb. 10, 1998, entitled ANTIFOGGING ELEMENT, to Toru et al of Murakami Corporation, and in U.S. Pat. No. 5,724,187, issued Mar. 3, 1998, entitled ELECTROCHROMIC MIRRORS AND DEVICES, to Varaprasad et al. of Donnelly Corporation, the entire disclosures of which are hereby incorporated by reference herein. Also, such wetting characteristic modification coatings and techniques, such as photocatalytic hydrophilic coatings, can be used for the first (frontmost) surface of a non-electrochromic reflective element such as a prismatic interior mirror reflective element (and for the first surface of electrochromic exterior mirror reflective elements and of metal coated, such as chromium coated, exterior non-electrochromic mirror reflective elements).

Figure 16A:
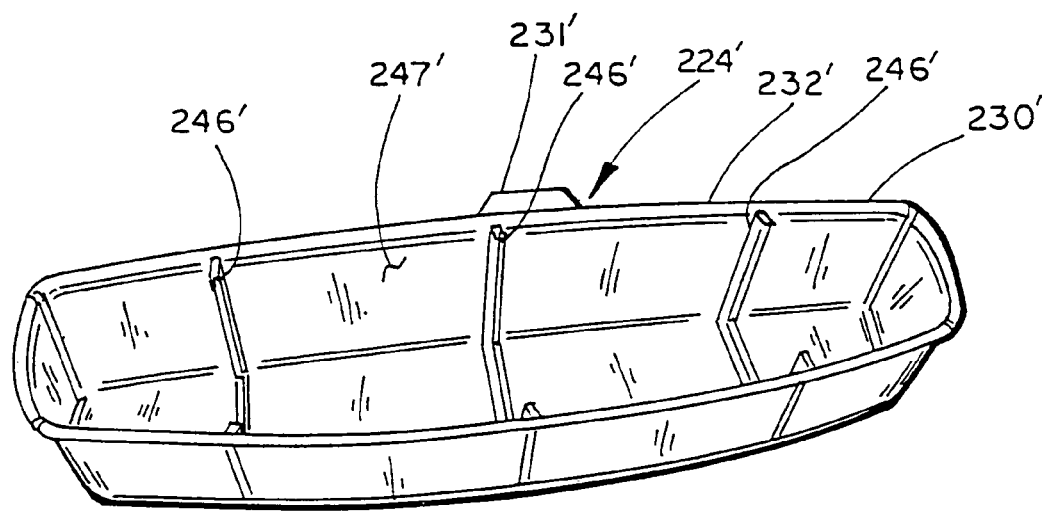
FIG. 16A is an enlarged perspective view of a removable insert for inserting into the storage space of the mirror assembly casing of FIGS. 15 and 16.

Referring to FIG. 16A, the numeral 224' generally designates an insert which may be placed in recess 224 of the previous embodiment. It should be understood, that when insert 224' is incorporated, ribs 246 may be omitted from recess 224. As best seen in FIG. 16A, insert 224' includes a trough shaped unitary body 230' similar to recess 224 described in reference to FIG. 16. In the illustrated embodiment, body 230' includes one or more tabs 231' which extend upwardly from side wall 232' to ease removal of insert 224' from recess 224. Preferably, each tab 231' has a low profile to minimize distraction to the driver. Alternately, side 232' may include a raised lip to form a gripping surface so that the insert can be gripped and withdrawn from casing 212. It should be understood the insert 224' may be customized to suit the specific needs of the driver or purchaser of the vehicle. For example, body 230' may include a plurality of ribs 246' similar to ribs 246 in order to at least partially compartmentalize the space 247' in body 230'. In addition, body 230' may be formed from a flexible material, such as an elastomeric material, including, for example, rubber, which increases the flexibility of body 230' to ease insertion and removal from recess 224. In addition, by forming body 230' by a resilient material, body 230' absorbs some impact and reduces the potential for noise being generated by articles held loosely in insert 224' and/or from their vibration when accommodated in space 247'. It can be appreciated that the shape, number, and size of the compartments may be varied to achieve the specific needs of the customer. It should be understood further that the customer may be provided with a number of inserts to accommodate the various needs, for example an insert for glasses, an insert for holding other articles including coins, workpieces (such as a writing instrument such as a pen, pencil or biro), debris/trash or the like. Furthermore, insert 224' can be colored different than mirror casing 212 to provide quick identification of the location of the insert.

Thus, by providing a raised lip portion or by color coding or the like, a mirror-casing storage compartment identifier is provided that affirmatively but preferably unobtrusively draws the driver's and/or passenger's attention to the location and availability of the in-casing storage of the interior rearview mirror assembly. Optionally, a text or icon identifier (such as, for example, "TRASH") can be printed or otherwise provided along the top bezel portion or the mirror casing or on any extended lip portion of the insert, as described above, in order to inform of the utility availability. Thus, for example, a driver hiring a rental car, and unwrapping the wrapping from a piece of chewing gum, can, upon noticing via the mirror-casing storage compartment identifier that a trash receptacle is available within the interior mirror casing itself, can chose to place the gum wrapper into the trough provided in the mirror casing. Debris placed here is not visible to the driver and/or other occupants of the vehicle due to the high-mounted location within the vehicle cabin of the interior mirror assembly, and so a clean and tidy interior cabin is maintained while still providing a trash receptacle. When the mirror-located trash receptacle is near full, the driver simply removes the insert, disposes of the accumulated trash therein by depositing it into an external trash receptacle, and then replaces the now emptied insert into the trough-like storage space provided within the casing of the interior rearview mirror assembly.

The present embodiment provides a rearview mirror assembly with a storage location that is easy to reach and, further, when used does not cause the driver to redirect his or her eyes far, or if at all, from the front of the vehicle. The use of a mirror location also minimizes eye strain. In this manner, the unused space behind the electrochromic reflective element mirror assembly is optimally used. Furthermore, since the mirror assembly is a known location in the vehicle, drivers can reach up to the mirror assembly without mental distraction since the movement is essentially a reflex action or an automatic movement which does not require much, if any, concentration from the driver. Therefore, the mirror assembly 210 which is centrally mounted provides an ideal location for storage space and does not obstruct the driver's view.

Referring to FIG. 17, a fourth embodiment 310 of the interior rearview mirror assembly of the present invention is illustrated. Similar to the previous embodiments, rearview mirror assembly 310 includes a mirror casing or housing 312 and a reflective element 314, which is mounted to a windshield button by a support 316. Reference is made to the first embodiment for details of reflective element 314, optional components on or in housing 312, and suitable material for housing 312.

Assembly 310 includes a storage space 322 incorporated into housing 312, which like the previous embodiment is easily accessible to the driver or other occupants of the vehicle without creating much, if any, distraction or obstruction to the driver's view. In the illustrated embodiment, reflective element 314 is mounted to a bezel portion or retaining rim 312a which supports reflective element assembly 314 in housing 312. Storage space 322 is provided by a storage bin 324 which is mounted to bezel 312a to provide a compartment within housing 312. Referring to FIG. 18, bezel 312a is pivotally mounted to housing 312 by one or more hinge connections 326 (only one shown). In this manner, bezel 312a comprises a pivotal door or hatch that provides access to the inside of casing 312. Hinge connections 326 are preferably mounted rearward of bezel 312a so that hinges 326 are hidden from a vehicle occupant's view. For example, each hinge 326 preferably comprises a pair of tabs or flanges 328, which are formed or welded to the rearward surface of bezel 312a, and corresponding tabs or flanges 330, which are welded to the lower wall 332 of housing 312. Tabs 328 and 330 are pivotally coupled together by a pin 334 which extends through the respective tabs or flanges to permit bezel 312a, reflective element 314, and bin 324 to be moved between a closed position, in which storage bin 324 is contained within housing 312 and reflective element 314 is positioned for rearward viewing, and an open position illustrated in FIGS. 17 and 18 to provide access to storage space 322. Storage space 322, therefore, provides storage for accessories such as glasses, pens, money, keys, or the like similar to the previous embodiment. Storage space 322 can also serve as a waste bin, and in this regard, it is preferable that the bin be removable for cleaning.

In the illustrated embodiment, bin 324 extends substantially the full length of the interior housing 312; however, it can be appreciated that bin 324 may be shaped or shortened to accommodate components within housing 312, for example electrical wiring or other components described in reference to the first embodiment of interior rearview mirror assembly 10.

In preferred form, bezel 312a supports a latch, such as a spring bias latch 336 for engaging an engagement structure 338 provided on housing 312. Engagement structure 338 comprises a U-shaped loop with an engagement surface or opening to receive latch 336. Preferably, latch 336 and engagement structure 338 are located at peripheral portion 340 of opening 342 of housing 312. Most preferably, latch 336 lies in the same plane as bezel 312a when in the locked position so that it does not create a discontinuity in the outline of the mirror assembly and potentially create a distraction to the driver. It should be understood, that bezel 312a may be biased in its closed position by a spring biased hinge, thus eliminating the need for a latch. In addition, it can be appreciated that the size and shape of bin 324 may be varied and, furthermore, may be compartmentalized with intermediate walls or ribs, as noted in reference to the previous embodiment.

Figure 19:
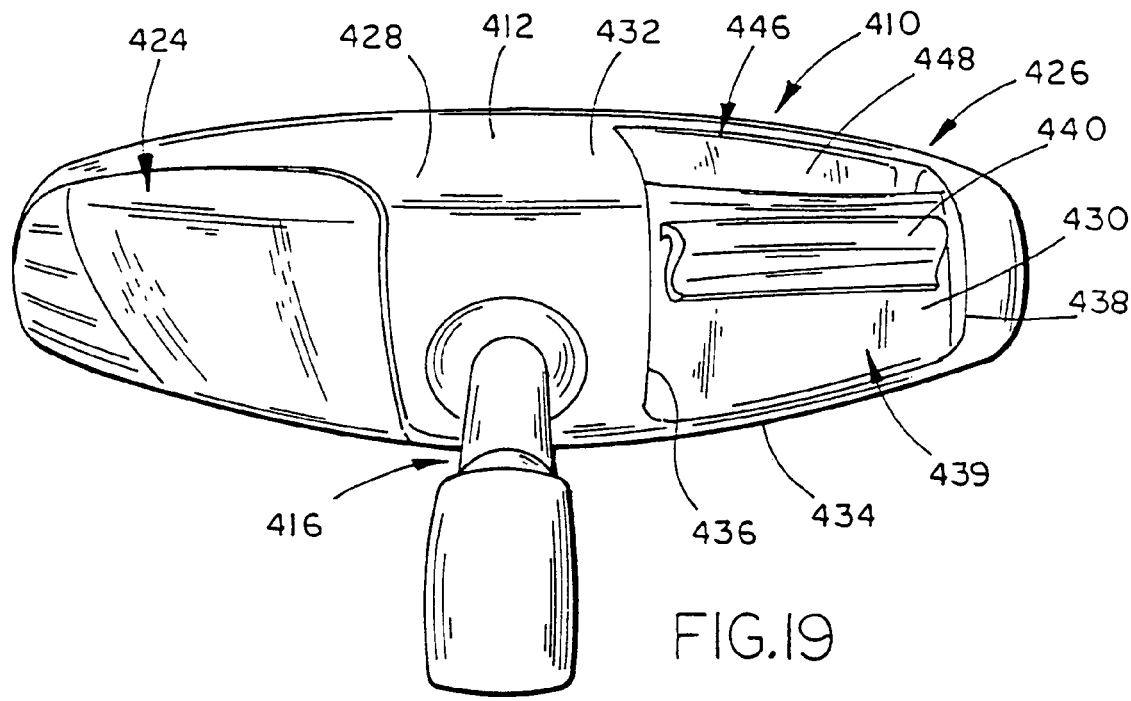
FIG. 19 is a rear perspective view of a fifth embodiment of the interior rearview mirror assembly of FIG. 1 illustrating a flashlight assembly module mounted to a first storage space and a second storage space with a clip for holding an accessory and a third storage space for holding other accessories.

A fifth embodiment 410 of the rearview mirror assembly of the present invention is illustrated in FIG. 19. Rearview mirror assembly 410 is of similar construction to mirror assembly 10 and includes a housing 412, a support 416 and mounting bracket, for mounting housing 412 to a windshield button or the like, a reflective element (not shown), and a bezel (not shown). Mounted to a forward facing side or rear wall 428 of housing 412 is a light assembly 424, similar to light assembly 124. Therefore, reference is made to assembly 110 for details on light assembly 424 and other dockable accessories and their preferred mounting arrangements to housing 412.

In the illustrated embodiment, housing 412 includes a second storage space 426 which is provided on forward facing side or rear wall 428 of housing 412. Storage space 426 is defined by a recessed area in back wall 430 which extends from an upper wall 432 of housing 412 to a lower wall 434 of housing 412. Back wall 430 is generally planar and extends between two opposed side walls 436 and 438 which extend inwardly to form, together with back wall 430, recess 439. Projecting outwardly from back wall 430 is another storage space provided by an accessory attachment member 440, such as a clip for supporting generally flat accessories, such as a toll card, an access card, a parking ticket, a note pad, insurance or registration papers, maps, or the like. Preferably, such a clip positively grips the accessory such as by spring tension action or the like onto back wall 430, such that the accessory is easily insertable and detachable or removable from the accessory attachment member. In the illustrated embodiment, accessory attachment member 440 extends substantially over back wall 430 between side walls 436 and 438, but it should be understood that attachment member 440 may be shortened and extend over a smaller distance while still providing the same function.

In preferred form, attachment member 440 comprises a plastic material similar to housing 412. Attachment member 440 may be mounted to back wall 430 either by an adhesive or fasteners or the like. Moreover, attachment member 440 may be welded to back wall 430. Preferably, attachment member 440 is molded together with housing 412. Alternately, attachment member 440 may comprise a metal clip, which is secured by adhesives or other fastening means to housing 412.

Optionally, housing 412 may include a fourth storage space 446 provided on rear wall 428 for storing other accessories including, for example coins, tokens, workpieces, such as pens, pencils, tools, pen lights, cassettes, CD's, a pager, paper work, or the like. In the illustrated embodiment, fourth storage space 446 comprises an elongated cavity or recess 448 formed in upper wall 432 of housing 412 which extends between end walls 436 and 438 behind a back wall 430. Recess 448 may extend the full height of back wall 430 or may terminate at some intermediate height behind back wall 430. It should be understood that storage space 446 may include intermediate ribs or intermediate walls to define separate compartments within storage space 446, as described in reference to mirror assembly 210.

Figure 20:
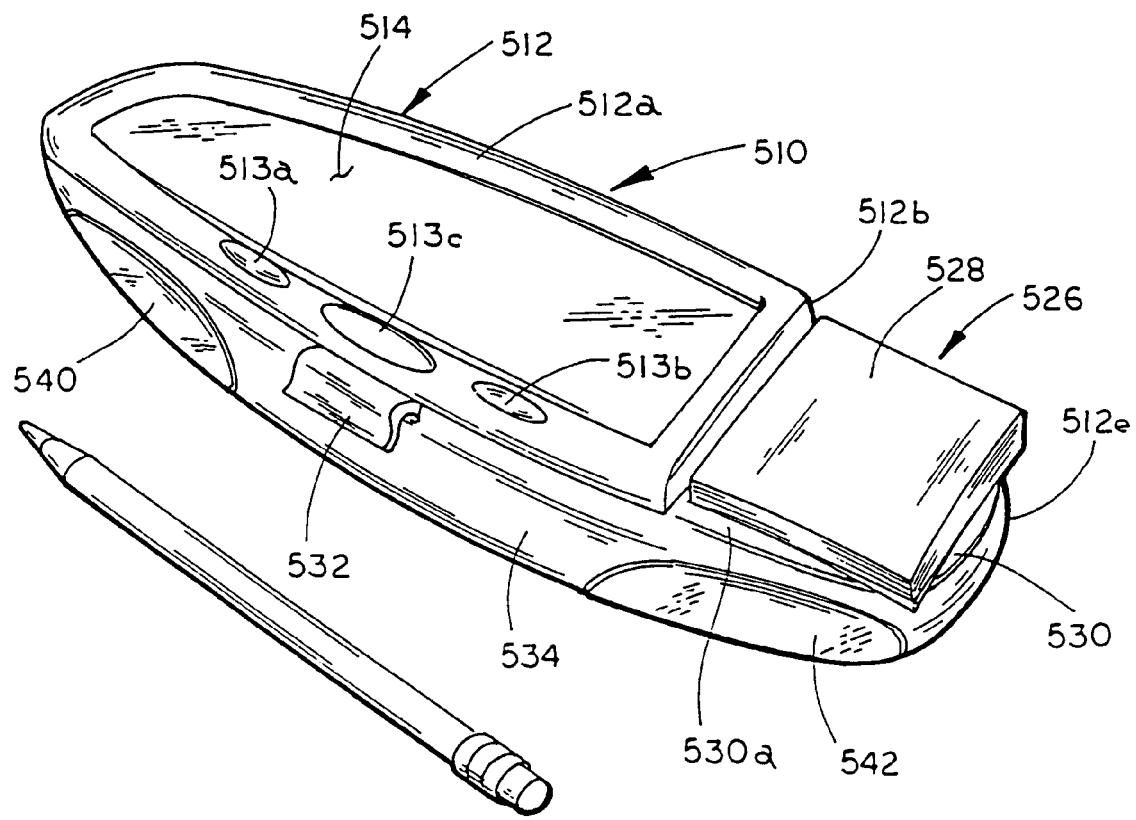
FIG. 20 is a bottom perspective view of a sixth embodiment of the mirror assembly of FIG. 1 illustrating a workpiece holder and a writing pad holder incorporated into the housing of the rearview mirror assembly and, further, with two map or dash board light assemblies.

A sixth embodiment 510 of the interior rearview mirror assembly of the present invention is illustrated in FIG. 20. Rearview mirror assembly 510 includes a mirror casing or housing 512, with a retaining rim or bezel 512a, and a reflective element 514, similar to the previous embodiments. Housing 512 may be mounted to the vehicle windshield, headliner or the like as described in reference to housing 12. Bezel 512a extends around the peripheral portion reflective element 514 and optionally includes buttons 513a, indicators 513b, or displays 513c which are commonly known in the art. Similar to the previous embodiment, rearview mirror assembly 510 includes a storage space 526 for supporting an accessory, such as a writing pad 528, a pager, or the like thereon. Storage space 526 is formed on a front side 530 of housing 512 and is preferably formed by a planar surface 530a adjacent bezel 512a. Bezel 512a includes a planar segment 512b which terminates along with reflective element 514 inwardly of peripheral portion 512e of housing 512. In this manner, pad 528 may lay substantially flush with bezel 512a to reduce the visual impact of the pad to the driver thereby minimizing the distraction to the driver. Pad 528 may comprise, for example a sticky note pad, and, therefore, be adhered to planar surface 530a by the adhesive provided on the back of most conventional sticky note pads. Alternately, surface 530 may include other releasable fasteners, such as Velcro or a clip or other retaining structures to secure pad 528 to surface 530a, some examples of which are described in reference to the embodiment shown in FIGS. 19 and 24. Furthermore, housing 512 may include a recess behind planar surface to receive clips' of a pager or the like.

Optionally positioned below the chin area of bezel 512a is another storage space provided by an accessory attachment member 532, such as a workpiece or writing instrument holder, such as a clip. For example, such a clip preferably positively grips the accessory, such as the pen or pencil, typically by spring tension action or the like between pliant fingers or arms, such that the accessory, such as a pen, is readily insertable and detachable/removable from the accessory attachment member. Attachment member 532 may hold a pencil or pen, or alternately another elongated item such as a pen-type flashlight, a tire pressure gauge, or the like. Attachment member 532 may be secured to housing 512 by an adhesive, or a releasable fastener, such as Velcro, or other fastening means. Preferably, attachment member 532 is plastic and is molded with a lower wall 534 of housing 512. Attachment member 532 lays generally flat and aligns with top surface 530 of housing 512 to minimize the protrusion and, therefore, the distraction to the driver.

In addition, housing 512 may support one or more map illuminating or dashboard illuminating lights 540 and 542, for example such as lights disclosed in U.S. Pat. No. 5,820,245, which is incorporated by reference herein in its entirety.

Figure 21:
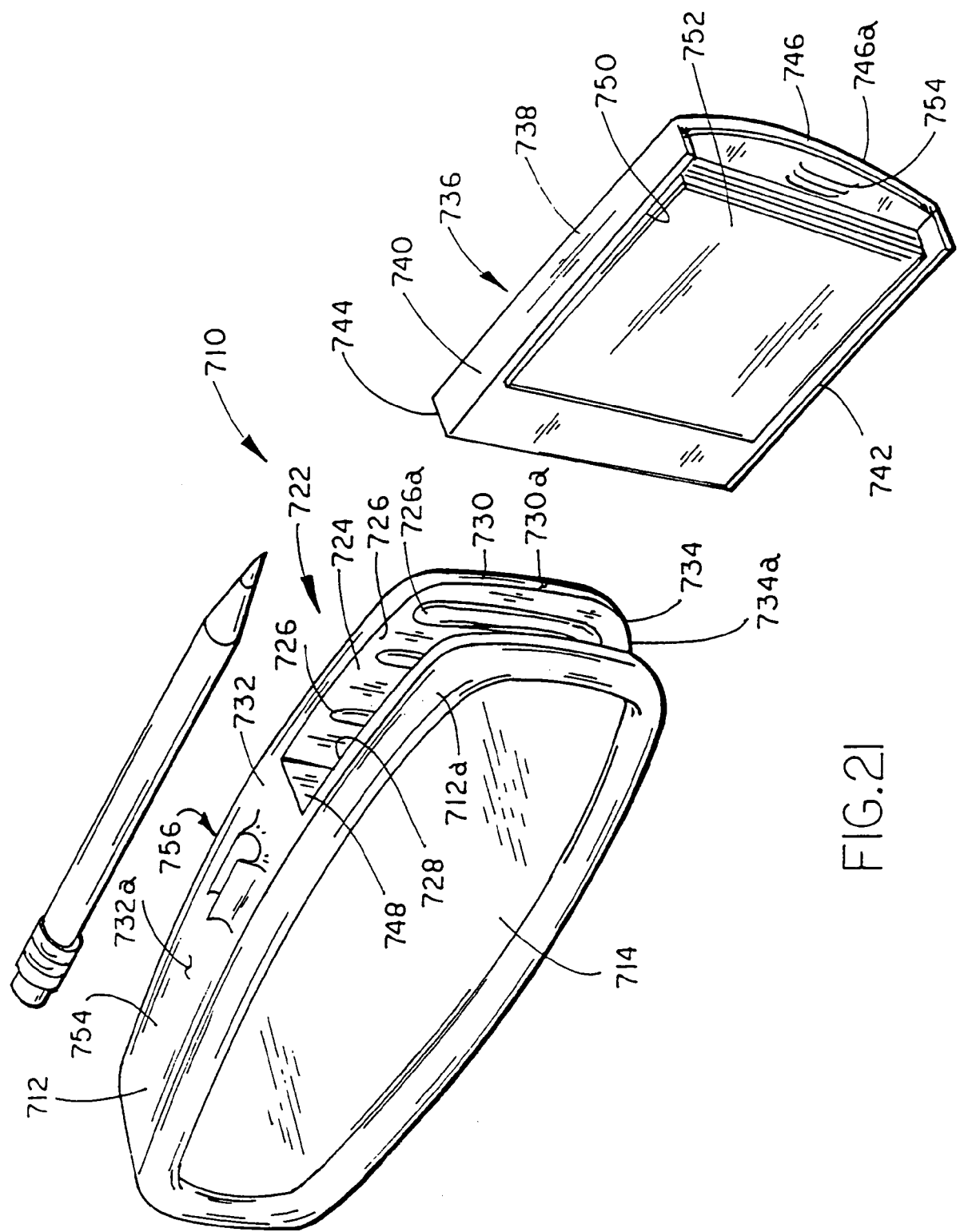
FIG. 21 is a front exploded perspective view of a seventh embodiment of a mirror assembly similar to FIG. 1 illustrating a slotted storage space for holding an accessory holder, such as a writing pad holder.

Referring to FIG. 21, a seventh embodiment 710 of the interior rearview mirror assembly of the present invention is illustrated. Mirror assembly 710 includes a mirror casing or housing 712, a retaining rim or bezel 712a, and a reflective element 714. Reference is made to the first embodiment for description of the housing and bezel material, and reflective element 714 and, further, for preferred mounting arrangements of housing 712 to the vehicle. In the illustrated embodiment, housing 712 includes a storage space 722 which is defined by a slotted recessed portion 724, which extends into housing 712 from end wall 730 of housing 712. Recessed portion 724 is formed between opposed walls 726 and 728 and extends between upper wall 732 and lower wall 734 of housing 712 to define a receptacle for an accessory holder 736. Accessory holder 736 may support or hold a plurality of accessories, including for example, cards, paper work, documents, such as insurance or registration papers, writing pads, maps, and the like. In the illustrated embodiment, accessory holder 736 comprises a writing pad holder and includes a molded body 738 having upper and lower walls 740 and 742 which align and follow the contour of housing 712. In most preferred form, walls 740 and 742 are flush with outer surface 732a, 734a of upper and lower walls 732 and 734, respectively, when holder 736 is inserted into recess 724. Body 738 also includes an end wall 744 and a back wall 746, with end wall 744 abutting an inner wall 748 of recess 724 when holder 736 is fully inserted into recess 724. Distal edge 746a of back wall 746 also preferably follows the contour of housing 712 and, most preferably, is generally flush with outer surface 730a of end wall 730 of housing 712 when holder 736 is inserted into storage space 722.

Back wall 746 defines a storage space 750 between end wall 744 and upper and lower walls 740 and 742, which is preferably sized to hold a writing pad 752, such as a sticky note pad. Pad 752 may be held in place by the adhesive back, Velcro, or may be held in place by friction between the edges of pad 752 and upper and lower walls 740 and 742. In addition, back wall 746 preferably includes a gripping surface 754 to permit tactile identification of holder 736 by the driver of the vehicle, thus minimizing the distraction to the driver. For example, gripping surface 754 may comprise one or more projecting ribs or recessed grooves. In addition, gripping surfaces 754 provides improved gripping of body 738. In this manner, body 738 can be grabbed without requiring the operator of the vehicle to take his or her eyes off the front of the vehicle.

Holder 736 is held in recess 724 preferably by friction. For example, as shown in the illustrated embodiment, side wall 726 includes a plurality of ribs 726a which project inwardly toward holder 736 to provide a frictional force between housing 712 and holder 736 (FIG. 21). Ribs 726a may comprise, for example resilient ribs, such as rubber ribs, to provide enhanced friction. Alternately, one or more walls 726 and 728 may support a spring for biasing holder against wall 726 or 728 for frictionally holding holder 736 in recess 724.

Housing 712 may optionally include a second storage space defined by an accessory attachment member 756 which is preferably molded to upper housing wall 732. Optionally, attachment member 756 may be separately formed and adhered to upper wall 732 by an adhesive or by a detachable or releasable fastener, such as Velcro, or any other fastening means. Attachment member 756 includes resilient arms which form a clip and provides a convenient location for storing a tool or workpiece, such as a pencil or pen, which can be easily retrieved by an occupant of the vehicle for use with pad 752. It should be understood that attachment member 756 may be located, for example, below bezel 712a in the chin area of mirror casing 712, or on forward facing side or rear wall 754 of housing 712, or on an end wall of housing 712.

Figure 22:
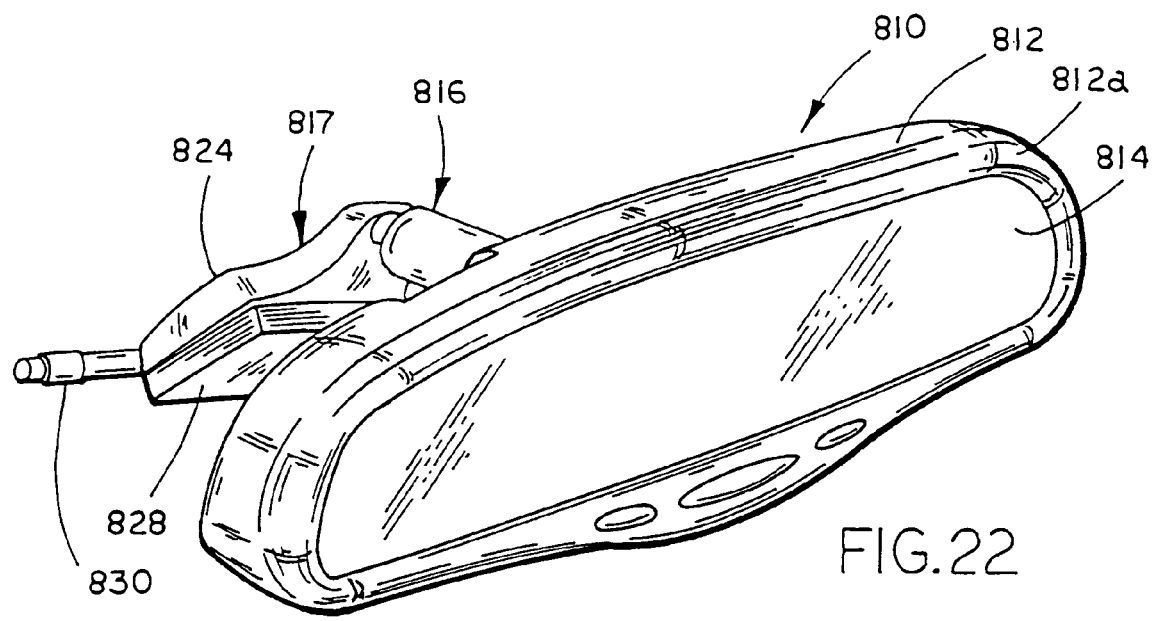
FIG. 22 is a perspective view of an eighth embodiment of the interior rearview mirror assembly incorporating a pad and pencil holder into a mirror mounting bracket.

Referring to FIG. 22, a ninth embodiment 810 of the interior rearview mirror assembly of the present invention is illustrated. Rearview mirror assembly 810 includes a mirror housing 812, a bezel 812a, and a reflective element assembly 814, similar to the previous embodiments. In the illustrated embodiment, housing 812 is supported by a support arm 816 with a modified break-away mounting bracket or mirror mount 817. In the illustrated embodiment, support arm 816 includes a pair of ball mounts 824a and 824b for extending into a receiving socket on housing 812 and into a receiving socket in bracket 817.

Figure 23:
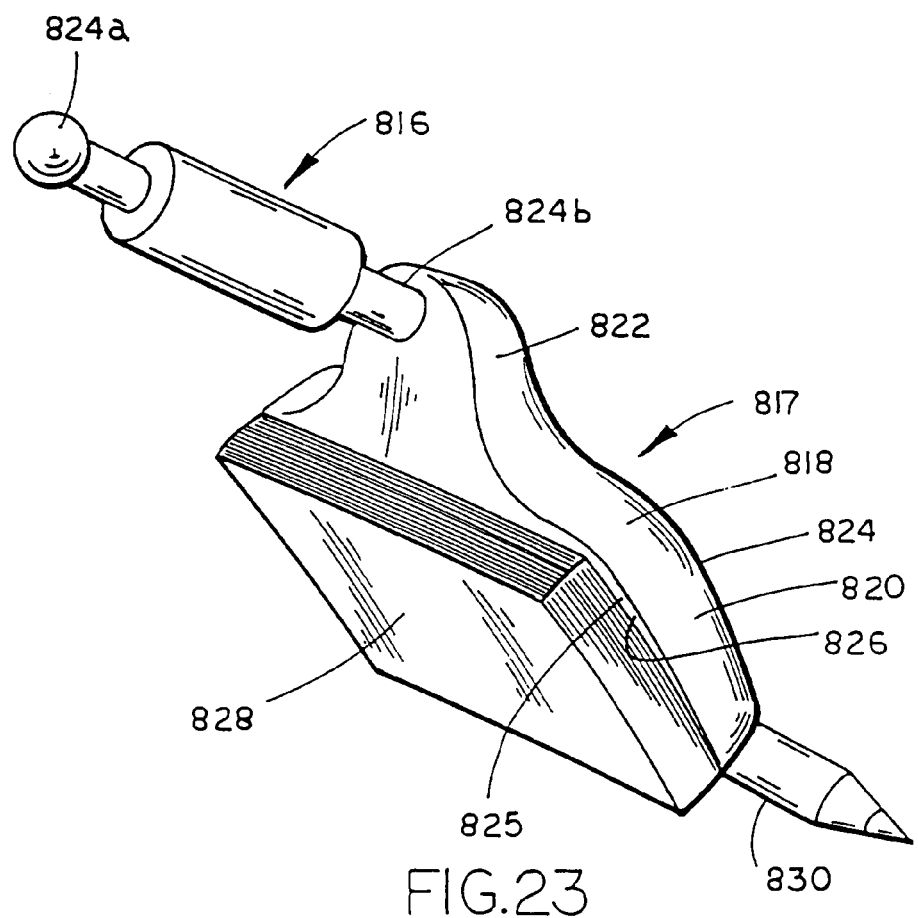
FIG. 23 is a perspective view of the paper and pencil holder of FIG. 22.

As best seen in FIG. 23, break-away mounting bracket 817 includes a body 818 with a generally planar base portion 820 and an upwardly extending tapered portion 822 having a spherical socket or receptacle into which ball mount 824b projects to permit repositioning of interior mirror housing 812 about bracket 817. Body 818 includes a windshield facing side 824, which is configured to releasably mount to a conventional windshield mounted button, for example, a button such as described in U.S. Pat. No. 5,820,097, the disclosure of which is incorporated by reference herein. Body 818 further includes a rearward facing planar surface 825 which defines a storage surface 826 for storing an accessory, such as a writing pad 828, such as a sticky note pad. In this manner, when assembly 810 is mounted to a vehicle windshield or headliner, pad 828 is easily accessible by the driver or occupant of the vehicle and, furthermore, is located in a known location that does not obstruct the driver's view. Preferably, pad 828 is adhered to planar surface 825 by the adhesive provided on most conventional sticky note pads. Alternately, pad 828 may be mounted by a releasable fastener, such as Velcro, or may include a stiff backing member for inserting into a corresponding receiving structure provided on planar surface 825, as will be understood by those skilled in the art.

In addition, body 818 preferably includes another storage space provided by an accessory attachment member similar to that shown at 440, 532 or 756 above, or one or more tubular members formed on bottom wall 818a of body 818 for holding a tool or workpiece 830, such as a writing instrument, for example a pen or pencil or the like. Preferably, such attachment members are integrally molded with body 818; however, it can be appreciated that the attachment member may be adhered to body 818 by a suitable adhesive or fasteners. Reference is made to the previous embodiments for examples of suitable attachment members, such as clips or workpiece holders. It should be understood from the foregoing, that pad 828 and pencil 830 are conveniently placed behind the rearview mirror housing 812 and thus do not obstruct the view of the driver of the vehicle. Furthermore, by positioning pad 828 and pencil 830 on the mirror mounting bracket, minimal, if any, distraction is required to access or to retrieve the pad or pencil since the pad and pencil are located in a known location in the vehicle.

Figure 24:
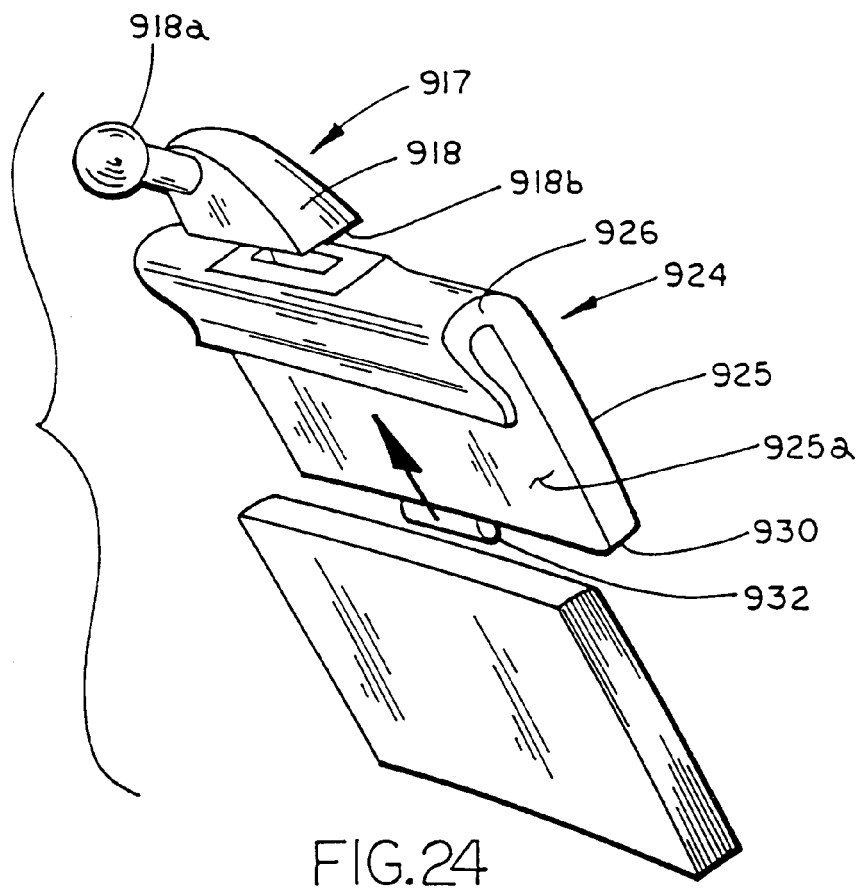
FIG. 24 is an exploded perspective view of a second embodiment of the paper and pencil holder.

Referring to FIG. 24, a second embodiment 917 of a mirror mounting bracket or mirror mount is illustrated. Mirror mounting bracket 917 may be used in conjunction with any one of the illustrated embodiments of the interior rearview mirror assemblies and, further, with other interior rearview mirror assemblies. Mirror mounting bracket 917 includes a body 918 which supports a ball member 918a and is adapted to provide a break-away mount to a conventional windshield mounted button, as described in reference to the previous embodiment. Ball member 918a is engaged by a support arm (not shown) similar to support arm 16. Extending from a lower end 918b of body 918 is a storage space provided by a pendent accessory holder 924, such as a note pad holder, a map holder, or a holder for other generally flat accessories, for example a writing pad, a plastic card, such as a credit card, an access card or a toll card, or the like. Holder 924 includes a body with a planar portion 925 and an accessory attachment member 926, such as a clip, formed at an upper end of planar portion 925 which projects downwardly and together with planar surface 925a of planar portion 925 forms a storage space for supporting an accessory.

Holder 924 may be mounted to telescope from bracket 917. For example, holder 924 may be mounted on a telescoping member or jack action or the like, or move down to an extended position below the mirror casing and then retract for storage. When holder 924 is extended down, holder 924 may include a foldable support or finger, which can be selectively moved to extend from the windshield facing side of holder 924 to touch the window to provide support when holder 924 is in its extended position. In this manner, holder 924 provides a firm or substantially rigid writing surface even when the holder is extended. Optionally, holder 924 may be pivotally mounted to the mirror mounting bracket for reorienting toward the driver or other occupants of the vehicle. In addition, accessory attachment member 926 can be located elsewhere on the mirror assembly. For example, attachment member 926 may be located on the mirror case, such as on the rear wall or forward facing side of the casing. By providing a spring-loaded element, such as spring-loaded gripping fingers, to the pendent accessory, a map can be held below the mirror assembly when mounted in the vehicle in a position readily viewable by the driver.

Optionally, holder 924 may be integrally molded with body 918 of mirror mounting bracket 917. However, it can be appreciated that holder 924 may be secured to bottom surface 918*a* of body 918 by an adhesive or other suitable fastening means. Preferably mounted to a lower end 930 of planar portion 925 is a second storage space provided by a second accessory attachment member 932, such as a workpiece attachment member, for example a clip which positively holds the accessory, for example by tension between two flexible fingers or arms or the like. Attachment member 932 may comprise an integrally molded member having a generally C-shaped cross section similar to attachment member 756 described in reference to FIG. 21 or include a J-shaped body similar to attachment member 532 illustrated in FIG. 20. Alternately, attachment member 932 may comprise a tubular member with an elongated cylindrical passage for holding a workpiece or a pair of cylindrical or ring shaped members, which are aligned to define a pair of spaced apart support surfaces for a workpiece, such as a pencil, pen, pressure gauge, pen-light or the like, such as those shown at 440, 532 or 756 above.

Figure 25:
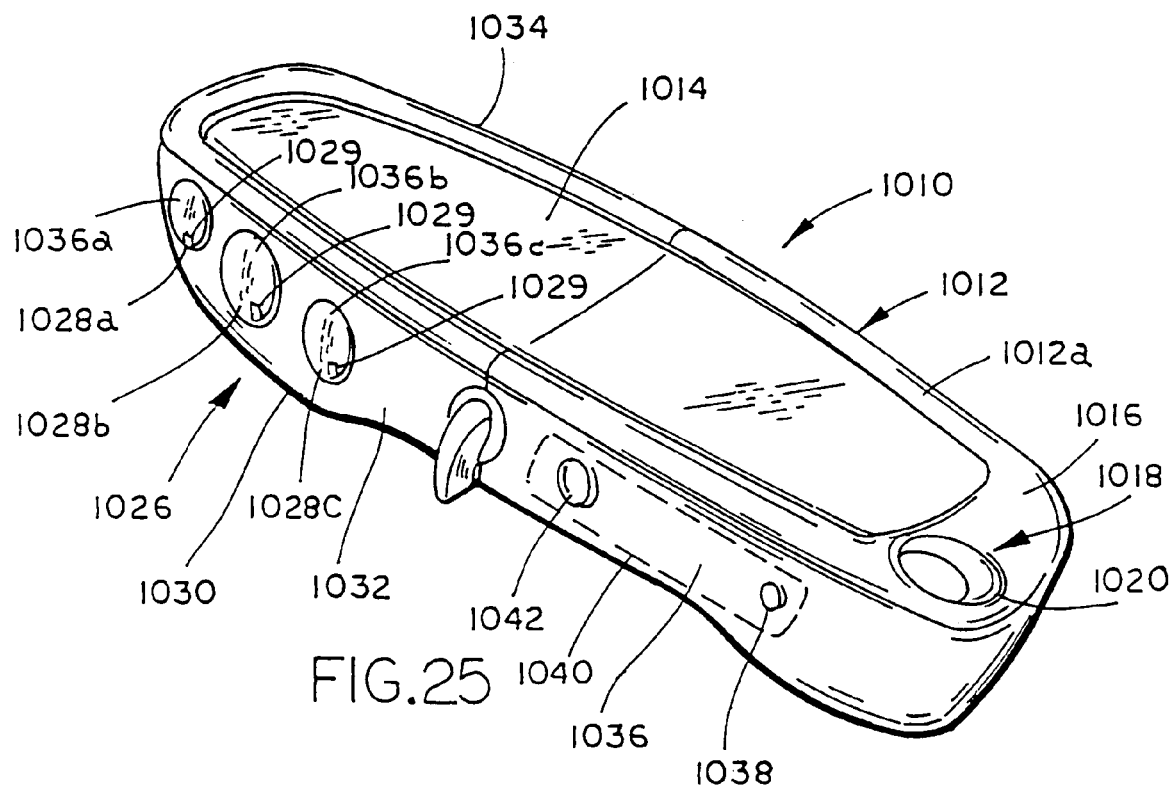
FIG. 25 is a bottom perspective view of a ninth embodiment of the rearview mirror assembly of the present invention illustrating a storage space for holding and dispensing coins, a 12-volt supply, and an air freshener dispenser.

A tenth embodiment 1010 of an interior rearview mirror assembly of the present invention is illustrated in FIG. 25. Rearview mirror assembly 1010 includes a mirror casing or housing 1012, a bezel 1012*a* and a reflective element 1014. Reference is made to the first embodiment for suitable materials for housing 1012 and bezel 1012*a* and a description of reflective element 1014. Bezel 1012*a* extends around the peripheral portion of reflective element 1014 and includes an enlarged side area 1016, which provides a location for a power supply connection 1018, for example a vehicle ignition/battery power supply, such as a 12-volt or 42-volt power supply connection. Similar to conventional power supplies provided in dashboards or consoles of most conventional vehicles, power supply connection 1018 includes a cylindrical casing 1020 which extends into assembly 1010 through bezel 1016. The contacts for the power supply (not shown) are coupled to the vehicle electrical system by way of wiring which extends through housing and exits housing 1012 preferably through mirror mount (not shown), which may be of similar construction to the ball mount illustrated in FIG. 6 of the first embodiment. In this manner, accessories, such as radar detectors (preferably mirror mounted radar detectors) or the like, may be plugged into the interior rearview mirror assembly 1010 thus reducing the length of wire required for the radar detector to reach most conventional power supplies and further reducing the distraction of dangling wires associated with conventional radar detectors.

Note that it is desirable and preferable to use switching power supplies comprising a switching regulator circuit (such as are disclosed in U.S. patent application Ser. No. 09/347,807 and titled "Busbars for Electrically Powered Cells" by Anoop Agrawal et al. of Donnelly Corporation, filed Jul. 2, 1999, now U.S. Pat. No. 6,317,248, the entire disclosure of which is hereby incorporated by reference herein), and particularly for electrically operated automotive devices and accessories such as disclosed herein. Such switching power supplies preferably comprise a switching regulator (such as National LM78S40 available from National Semiconductor, Santa Clara, Calif.)) and pulse width modulation to achieve a DC to DC voltage conversion with enhanced conversion efficiency and minimized power dissipation.

In addition, housing 1012 includes a storage space 1026 in the form of one or more coin holders 1028*a*, 1028*b*, and 1028*c*. Coin holders 1028*a*, 1028*b*, and 1028*c* comprise cylindrical members of different sizes or diameters which extend into housing 1012 rearward of reflective element assembly 1014. Each coin holder 1028*a*, 1028*b*, and 1028*c* includes an associated release mechanism for releasing coins held in the respective holder. Preferably, the release mechanism is accessible from the forward facing side or rear wall 1030 of housing 1012, which is easily accessible by the driver of the vehicle. In one form, each coin holder includes cylindrical members which extend from a lower wall 1032 of mirror housing 1012 to an upper wall 1034 so that coins may be loaded into their respective coin holders through the upper wall 1032 of housing 1012. In order to maximize the number of coins held in the respective coin holders, each latch 1029 is preferably located in close proximity to lower openings 1036*a*, 1036*b*, 1036*c* of each respective coin holder. In one form, latches 1029 comprise spring biased members which block openings 1036*a*, 1036*b*, 1036*c* to prevent the coins held therein from being released through the bottom openings of each respective holder until such a time that the respective latch is released from its extended position by the operator of the vehicle.

In preferred form, housing 1012 includes a second storage space 1036 inside housing 1012. Storage space 1036 may support a supply of facial tissue, wipes, a tape dispenser, or a supply of air freshener. The tissue, wipe, tape, or air freshener is removed or ejected from housing 1012 through an opening 1038 provided in bottom wall 1032 of housing 1012. For example, the supply of air freshener may be provided by an aerosol container or cartridge 1040 which is supported on and mounted to lower wall 1032 by one or more retainers, such as clips, which may be formed on the interior of housing 1012. To minimize noise and induced vibration, preferably the cartridge of the air freshener supply is rigidly mounted to housing wall 1032. Also, optionally provided on bottom wall 1032 is an actuator 1042, such as a button, which releases the air freshener from container 1040 through opening 1038. Such air fresheners can include ion generators, such as negative ion generators. In addition, the vehicle interior rearview mirror assembly may include an air purifying system, such as an ion generator, more preferably, a negative ion generator, or an electronic air freshener, such as an odor generating air freshener, for example odor generating air fresheners which are activated by heat such as powered by the vehicle integral heater power or a "plug-in" type air freshener that is coupled to the vehicle ignition/battery supply via, for example, a power supply socket or the like. Thus, for example, a fresh smelling (such as pine or the like) odor generating element can be inserted as a cartridge into a receiving receptacle incorporated in the interior rearview mirror assembly (such as, referring to FIG. 1, within casing 12 or referring to FIG. 10, attaching to mirror support arm 116 or bracket 117). Preferably, the odor generating element is heated when received in the interior mirror assembly, such as by a PTC heater, as known in the art, connected to the vehicle ignition system (most preferably, only when the ignition is on in order to obviate running down the vehicle battery when the vehicle is parked).

Moreover, a vehicle cabin air monitor can be incorporated into mirror assembly 10 such as within housing 1012, that includes reflective element 1014, or in a pod or housing that attaches to the mirror mount. Reference is made to patent application Ser. No. 09/244,726, now U.S. Pat. No. 6,172,613, which is incorporated herein by reference in its entirety, for an example of a suitable pod. For example, levels of carbon monoxide may be monitored by such air monitors provided at the mirror location, including in the interior mirror assembly casing. Preferably, the air monitor includes an intake, preferably a fan assisted intake that samples the air within the cabin. In preferred form, when the vehicle level of carbon monoxide exceeds a threshold level, the monitor takes appropriate action, for example sounding an alarm, shutting off the engine, and/or opening windows. Such an air monitoring system is preferably used with a remote ignition system such as is commonly used in cold climates when the engine is started up remotely. While the vehicle is idling with its engine running after a remotely-actuated engine start, there is a danger of carbon monoxide build-up. A mirror-mounted carbon monoxide monitoring system can shut off the engine upon detection of an in-cabin carbon dioxide level that exceeds a predetermined safe limit, thus potentially saving the life of a driver or occupant who otherwise might enter and use the vehicle. Such a vehicle air monitoring system protects against the build up of carbon monoxide within the vehicle cabin, for example, to provide a suicide prevention function. Alternately or in addition, carbon monoxide monitors can be incorporated into the interior rearview mirror housing. When the carbon monoxide level in the vehicle exceeds a certain level, the operation of the vehicle can be disabled by the vehicle control system provided the wheels are not moving. In other words, the vehicle is locked out. Alternately, the system can take an action in response to detection of an in-cabin carbon monoxide level exceeding a safety threshold, such as lowering windows or limiting how far the windows can close, or setting off an alarm, or can alert emergency services of the carbon monoxide hazard in the vehicle such as by wireless communication to a telematic service such as ONSTAR™ or RESCU™.

Figure 26:
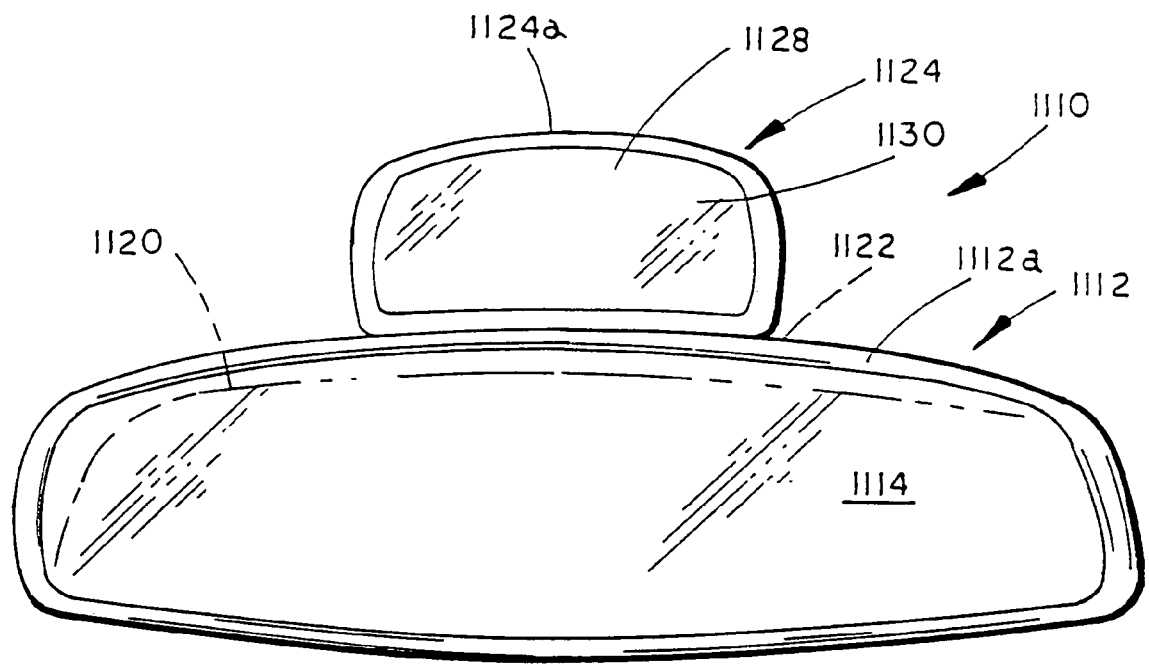
FIG. 26 is a front view of another embodiment of the interior rearview mirror assembly illustrated in FIGS. 1-8.
Figure 27:
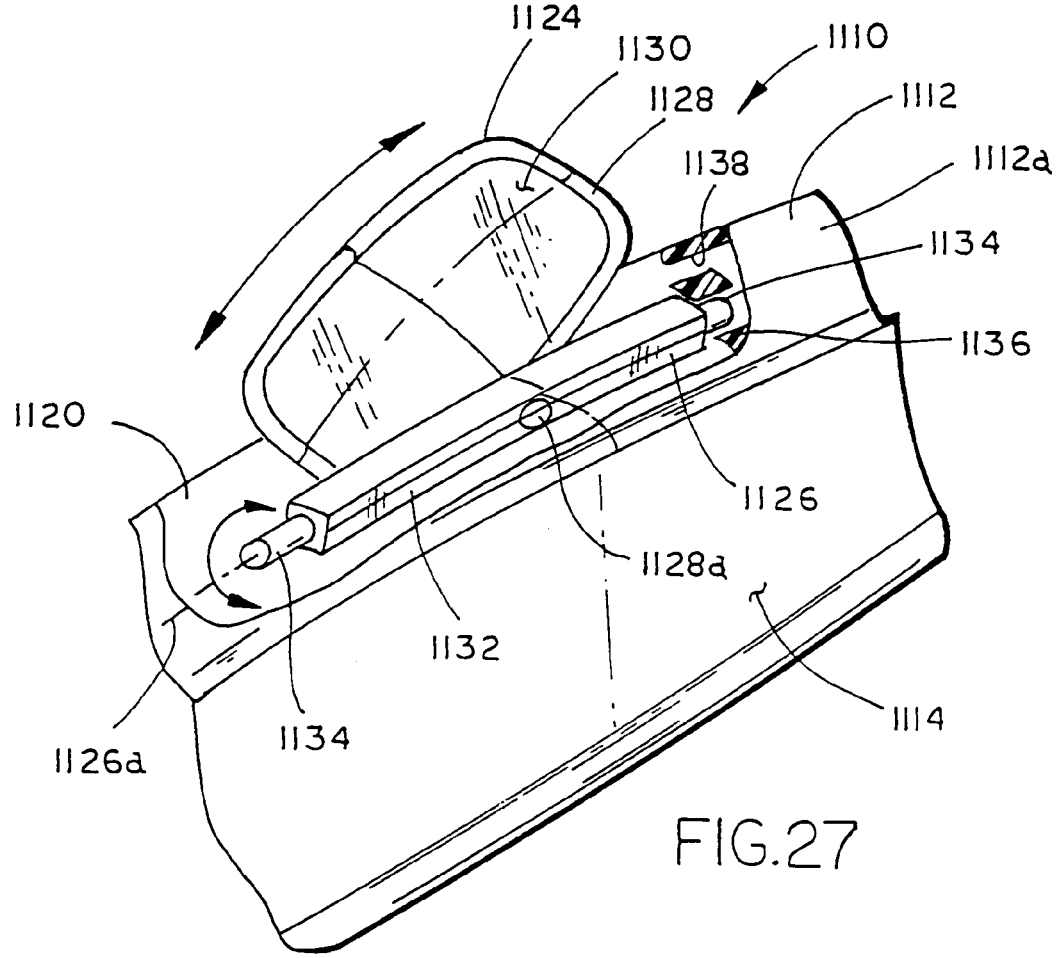
FIG. 27 is a top perspective partial fragmentary view of the interior rearview mirror assembly of FIG. 26.

Referring to FIGS. 26 and 27, the numeral 1110 generally designates a second embodiment of the mirror assembly illustrated in FIGS. 1-8. Mirror assembly 1110 includes a housing or casing 1112, a reflective element 1114, and a storage space 1120. Storage space 1120 comprises a cavity formed in casing 1112 for housing an accessory 1124. Similar to accessory 24, accessory 1124 may comprise a vanity mirror or a display device, including a video display device as described in reference to the first embodiment. For further details of casing 1112, reflective element 1114, and other electrical and electronic devices which may be housed in casing 1112, reference is made to assembly 10.

Accessory 1124 is mounted within cavity 1120 of mirror housing 1112 for movement between a retracted position and an extended position, as shown in FIG. 26. Preferably, when in its retracted position, accessory 1124 is substantially contained in cavity 1120 and, most preferably, such that accessory 1124 is completely contained in cavity 1120 so that accessory 1124 does not project from casing 1112 and potentially create a distraction to the driver of the vehicle.

Referring to FIG. 27, accessory 1124 is mounted interiorly of casing 1112 in cavity 1120 by a pivot member 1126. Pivot member 1126 permits accessory 1124 to be moved between its retracted position within casing 1112 and its extended position by pivoting about a pivot axis 1126a. In the illustrated embodiment, pivot member 1126 includes an elongate body 1132 with opposed support pins 1134 which are pivotally mounted in support members 1136, such as flanges, provided in casing 1112. Preferably, support members 1136 comprise flanges which project downwardly from upper wall 1112a of casing 1112 and which space support pins 1134 inwardly from rear wall 1138 so as to permit accessory 1124 to pivot to its retracted position within casing 1112 between back wall 1138 and reflective element 1114. It should be understood, that support members 1136 may extend to rear wall or may include reinforcing ribs or webs which extend to rear wall 1138 to provide stiffness to support members 1136.

Accessory 1124 is pivotally mounted to pivot member 1126 about a pivot axis 1128a to permit repositioning of accessory 1124 about a generally vertical axis when accessory 1124 is moved to its extended position such as illustrated in FIG. 26. In this manner, once accessory 1124 is moved or pivoted to its extended position outside casing 1112, the position of accessory 1124 may be easily adjusted by an occupant of the vehicle, for example the driver or a passenger of the vehicle.

As noted above and described in reference to the first embodiment of the interior rearview mirror assembly of the present invention, accessory 1124 may comprise a vanity mirror or may comprise a display device. In preferred form, accessory 1124 includes a housing 1128 in which an element 1130, such as a reflective element or display element, is supported. Housing 1128 may include a ball mount to pivotally mount housing 1128 to pivot member 1126 or may include a socket to receive a ball mount provided on pivot member 1126 to permit accessory 1124 to tilt about the horizontal axis as well. Alternately, housing 1128 may be pivotally mounted by a pivot pin which generally permits rotation of housing 1128 and element 1130 only about axis 1128a.

As best understood from FIG. 27, when accessory 1124 is pivoted on pivot member 1126 about pivot access 1126a and generally aligned with pivot member 1126 along axis 1126a, accessory 1124 can then be retracted into cavity 1120 behind reflective element 1114.

A third embodiment 1210 of the interior rearview mirror assembly illustrated in FIGS. 1-8 is shown in FIGS. 28 and 29. Mirror assembly 1210 includes a mirror casing 1212, a reflective element 1214, which is supported in casing 1212, and a storage space 1222. Housed in storage space 1222, is a pendent accessory 1224. As described in reference to accessory 24, accessory 1224 may comprise a vanity mirror or a display device. For further details of description of housing 1212, reflective element 1214, and components optionally supported in casing 1212, and variation of accessory 1124 reference is made to assembly 10.

In the illustrated embodiment, storage space 1222 comprises a cavity 1222a which extends into casing 1112 through an opening formed or provided in bottom wall 1112a. Cavity 1222a is preferably formed by molding and extends behind reflective element 1114 into casing 1112. Accessory 1224 is pivotally mounted in cavity 1222a by a pivot member 1226 as will be more fully described below, so that accessory 1224 can be moved between an extended position for viewing by an occupant of the vehicle (shown in FIG. 23) or a retracted or storage position within storage space 1222. Preferably, when in its storage position, accessory 1224 is substantially contained within storage space 1222 and, most preferably, completely contained and retracted into storage space 1222.

Accessory 1224 includes a housing 1228 and an element 1230, such as a reflective element or a display element. Reference is made to element 30 for examples and further description of element 1230. Preferably, housing 1228 includes a body 1228a with a recessed central portion or recessed wall 1234 which defines a perimeter wall 1234*a*. Element 1230 is supported in recessed portion 1234 and preferably mounted for pivotal movement in recessed portion 1234 so that the orientation of element 1230 can be adjusted by an occupant of the vehicle. Preferably, element 1230 is mounted to permit manual adjustment of element 1230; however, it should be understood that remote adjustment can be provided by an actuator, such as an electronic actuator, which are well known in the art. In the illustrated embodiment, recessed portion 1234 includes a ball mount 1236 which projects outwardly and on which element 1230 is mounted by a socket member which is provided on rear surface 1230*a* of element 1230. The ball and socket arrangement provides for pivotal movement of element 1230 about horizontal and vertical axes. Preferably, when mounted on ball mount 1236, element 1230 generally lies in the same plane as upper surface 1234*b* of perimeter wall 1234*a* when in a non-tilted position so that element 1230 will not project outwardly from housing 1228 so that housing 1228 can be quickly and easily pivoted to its retracted position within storage space 1222. As would be understood by those skilled in the art, element 1230 may alternately include a ball mount mounted to its rear surface 1230*a* with recessed portion 1234 having a socket member for receiving the ball mount of element 1230.

Referring to FIG. 29, at least lower edge 1238*a* and side edge 1238*b* of housing 1228 preferably follow the contours of casing 1212 so that when retracted, housing 1228 generally follows the contour of casing 1212. Moreover, housing 1228 is preferably the same size as the opening to cavity 1222 so that when retracted, housing 1228 appears to be a unitary part of the mirror.

Referring to FIG. 29, housing 1228 supports pivot member 1226 and preferably includes a stop 1232 which is spaced from pivot member 1226 and limits rotation of housing 1228 about pivot member 1226 by engaging bottom wall 1212*a* of casing 1212 (as shown in FIG. 28). In preferred form, as previously noted, housing 1228 is commensurate in size with the opening or mouth of cavity 1222*a* so that when retracted, the lower surface 1224*a* of accessory 1224 follows casing 1212 and forms a unitary part of mirror assembly 1210. Pivot member 1226 is mounted in case 1212 on a support member, such as a support flange 1240, which is formed or otherwise provided on bottom wall 1212*a* of casing 1212. Accessory 1224 is mounted for pivotal movement on support member 1248 by pivot member 1226 which is preferably journaled in member 1240. In preferred form, when fully retracted into storage space 1222, accessory 1224 does not provide any obstruction to the driver's view through the front windshield of the vehicle; instead, accessory 1224 is preferably substantially hidden from view when retracted. When extended from casing 1212, accessory 1224 projects downwardly from bottom wall 1212*a* to provide, for example a vanity mirror or a display member including a video display, as previously noted with the orientation of element 1230 within housing 1228 being preferably manually adjustable by an occupant of the vehicle, including the driver.

As described in reference to the previous embodiments, element 1230 may comprise a reflective element, including a flat reflector, a reflector having a compound curvature, an aspheric or convex mirror reflector, or may comprise a display screen for displaying information, such as vehicle status, a rearview vision system, or a baby minder system as previously described. In addition, housing 1228 may support a plurality of light sources, such as incandescent light sources or non-incandescent light sources, such as LEDs, around element 1220 to provide a vanity mirror.

Referring to FIG. 30, a second embodiment 1310 of the interior rearview mirror assembly illustrated in FIGS. 15, 15A, and 16 is shown. Mirror assembly 1310 includes a housing or casing 1312, a reflective element 1314, and support arm 1316, and mounting bracket 1317. It should be understood that other support arms and mounting arrangements may be used to mount assembly 1310 onto a vehicle headliner or windshield. Reference is made to assembly 210 for further description of casing 1312, reflective element 1314, support arm 1316, and bracket 1317. Similar to casing 212, upper wall 1312*a* of casing 1312 includes a storage space 1322 for supporting an accessory 1324. In the illustrated embodiment, accessory 1324 comprises a dispensing accessory for dispensing wipes, including "wet wipes" or glass cleaner wipes or the like, or tissues so that an occupant of the vehicle can easily and quickly retrieve a wipe or tissue T. Storage space 1322 may be provided by a recess, similar to recess 224, and by molding a recess into upper wall 1312*a* of casing 1312 or may be provided by an insert which is inserted into upper wall 1312*a* through an opening, similar to opening 222*a*.

Dispensing accessory 1324 includes a container 1326 with a dispensing opening 1328 through which a wipe or tissue T may be dispensed for use by an occupant of the vehicle. Housing 1326 is removably supported in storage space 1322 and may be releasably retained in storage space 1322 by a friction fit, snap couplers or may be held in place by one or more spring loaded latches 1330. As would be understood by those skilled in the art, spring loaded latches 1330 may frictionally engage an inner surface 1322*a* of storage space 1322 or may engage a corresponding recess provided on inner surface 1322*a*. In this manner, tissue or wipe dispensing accessory 1324 may be quickly and easily removed from storage space 1322 for refill or replacement. Optionally, additional storage space may be provided for discarded tissues or wipes. For example, storage space 1322 may be segregated into two storage spaces—one for holding the dispensing accessory, and the other for holding the discarded tissues, wipes, or other trash. Alternately, a disposal bin may be provided elsewhere in the vehicle.

It should be understood from the foregoing, that interior rearview mirror assembly 1310 provides a storage space 1322 which may be used to support a wide variety of accessories therein beside tissue dispenser 1324. Optionally, as previously noted, tissue dispensing assembly 1324 may be removed such that storage space 1322 may be used for storing other accessories, as described in reference to assembly 210.

Referring to FIG. 31, a second embodiment 1410 of the interior rearview mirror assembly illustrated in FIGS. 9-14 is shown. Mirror assembly 1410 includes a mirror housing or casing 1412, a reflective element 1414, and a storage space 1422 for storing a dockable accessory 1424, similar to assembly 110. As previously described, dockable accessory 1424 may comprise a light assembly (as shown), a telecommunication device, such as a phone or a pager, or other hand held electrical or electronic devices or the like. For further details of housing 1412, dockable accessory 1424, and reflective element 1414 general reference is made to assembly 110.

In the illustrated embodiment, dockable accessory 1424 includes a housing 1426 which includes a pair of spring loaded latches 1428 for engaging elongate recesses 1430 provided in back wall 1412*a* of casing 1412 in storage space 1422. Housing 1426 preferably supports a pair of latch releases 1432 which move latches 1428 between an insertion position and an engagement position. When moved to their insertion position, which is typically achieved when latch releases 1432 are compressed, latches 1428 can then be aligned for insertion into elongate recesses 1430. When latch releases 1432 are released, latches 1428 engage with casing 1412 in recessed 1430, as will be understood by those skilled in the art. Similar to the previous embodiment illustrated in FIGS. 9-14, housing 1412 preferably supports a pair of electrical contacts 1432 which permit accessory 1424 to couple to either a recharging unit in mirror assembly 1410 or located elsewhere in the vehicle for recharging of dockable accessory 1424, as previously described in reference to assembly 110. Optionally, housing 1426 may support a pair of guide members 1444 which engage corresponding elongated recesses or slots 1446 provided in side wall 1448 of storage space 1422. In this manner, guide members 1444 guide dockable assembly 1424 into the correct position onto storage space 1422. Therefore, in order to dock accessory 1424 onto storage space 1422, latch releases 1432 must be compressed so that latch members 1428 are aligned for placement into elongated recesses 1430. When guide members 1444 properly aligned with recesses 1446, and latches 1428 are inserted into elongated recesses 1430, latch releases 1432 may be then released so that dockable accessory 1424 is releasably mounted to casing 1412.

Figure 32:
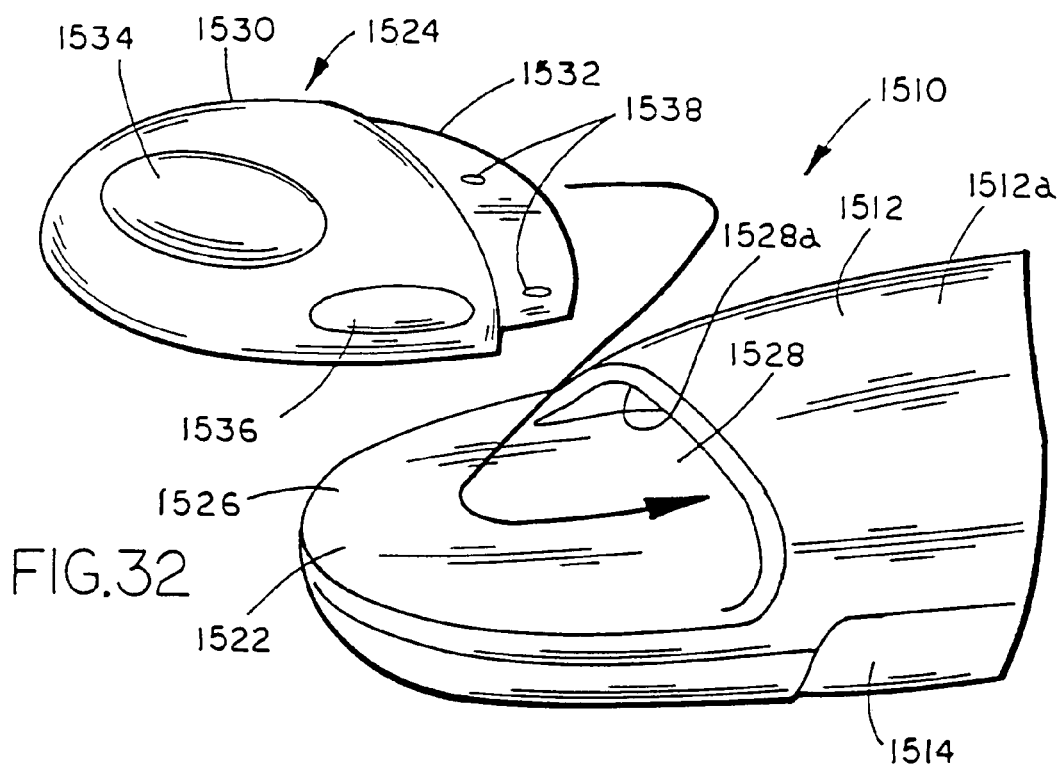
FIG. 32 is a partial rear exploded perspective view of a third embodiment of the interior rearview mirror assembly of FIGS. 9-14.

Referring to FIG. 32, a third embodiment 1510 of the interior rearview mirror assembly illustrated in FIGS. 9-14 is shown. Mirror assembly 1510 includes a mirror casing 1512, a reflective element 1514, and a storage space 1522, on which a dockable accessory 1524 is mounted for storage and later retrieval by an occupant of the vehicle, such as the driver. For further details of housing 1512, reflective element 1514, and dockable accessory 1524, reference is made to mirror assembly 110.

In the illustrated embodiment, storage space 1522 is formed by generally planar recessed wall 1526 provided on back wall 1512a of mirror case 1512 and a cavity 1528 which is formed in back wall 1512a. As noted in reference to accessory 24, accessory 1524 may comprise a light assembly, a telecommunications device, such as a telephone or pager or the like. Accessory 1524 includes a housing 1530 with a flange portion 1532. Flange 1532 is commensurate in size with cavity 1528 so that when flange 1532 is inserted into cavity 1528, accessory 1524 is held in storage space 1522 by the friction between flange 1532 and wall 1528a which defines cavity 1528 and wall 1526. Housing 1530 supports a cover or lens 1534 and includes at least one gripping surface 1536, similar to the dockable accessory described in reference to embodiment 110. Optionally mounted to flange 1532 are a pair of contacts 1538 which engage or make contact with a corresponding pair of contacts provided on cavity wall 1528a in cavity 1528. Thus, when accessory 1524 is docked onto storage space 1522, accessory 1524 is held in place by friction between flange 1532 and wall 1528a and is coupled to a recharger located either in casing 1512 or elsewhere in the vehicle to recharge batteries supported within housing 1530 of accessory 1524, as described in greater detail in reference to accessory 124.

Similar to the previous embodiments, housing 1530 and cover 1534 are preferably contoured to follow contour of casing 1512 such that when docked, accessory 1524 forms a unitary unit with casing 1512. It should be understood, that flange 1532 may be provided with releasable couplers, as snap fit flanges or the like which provide a positive engagement between flange 1532 and wall 1528a or wall 1526 as will be understood by those skilled in the art. In addition, flange 1532 may support releasable latches similar to latches 1428 described in reference to the previous embodiment.

Figure 33:
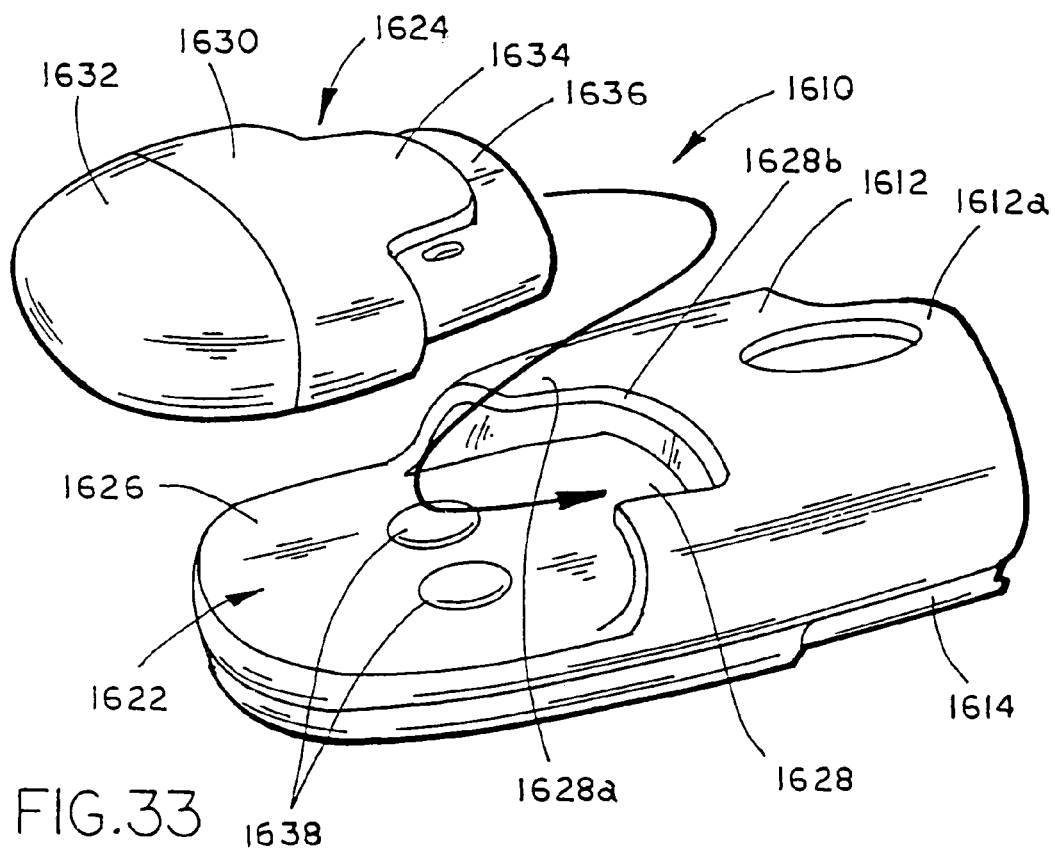
FIG. 33 is a partial rear exploded perspective view of a third embodiment of the mirror assembly of FIGS. 9-14.

Referring to FIG. 33, the numeral 1610 generally designates a fourth embodiment of the interior rearview mirror assembly illustrated in FIGS. 9-14. Mirror assembly 1610 includes a mirror housing or casing 1612, reflective element 1614, and a storage space 1622 for storing a dockable accessory 1624, similar to the previous embodiment. As previously described, dockable accessory 1624 may comprise a light assembly (shown), a telecommunications device, such as a phone or a pager or other hand held electrical or electronic devices. For further details of housing 1612, reflective element 1614 and accessory 1624, general reference is made to assembly 110.

Storage space 1622 is formed by a generally planar wall 1626 formed on back wall 1612a of casing 1612 and a generally open cavity 1628 which is formed in back wall 1612a and has a generally U-shaped configuration. Cavity 1628 is defined between planar wall 1626 and a generally U-shaped retaining wall 1628a which extends over planar wall 1626. Accessory 1624 includes a housing 1630, which supports a cover or lens 1632, and a flange 1634 commensurate in shape with cavity 1628 so that when accessory 1624 is docked in storage space 1622, flange 1634 extends into cavity 1628 and is held in place by U-shaped wall 1628a. Preferably, accessory 1624 is held in storage space 1622 by frictionally engagement between flange 1634 and wall 1628a of cavity 1628 and planar wall 1626.

In order to follow the contours of casing 1612, housing 1630 preferably includes a projecting lip 1636 which extends over flange 1634 and is commensurate in shape with opening 1628b of cavity 1628 such that when accessory 1624 is docked into storage space 1622, housing 1620 abuts casing 1612 and generally follows the contours of casing 1612. In this manner, when docked, accessory 1624 forms a generally unitary assembly with casing 1612.

Optionally, housing 1630 or flange 1636 may support one or more latches for positively engaging casing 1612, as previously described. In preferred form, casing 1612 supports a pair of contacts 1638 in storage space 1622 which electrically couple and make contact with corresponding contacts provided on accessory 1624 so that accessory 1624 may be recharged while docked in storage space 1622, as previously described.

Figure 34:
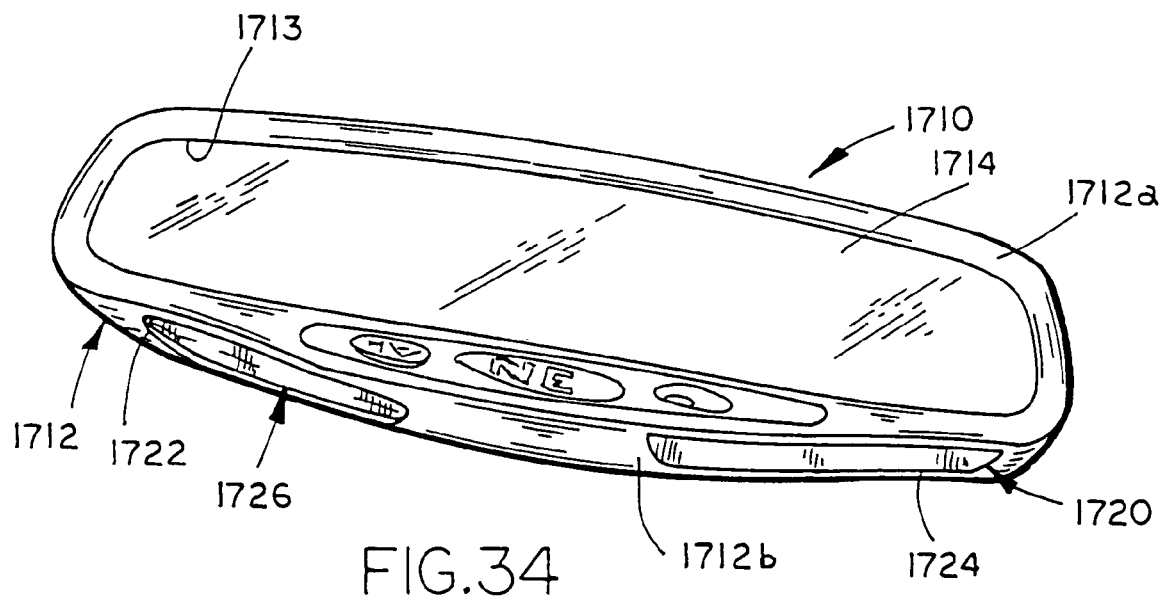
FIG. 34 is a perspective view of an eighteenth embodiment of an interior rearview mirror assembly of the present invention.

Referring to FIG. 34, the numeral 1710 generally designates an eighteenth embodiment of the interior rearview mirror assembly of the present invention. Interior rearview mirror assembly 1710 is of similar construction to mirror assembly 10 and includes a mirror casing 1712 and a reflective element 1714. Reflective element 1714 is positioned in casing 1712, for example, by a bezel 1712a, a bracket, or an actuator or the like. As described in reference to the previous embodiments, mirror assembly 1710 is mounted to the vehicle, for example either by a windshield mounting arrangement or a header mounting arrangement previously described. Reference is made to the previous embodiments for examples of suitable mounting arrangements.

In the illustrated embodiment, interior rearview mirror assembly 1710 includes a light assembly or light module 1715 which is dockable in casing 1712 to provide a light source for a map light assembly 1720, as well as a flashlight light function when the light assembly is removed from casing 1712. Casing 1712 includes a bottom wall 1712b which includes two openings 1722 and 1724 that provide openings for map light assemblies 1726 and 1720, with map light module 1726 comprising a fixed position map light. For examples of suitable map light assemblies reference is made to U.S. Pat. Nos. 5,938,321; 5,813,745; 5,820,245; 5,673,994; 5,649,756; or 5,178,448, the disclosures of which are incorporated by reference herein in their entireties. As will be more fully described, map light assembly 1720 is at least in part provided by light module 1715.

Figure 36:
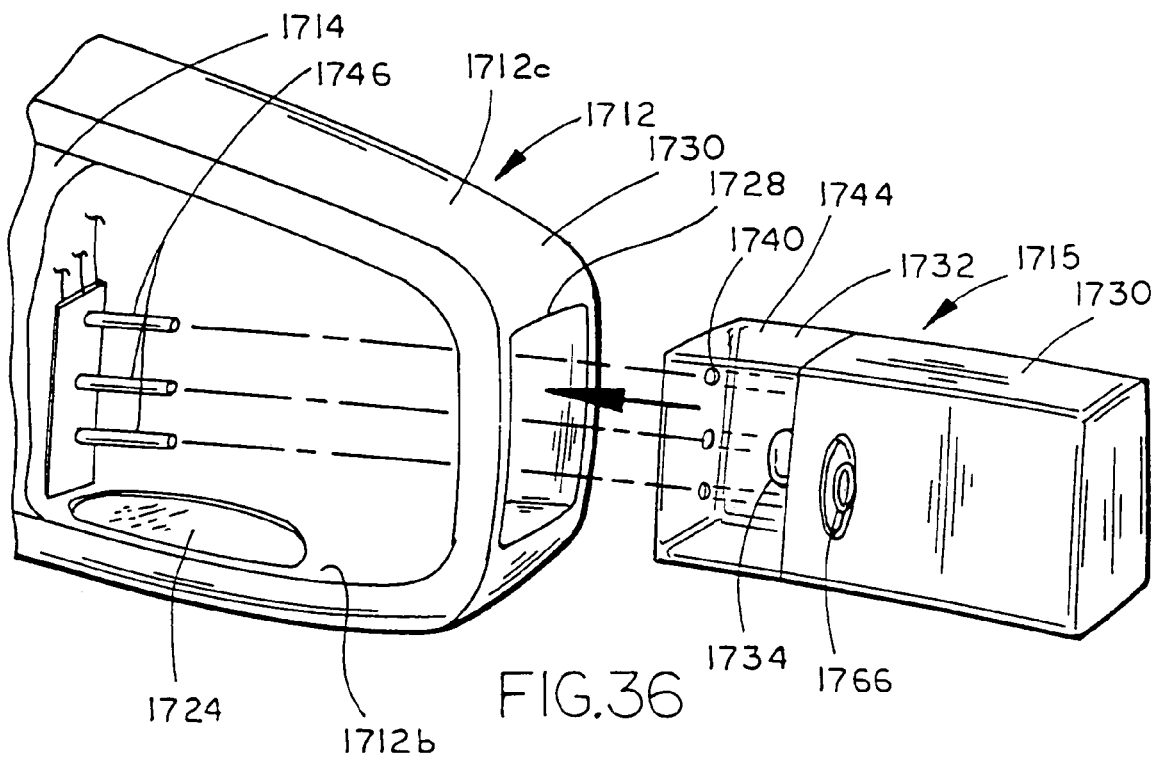
FIG. 36 is an enlarged exploded perspective view of the passenger side of the interior rearview mirror assembly of FIG. 34 illustrating a light module removed from the interior rearview mirror assembly casing.

Referring to FIG. 36, casing 1712 is formed by a casing wall 1712c which includes a rearward facing opening 1713 in which reflective element 1714 is positioned and a passenger side opening 1728 on end wall 1730. Opening 1728 is sized to permit light module 1715 to be inserted through casing wall 1712c and into casing 1712 behind reflective element 1714 for docking so that the light module 1715 can direct light through opening 1724 to form map light assembly 1720. Light module 1715 includes a housing 1730 with a transparent portion, preferably a cover 1732, and, more preferably, an optical cover. Positioned in housing 1730 is at least one light source 1734 which provides sufficient light to use light module 1715 as a flashlight so that the light module 1715 may be used in the vehicle to locate articles or may be used exteriorly of the vehicle, for example while changing a tire in the dark. In preferred form, light module 1715 includes a plurality of light sources 1734, for examples solid state light sources, such as light emitting diodes (LEDs) or neon lights. In most preferred form, light sources 1734 comprise white light emitting LEDs, such as those available from Nichia America Corp. of Mountville, Pa., under the trade designations Nichia NSPW500BS, 5.6 C.P. White; NSPWF50BS; NSPW515BS; NSPW300BS; NSPW312BS; NSPW310BS; and NSPW315BS. Light sources 1734 are positioned to project light through cover 1732 and, furthermore, are positioned such that when light module 1715 is inserted through opening 1728 and docked in casing 1712, light sources 1734 can provide a light source to form a map light assembly 1720 which projects through opening 1724 in bottom wall 1712b of casing 1712.

Optionally, any of the interior mirror assemblies of this present invention may include at least one map/reading/courtesy light, most preferably comprising a non-incandescent lamp such as a light emitting diode (LED) array (most preferably, each such array comprising at least one, and more preferably a plurality of at least two, white light-emitting diodes such as are disclosed in U.S. patent application Ser. No. 09/249,979, entitled LIGHTING DEVICE FOR MOTOR VEHICLES, by Peter Furst and Harald Buchalla, filed February 1999, and assigned to Donnelly Hohe GMBH & CO, KG, now U.S. Pat. No. 6,152,590, the entire disclosure of which is hereby incorporated by reference herein). Suitable white light-emitting diodes are available from Nichia America Corp. of Mountville, Pa., under the trade designation Nichia NSPW500BS, 5.6 C.P. White. Preferably, such mirror-mounted map lights use at least one white light-emitting LED light source, more preferably at least two white light-emitting LED light sources, and most preferably at least three white light-emitting LED light sources as the lamp for illumination purposes. Other non-incandescent light sources can be used for mirror-mounted lights (both interior rearview mirror assembly-mounted illuminators and exterior sideview mirror assembly-mounted illuminators) and/or for the illuminator in a dockable, removable light source such as the removable mirror-mounted flashlights described herein. For example, fluorescent light sources such as cold-cathode fluorescent lamps can be used. Alternately, luminescent light sources such as comprising an inorganic electroluminescent light source or, preferably, an organic electroluminescent light source can be used in map/reading/courtesy lighting in automotive rearview mirror assemblies and in security lighting/ground illumination and signal lighting in exterior sideview mirror assemblies, or may comprise an organic light emitting diode. Also, a laser light source, or a multiple-laser light source can be used for illumination from automotive mirror assemblies, such as for map, reading and/or courtesy lighting at, in, or on an interior rearview mirror assembly or for security lighting/ground illumination lighting from, or signal lighting from, an exterior sideview mirror assembly. Laser lighting can also be used to provide illumination for vehicle-mounted cameras, such as back-up cameras or forward-facing cameras or interior cabin monitoring cameras such as baby monitoring cameras such as are disclosed in provisional U.S. Pat. Application Ser. No. 60/186,520, filed Mar. 1, 2000, by Lynam et al., entitled INTERIOR REARVIEW MIRROR ASSEMBLY INCORPORATING A VIDEO SCREEN; U.S. patent application Ser. No. 09/466,010, filed Dec. 17, 1999, by DeLine et al., entitled INTERIOR REARVIEW MIRROR SOUND PROCESSING SYSTEM, now U.S. Pat. No. 6,420,975; and U.S. patent application Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and Ser. No. 09/448,700, filed Nov. 24, 1999, now U.S. Pat. No. 6,329,925, the disclosures of which are hereby incorporated herein by reference. For night vision purposes (such as with forward facing cameras or when viewing a child at night in a darkened vehicle cabin or trapped in a darkened vehicle trunk compartment), use of near-infrared light emitting sources, and in particular near-IR emitting LEDs and lasers, is desirable in order to provide illumination for a night-viewing camera while avoiding glaring with visible light, as disclosed in U.S. Pat. No. 6,498,620, the disclosure of which is hereby incorporated herein by reference. Note that, optionally, such night-time illuminating LED light sources are controlled by a vehicle-mounted photosensor (such as a photosensor incorporated into the interior rearview mirror assembly) whereby, at high ambient lighting around and/or in the vehicle such as during daytime, operation of the light sources is disabled in order to reduce power consumption when illumination by the light sources is not needed due to the adequate ambient lighting provided around the vehicle such as by the sun. Where multiple laser sources are used, the light output of lasers emitting light of different non-white colors (for example, three blue emitting lasers and three amber lasers) can be combined to illuminate with metameric white light such as is described in U.S. Pat. No. 5,803,579 to Tumbull et al. and in U.S. Pat. No. 5,136,483 to Schoniger et al., the entire disclosures of which are hereby incorporated by reference herein. Such laser automotive lighting, and preferably white-light laser lighting, can be used in a variety of automotive lighting applications besides mirror-mounted lighting, such as laser-lighted automotive vanity mirrors, dome lights, parking lights, CHMSL lights, reversing lights, running board lights, side marker lights, turn signal lights, brake lights, fog lights, taillights, rail lamps, headlights, spot lights, ash tray lights, trunk compartment lights, storage compartment lights, console lights and the like. Also, optionally and preferably, a light pipe and/or optical elements such as lenses, diffusers and reflectors can be used in conjunction with a laser light source, preferably a white-light producing laser source, in order to distribute/project light within or out from the vehicle, and/or to expand or direct/project the laser-generated light beam. Most preferably, at least one diffractive optical element is used in conjunction with an automotive laser light source.

Figure 35:
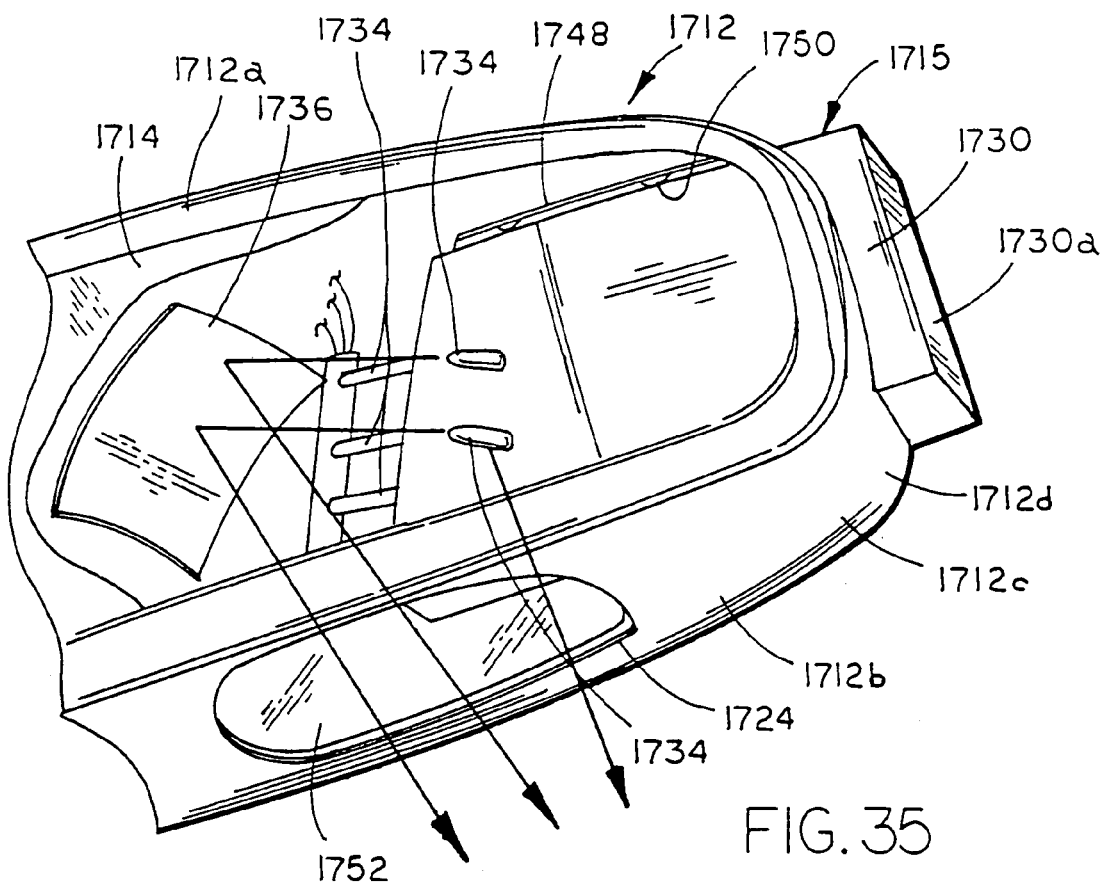
FIG. 35 is an enlarged partial fragmentary view of the passenger side of the interior rearview mirror assembly of FIG. 34.

Referring to FIG. 35, when light module 1715 is docked in casing 1712, cover 1732 is directed inwardly with light sources 1734 at least generally aligned with opening 1724 to provide map light 1720. Optionally, casing 1712 may include a reflector 1736 which assures that a greater percentage of the light emitted from light sources 1734 is directed through opening 1724. It should be understood that the optics to direct the light through opening 1724 may also be provided by cover 1732 or provided by a combination of a reflector and cover 1732 which may comprise an optical lens (which may be a refractive lens and preferably comprises a diffractive lens). In addition, opening 1724 may include a cover 1752, such as an optical lens, which directs the light emitted from light sources 1734 in a desired pattern. In addition to providing optics to generate a desired light pattern, cover 1752 closes opening 1722 to provide protection to the components in the mirror assembly and, further, to provide pinch protection to a person inserting light module 1715 into casing 1712.

Referring again to FIG. 36, light module 1715 preferably includes a plurality of conductive contacts and, most preferably, a plurality of conductive sockets 1740a, 1740b, 1740c, which are coupled to a light module drive circuit 1742 described in greater detail below. Preferably, sockets 1740a, 1740b, and 1740c are positioned on the input end of module 1715 and, further, toward a back wall 1744 of cover 1732 to minimize the interference with the light emitted from light sources 1734. When light module 1715 is inserted into casing 1712, sockets 1740a, 1740b, and 1740c align with a corresponding plurality of conductive pin contacts 1746a, 1746b, and 1746c provided in casing 1712. Pin contacts 1746a, 1746b, and 1746c are coupled to the vehicle power supply system and may be used, for example, to recharge a battery or batteries positioned in light module 1715, as will be more fully described in reference to circuit 1742. In addition to providing an electrical coupling between light module 1715 and the vehicle power system, pins 1746a, 1746b, and 1746c also may mount light module 1715 to casing 1712 depending on the size of the light module. Optionally, casing 1712 may include spaced apart upper and lower retaining flanges 1748 (only one shown) which hold light module 1715 therebetween and, further, may include biasing members 1750, such as spring clips, flexible fingers, elastomeric members, which apply a friction force to light module 1715 to thereby provide a substantially rigid mount for light module 1715 within in casing 1712.

When fully inserted into casing 1712, light module 1715 preferably follows the outer surface 1712d of casing wall 1712c and includes an end wall 1730a which is substantially flush with outer surface 1712d. In order to remove light module 1715 from casing 1712, casing 1712 may include an ejector which is actuatable by an external button or the like, or module 1715 may include one or more griping surfaces, such as on end wall 1730a.

Figure 38:
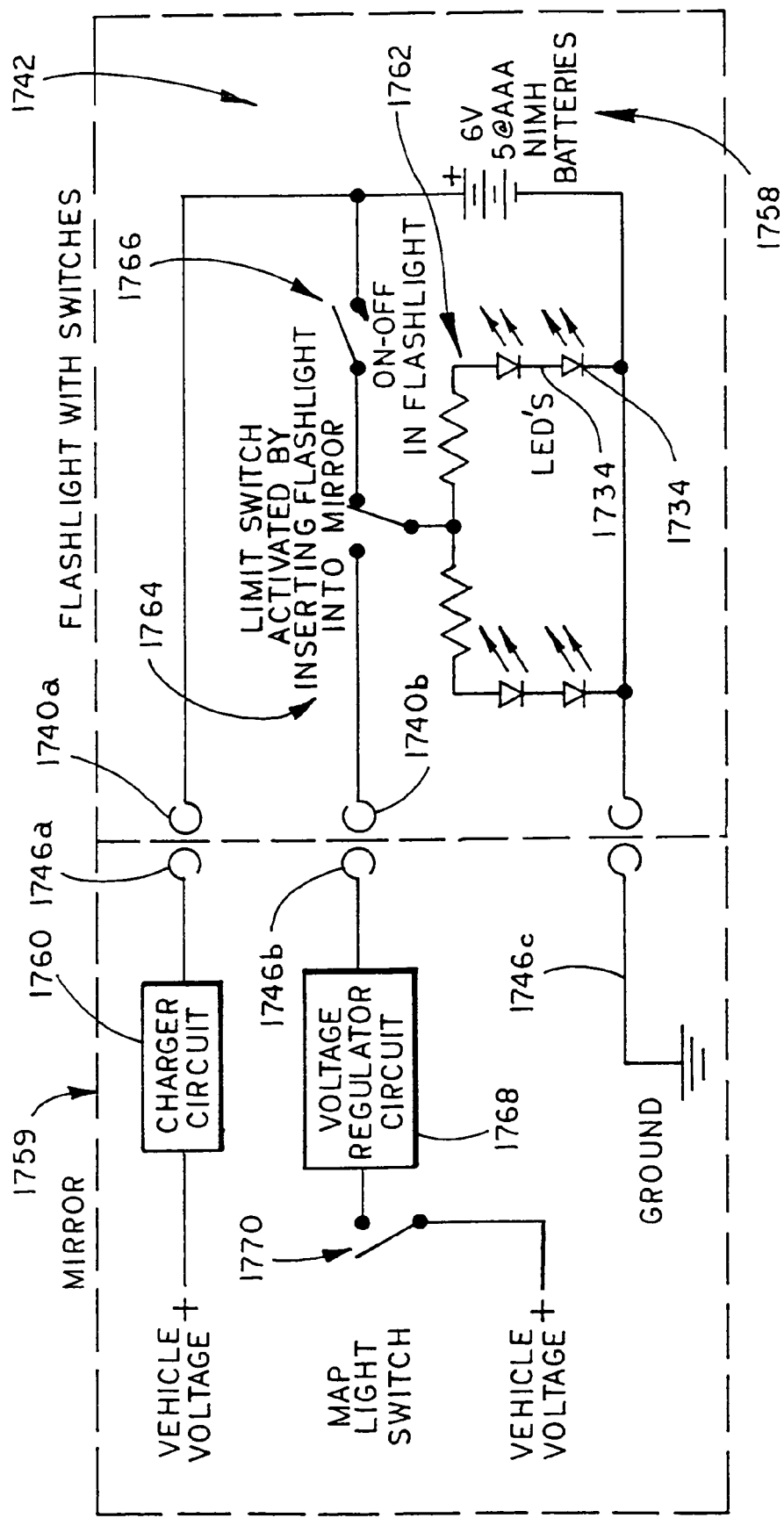
FIG. 38 is a schematic view of a drive circuit for the light module.

Referring to FIG. 38, light module drive circuit 1742 includes a voltage supply 1758, for example one or more batteries and, most preferably, one or more rechargeable batteries, such as nickel metal hydride batteries, nickel cadmium batteries or lithium ion batteries. Light module drive circuit 1742 couples to a map light circuit 1759 that is positioned within the casing 1712 of the interior mirror assembly and that is accessed in the casing via sockets 1740a, 1740b, and 1740c and conductive pins 1746a, 1746b, and 1746c to recharge voltage supply 1758 (that is in the dockable/removable accessory such as a light module 1715 such as a flashlight) and, further, as will be described, optionally couple light sources 1734 to the vehicle power supply when module 1715 is docked in casing 1712. Map light circuit 1759 includes a charger circuit 1760 (that connects to the vehicle ignition system), which recharges voltage supply 1758 when circuit 1742 is electrically coupled to map light circuit 1759, a map light switch 1770, and a voltage regulator circuit 1768, which protects light sources 1734 from over charging. Voltage supply 1758 is coupled on its positive side to socket 1740a which contacts conductive pin 1746a to couple to the vehicle system power supply through charger circuit 1760. Light sources 1734 are connected as a bridge circuit 1762, which extends across the voltage drop of voltage supply 1758. Bridge circuit 1762 includes a limit switch 1764 that moves between a first position wherein light sources 1734 form a closed circuit with the voltage supply 1758 and a second position in which light sources 1734 are coupled to the vehicle ignition system through socket 1740b and conductive pin 1746b. Preferably, circuit 1742 includes a second switch 1766, such as an on-off switch which is mounted to housing 1730, that permits the user of the light module 1715 to turn the light sources 1734 on and off when module 1715 is removed from casing 1712. However, once inserted into the casing 1712, limit switch 1764 moves to the second position in which light sources 1734 form a closed circuit with the vehicle system power supply through voltage regulator circuit 1768 via conductive pin 1746b and socket 1740b. Preferably, map light switch 1770 is mounted, for example, to bottom wall 1712b of casing 1712 to permit easy access to occupants of the vehicle. In this manner, limit switch 1764 by-passes the on/off switch mounted to light module 1715 so that light sources 1734 assume the logic of map light switch 1770 of the vehicle. As a result, when the light module is inserted into mirror casing 1712, regardless of the position of the light module switch, the light source(s) in the light module assumes the logic of the switch in the casing. Therefore, if the switch on the casing is in the "off" position and the switch in the module is in the "on" position, when the light module is inserted into the housing the light source(s) of the light module will be deactivated or turned off. This permits the user of the flashlight to return the flashlight module 1715 to casing 1712 without concern for the position of switch 1766 since the light sources will assume the logic of the map light switch 1770.

In the illustrated embodiment, circuit 1742 includes four light sources and, more preferably, two sets of two light sources connected in series which are then connected in parallel via limit switch 1764 across the voltage source 1758. But it should be understood, that the number of light sources in light module 1715 may vary. In preferred form, light sources 1734 comprise solid state light sources, such as LEDs, organic or inorganic electroluminescent light sources, neon lights, semiconductor lasers or the like. Solid state light sources, such as organic or inorganic LEDs, are preferred since they do not generate as much heat as incandescent light sources. However, it should be appreciated that low power incandescent light sources may also be used.

The LEDs preferably require at least about a 15 milliamp forward current, more preferably, about a 20 milliamp forward current and, most preferably, about a 30 milliamp forward current. More preferably, the LEDs require about a 50 milliamp forward current and, most preferably, about a 60 milliamp forward current. Furthermore, the LEDs preferably have forward voltage drop of at least about 1 volt, more preferably at least about 3 volts and, most preferably, about 6 volts. Light sources 734 are preferably connected in series so that the forward voltage drop across the LEDs are additive and, thus, optionally equal the nominal ignition voltage of the vehicle, which is typically 12 volts (although in future vehicles, a 42V vehicle power system is envisaged, with pulse-width modulation to be used to provide sub-rails from this of 14V nominal rms voltage). For example, three series LEDs can be used, with each LED having a forward voltage drop of about 4 volts, to have a total forward voltage drop of about 12 volts. By having the additive voltage drop across the multiple LEDs connected in series be as close to the ignition/battery voltage as possible in the automobile, a low power dissipation series resistor of low ohmic resistance can be used as a current limiting/voltage dropping series resistor in series with the LEDs (or optionally, the series resistor can be dispensed with). As described above, map light circuit 1759 preferably includes a regulator circuit, which provides an override protection, for example when the engine is revved up and the voltage of the vehicle's electrical system increases beyond its nominal voltage. For example, regulator circuit 1768 may include a series resistor or voltage controlling circuit, such as a series voltage regulator. It should be understood, that the number of LEDs and the type of LEDs may be mixed and varied. For example, and for vehicles with a 12V nominal battery, three LEDs having a voltage drop of about 4 volts may be used or two LEDs having a voltage drop of about 4 volts can be combined with two LEDs having a voltage drop of about 2 volts. In addition, it can be appreciated that the light module circuitry may optionally include an over voltage regulator to protect the LEDs from damage.

Typically, LEDs operate in a range of less than about 40 milliamps, less than about 75 milliamps, and less than about 150 milliamps. The preferred illumination intensity for map light 1720 is at least about 20 lux at a distance of about 30 inches from the mirror assembly, more preferably, about 40 lux, and, most preferably, about 60 as measured over a 50 mm diameter circular area. Preferably, the LEDs have a minimum illumination intensity of about 10 lux, more preferably, about 30 lux and, most preferably, a minimum of about 60 lux at a minimum distance of about 30 inches from the mirror assembly.

Alternately, light module 1715 may include, for example six LEDs with three of the LEDs being inoperable when used as a flashlight while the remaining LEDs are activated when the light module is returned to the mirror housing to provide a map light of sufficient light intensity. In this manner, the battery life of voltage supply 1758 can be extended. Alternately, light module 1715 may include, for example only a subset, for example three LEDs but when returned to the mirror casing are combined with the remaining LEDs housed in the mirror casing to provide the desired illuminescence. When operating as a map light, light sources 1734 preferably form about a 50 mm circle at about 25 inches from the mirror assembly preferably with a lux level of at least about 50 lux, more preferably, at least about 25 lux and, most preferably at least about 100 lux capacity.

As previously noted, flashlight module 1715 preferably includes a battery and, more preferably, a rechargeable battery such as a nickel metal hydride (NIMH) and nickel cadmium or a lithium ion battery. Batteries are typically rated in amp hours, and in the present application, it is preferred that light module 1715 will generate sufficient current and voltage to activate the LEDs for a minimum of about 15 minutes, more preferably, a minimum of about 30 minutes and, most preferably, a minimum of about one hour or more. For example, a suitable light module battery preferably has a capacity of at least about 25 milliamp hours, more preferably, at least about 100 milliamp hours and, most preferably, about 500 milliamp hours or greater.

As previously described, cover 1732 may include optics for map light 1720 so that when the light module 1715 is inserted into mirror casing 1712, light sources 1734 from the light module 1715 may provide the desired map light pattern. Alternately, the optics for map light 1720 may be incorporated into the casing, for example into cover 1752. In addition, the optics may be incorporated into both light module 1715 and mirror casing 1712. As previously described, light module 1715 is preferably inserted from the passenger side of mirror casing 1712 which minimizes the distraction to the driver and, furthermore, provides ease of handling for right-handed people. However, it can be appreciated that light module 1715 may be inserted from the driver side of the interior rearview mirror casing to ease handling for left-handed drivers.

In preferred form, cover 1732 is sealed with housing 1730 to provide a substantially impervious module which protects the components in the module from elements so that the light module may be used outside and, furthermore, can be incorporated into an interior rearview mirror assembly of a convertible vehicle. In preferred form, light module 1715 is serviceable and/or replaceable and, most preferably, replaceable and disposable. One advantage of using solid state light sources is that light module 1715 may be replaced and disposed of as opposed to serviced, which is typically required for incandescent light sources. In addition, when solid state light sources are incorporated into light module 1715, light module 1715 remains cool and, therefore, its close proximity to other electronic devices does not impose any performance problems on those electronic devices.

It can be appreciated, that light module 1715 of the present invention is user friendly and can be quickly inserted into and retrieved from the mirror casing and, further, because of the override circuitry provided in the mirror casing, module 1715 does not require to be turned off before returning to its stored position within mirror casing 1712. The concept of this embodiment may also be used with a phone, a pager, or the like with or without the light sources so that the phone or pager may provide one or more light sources for the map light function when it is docked in the mirror casing. If light sources are incorporated into the pager or phone, the light sources may be used as a flashlight or may only be operational when the phone or pager is docked.

Figure 39:
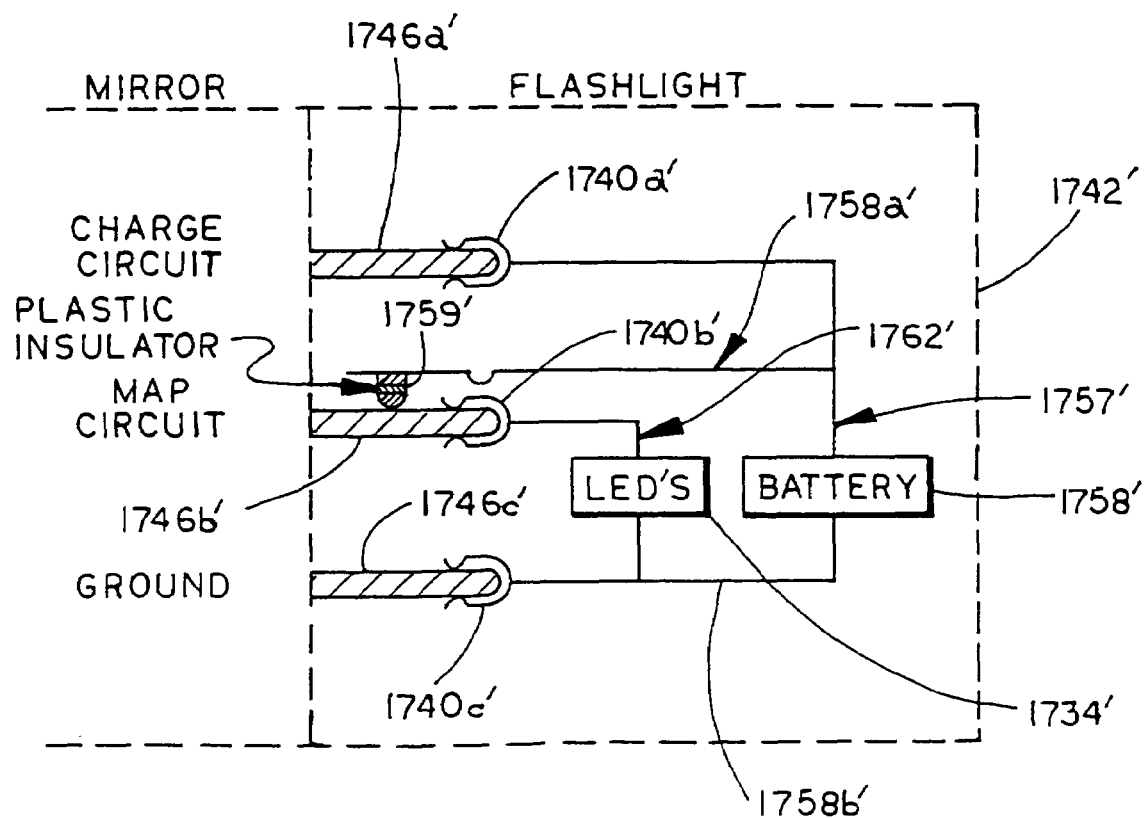
FIG. 39 is a schematic view of a second embodiment of the drive circuit for a switchless light module.

Referring to FIG. 39, a second embodiment 1742' of the light module drive circuit is illustrated. Light module drive circuit 1742' includes a power circuit 1757', which includes a voltage supply 1758', and a light source circuit 1762'. Power circuit 1757' and light source circuit 1762' are configured such that the light module 1715 comprises a switchless light module 1715 with the power circuit 1757' powering the light source circuit 1762' when light module 1715 is removed from casing 1712 and yet being disconnected from light source circuit 1762' when flashlight module 1715 is inserted into casing 1712. In the illustrated embodiment, the power circuit 1757' and light source circuit 1762' are electrically coupled via sockets 1740b' and 1740c' when socket 1740b' and 1740c' are decoupled from map circuit conductive pin 1746b' and ground conductive pin 1746'. In the illustrated embodiment, power circuit 1757' includes a spring loaded connection line 1758' which disengages from socket 1740b' when the light module is inserted into casing 1712 and sockets 1740b' and 1740c' engage the respective connector pins 1746b' and 1746c'. Spring loaded connection line 1758' includes a plastic insulator 1759', which engages pin 1746b' when light module 1715 is inserted into casing to disconnect power line 1758' from socket 1740b'. In addition, when module 1715 is docked, voltage 1758' is connected between ground pin 1746c' and charge circuit conductive pin 1746a' such that voltage supply 1758' can be recharged by the vehicle power supply. In this manner, when light module 1715 is inserted into mirror casing 1712, light sources 1734' are energized by the map light circuit and assume the logic of map light switch 1770. Reference is made to the previous embodiment of FIG. 38 for details of the map light circuit. In contrast, when light module 1715 is removed from mirror casing 1712, light sources 1734' are energized by voltage source 1758' of light module circuit 1742'. As will be understood, therefore, when light module 1715 is removed from casing, light sources 1734' remain in an activated state until the voltage supply is depleted or on until light module 1715 is returned to casing 1712 and, further, map light switch 1770 is moved to its "off" position.

Figure 40:
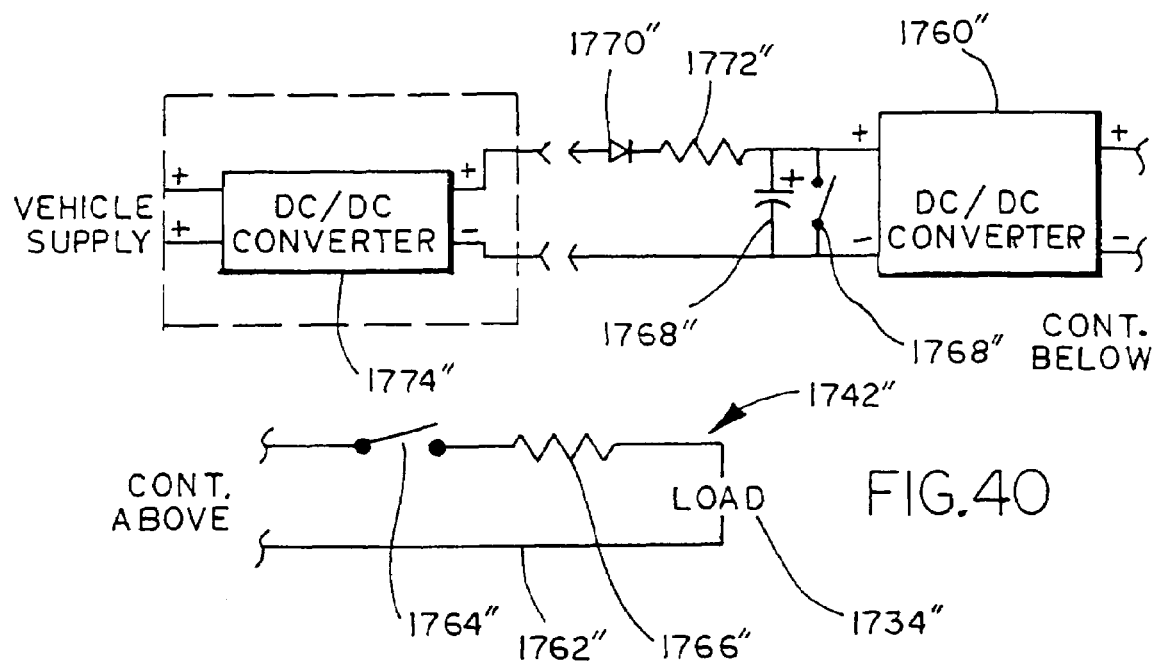
FIG. 40 is a third embodiment of a drive circuit for the light module of the present invention.

Referring to FIG. 40, a third embodiment of a light module drive circuit 1742" is illustrated. Circuit 1742" comprises a capacitor powered light module circuit and includes a capacitor 1758" and an AC/DC converter 1760", which controls the output voltage of capacitor 1758". Drive circuit 1742" also includes a light source circuit 1762" which includes an on/off switch 1764", a load current limiter resistor 1766" and light source(s) 1734" which are connected in series to AC/DC converter 1760". In addition, flashlight circuit 1742" preferably includes a safety switch 1768" across capacitor 1758" to discharge the capacitor 1758" in the event housing 1730 of light module 1715 is open. Preferably, circuit 1742" also includes a shock protection diode 1770" and a charge current limiter resistor 1772". Circuit 1742" is connected to the vehicle power supply via a second AC/DC converter 1744" and only requires two contacts—one to ground and the other to the vehicle power supply. In this manner, when dockable light module 1715 is docked in casing 1712, the vehicle power supply charges capacitor 1758". When light module 1715 is removed, capacitor 1758" is preferably sufficiently charged to provide sufficient voltage to power the circuit containing light source 1734" for at least about 5 minutes; more preferably for at least about 15 minutes; most preferably for at least about 30 minutes. Preferably, the power capacitor used is compact so as to readily fit into the detachable/dockable accessory such as a flashlight. Suitable power capacitors include the DZ series of high current capacitors available from ELNA America Inc of Cypress Calif. under the trade name "DYNACAP", such as DZ-2R5D1107, DZ-2R5D106 and DZ-2R5D105 capacitors. Preferably, capacitor 1758" has a capacitance in the range from about 0.2 Farad to about 120 Farad; more preferably, in the range from about 1 Farad to about 60 Farad; most preferably, in the range from about 5 Farad to about 40 Farad.

Figure 41:
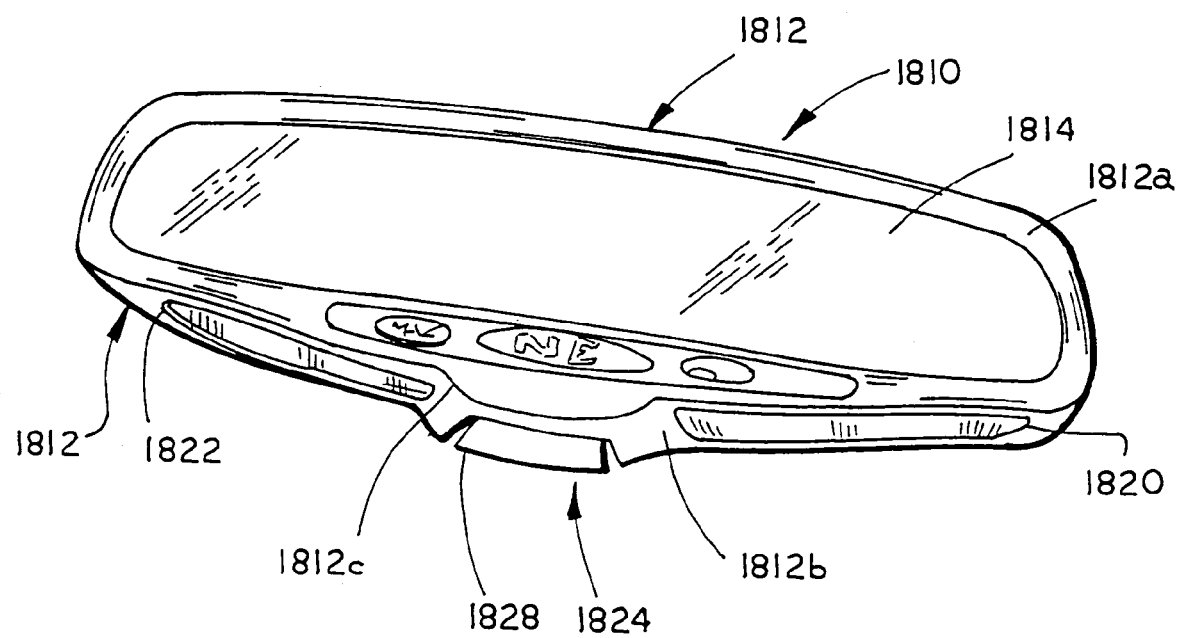
FIG. 41 is a perspective view of a nineteenth embodiment of the interior rearview mirror of the present invention.

Referring to FIG. 41, a nineteenth embodiment 1810 of the interior rearview mirror assembly of the present invention is illustrated. Mirror assembly 1810 includes a casing 1812 and a reflective element 1814 positioned in casing 1812 and preferably mounted to casing 1812 by a bezel or bezel portion 1812a. However, it should be appreciated, that reflective element 1814 may be supported in casing 1812 by a bracket or an actuator as is known in the art. In the illustrated embodiment, mirror assembly 1810 further includes a pendent accessory 1824 which is mounted to casing 1812 by a support 1826 and is mounted for pivotal movement between a stored position shown in FIG. 41 and an extended or viewing position shown in FIGS. 42. As best seen in FIG. 41, bottom wall 1812b of casing 1812 includes an enlarged chin area 1812c which forms a recess 1828 in which pendent accessory 1824 is moved when it is returned to its stored position. Bezel 1812a preferably extends over or follows enlarged chin area 1812c so that when pendent accessory 1824 is pivoted to its stored position, pendent accessory 1824 generally follows the contour and profile of casing 1812 to minimize distraction to the driver.

Figure 42:
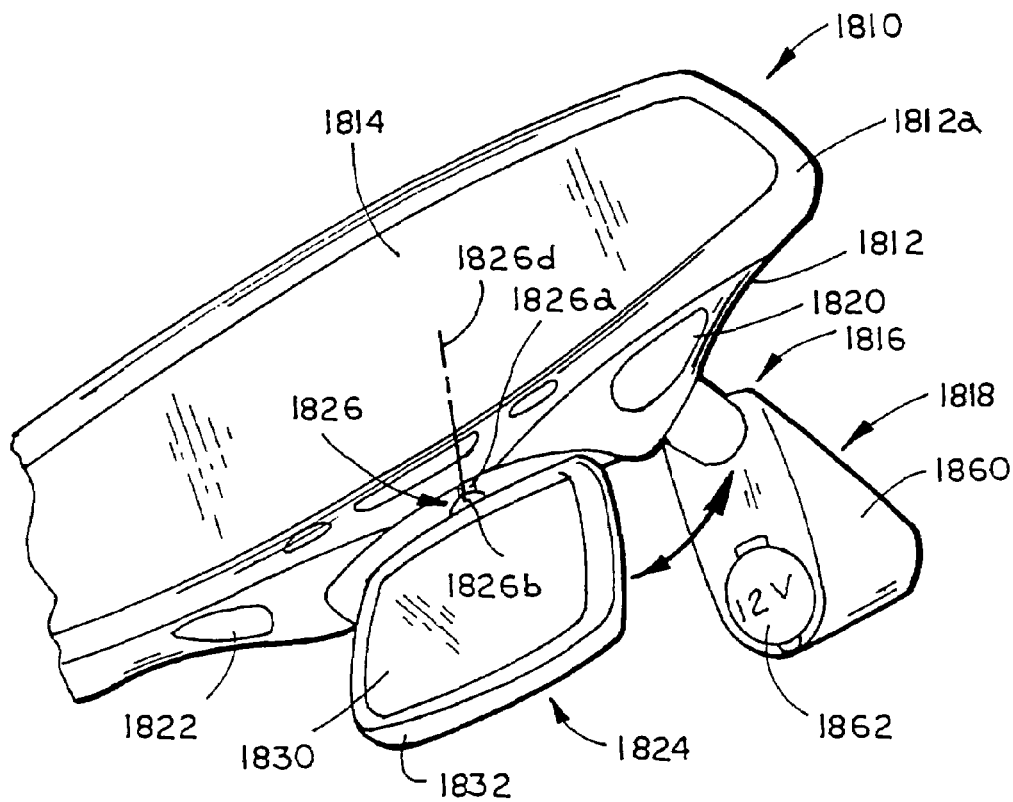
FIG. 42 is a bottom perspective view of the interior rearview mirror assembly of FIG. 41 illustrating a pendent accessory in an extended or viewing position.

As best seen in FIG. 42, pendent accessory 1824 includes a housing 1832 and a display element 1830, such as a reflective element or a screen element similar to pendent accessory 24; therefore, for further details of housing 1832 and element 1830, reference is made to the first embodiment. Referring to FIGS. 42 and 43A, support 1826 includes a shaft 1826a and a pair of ball members 1826b and 1826c with ball member 1826b extending into and being captured by a ball socket (not shown) provided in casing 1812 and ball member 1826c extending into and being captured by a ball socket 1829 (FIG. 43A) provided on housing 1828. Ball member 1826c pivotally couples housing 1832 to support 1826 and permits multi-axis positioning of housing 1832 and element 1830 about a generally vertical axis 1826d, which extends through shaft 1826, and horizontal axes which pass through ball member 1826c to permit adjustment of the viewing position of element 1830. Ball member 1826b permits housing 1832 and element 1830 to rotate about a generally vertical axis and pivot about horizontal axes which extends through ball member 1826b so that pendent accessory 1824 can be moved from its stored position to a large plurality of viewing orientations.

Referring to FIG. 43B, a second embodiment of a pendent accessory 1824' is illustrated. Pendent accessory 1824' is of similar construction to pendent accessory 1824 and includes a support 1826' which permits pendent accessory 1824' to pivot on first and second pins 1826c' and 1826d' about a generally vertical axis 1826a' and a generally horizontal axis 1826b'. Pin 1826d' is mounted to casing 1812 to permit pivoting of pendent accessory 1824' about axis 1826b' so that pendent accessory can be moved from its stored position to an extended position. Pin 1826c' is fixedly mounted to pin 1826d' such that accessory 1824' may be pivoted about axis 1826a' to adjust the viewing position of the pendent accessory once pendent accessory is pivoted about pin 1826d'. Support 1826' provides a user-friendly dual pivot mount which provides an easy check to determine whether accessory 1824' is properly aligned for returning to its retracted position in recess 1828 without much distraction, if any, to the driver. It can be appreciated, that when housing 1832' of accessory 1824' is aligned along pin 1826d', accessory 1824' can then be pivoted about pin 1826d' to its retracted position.

Optionally, interior rearview mirror assembly 1810 may include a pair of map light assemblies 1820 and 1822 which are mounted in a bottom wall 1812b of casing 1812. Reference is made to the previous embodiment for details of map light assemblies 1820 and 1822 and other accessories or devices which may be incorporated into assembly 1810. As best seen in FIG. 42, interior rearview mirror assembly includes a support 1816 and mounting bracket 1818, which in the illustrated embodiment mounts to a conventional windshield mounting button. It should be understood that support 1816 may be mounted to the header area of the vehicle, as is conventionally known. Mounting bracket 1818 includes enlarged body 1860, which is adapted to provide a break-away mounting to a conventional mirror mounting button. Enlarged body 1860 includes a socket that forms an adapter 1862, which is coupled to the vehicle operational voltage supply, for example a 12-volt or 42-volt battery. In the illustrated embodiment, adapter 1862 is mounted in a lower portion of body 1860, but it should be understood that adapter 1862 may be formed on a side portion of mounting bracket 1818. In order to ease insertion of a plug of an accessory into adapter 1862, adapter 1862 is angled to permit easy access by an occupant of the vehicle. It should be understood, that the angle of orientation of adapter 1862 depends on the angle of the windshield, when mounting bracket 1818 mounts to a windshield.

Figure 44:
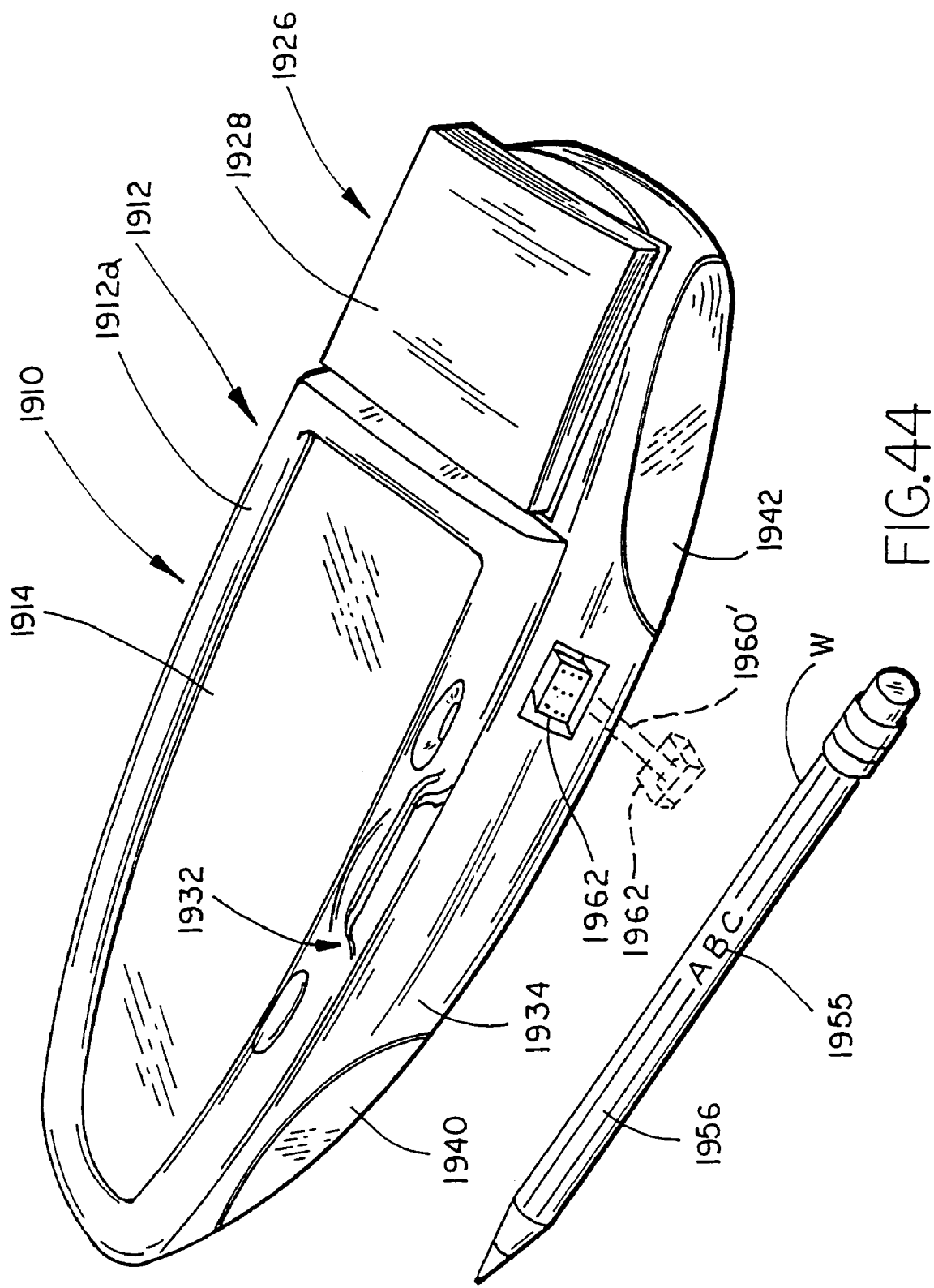
FIG. 44 is a twentieth embodiment of the interior rearview mirror assembly of the present invention incorporating a workpiece holder.

Referring to FIG. 44, a twentieth embodiment 1910 of the interior rearview mirror assembly of the present invention is illustrated. Interior rearview mirror assembly 1910 is similar to mirror assembly 510 illustrated in FIG. 20 and includes a mirror casing 1912 and a reflective element 1914 supported in casing by bezel 1912a. Casing 1912 includes a storage space 1926 for supporting a memo pad 1928 and, further includes a workpiece holder 1932 for holding a workpiece W such as a pencil, pen, tool, a PALM PILOT pen or the like. In the illustrated embodiment, workpiece holder 1932 is formed with or provided on bezel 1912a and is preferably molded with bezel 1912a. In this manner, the workpiece holder shape or size may be customized as desired and changed by simply replacing bezel 1912a. Similar to assembly 510, assembly 1910 optionally includes a map light assemblies 1940 and 1942 which are position in bottom wall 1934 of casing 1912. For further details of other optional components for assembly 1910, reference is made to the previous embodiments.

Referring to FIG. 45A, workpiece holder 1932 includes a pair of space apart opposed generally members 1933 and 1935. In preferred form, members 1933 and 1935 are adapted to receive and hold a plurality of workpieces with varying cross-sections. Members 1933 and 1935 comprise variable engagement elements which define therebetween variable engagement surfaces 1937a and 1937b, respectively, to accommodate the varying dimensions of the workpieces and preferably hold workpieces by friction. In the illustrated embodiment, variable engagement surfaces 1937a and 1937b are provided by graduated step surfaces 1939a and 1939b, respectively. In this manner, the lowermost surfaces 1939a' and 1939b' of step surfaces 1939a and 1939b form closer gripping surfaces than uppermost surfaces 1939a" and 1939b".

Optionally, workpiece holder 1932 may be molded from a more flexible material than bezel 1912a to provide more flexibility to members 1933 and 1935 and, therefore, generate spring-like forces in addition to the frictional forces. Alternately, workpiece holder 1932 may be formed from a flexible but relatively high friction material to provide enhanced frictional engagement and, depending on the material, to provide the spring like-action. For example, members 1933 and 1935 may be molded from an elastomeric polymer material, such as a thermoplastic rubber.

Referring to FIG. 45B, a second embodiment 2032 of the workpiece holder of the present invention is illustrated. Workpiece holder 2032 similarly includes a pair of opposed members 2033 and 2035 which are formed, such as by molding, with or provided on bezel 1912a. Positioned between opposed spaced apart members 2033 and 2035 is a resilient channel-shaped insert 2037 which similarly provides a variable engagement element with a variable engagement surface 2039 for engaging a variety of workpieces having varying dimensions and shapes. Preferably, insert 2037 comprises an elastomeric member, such as silicone, rubber, or the like, and, therefore, compresses to accommodate different workpiece dimensions.

As best seen in FIG. 45C, a third embodiment 2132 of the workpiece holder of the present invention is illustrated. Similar to the previous embodiments, workpiece holder 2132 includes a pair of opposed spaced apart generally members 2133 and 2135 which are similarly molded or provided on bezel 1912a of mirror assembly 1910. In order to accommodate a wide range of workpiece thicknesses, at least one member, such as member 2135, includes a pair of spaced apart flexible fingers 2137 which comprise variable engagement elements and provide variable engagement surfaces 2139 on their inwardly facing surfaces 2137a. Fingers 2137 apply a spring-like force to the workpiece to thereby hold the workpiece in holder 2132. In the illustrated embodiment, each finger 2137 includes a cam surface 2137b to ease insertion of a workpiece. Thus, when a workpiece is inserted between members 2133 and 2135, cam surfaces 2137b urge fingers 2137 outwardly. Alternately, both members 2133 and 2135 may include flexible fingers to accommodate and even greater range of workpiece sizes, limited only by the width and flexibility of members 2133 and 2135.

It can be appreciated from the foregoing, that the workpiece holder of the present invention preferably comprises a universal workpiece holder to permit a wide range and wide variety of workpieces to be supported by the interior rearview mirror assembly. Optionally, a workpiece, such as pen or pencil, may be personalized for a particular vehicle and, therefore, the workpiece holder may be similarly custom designed to hold the personalized pencil or pen. For example, a workpiece W (which typically is a writing instrument such as a pen) may include indicia 1955, for example a logo, the owner's name, the dealership name/logo, the automaker's name/logo, the vehicle name, or the like, as part of a business system. For example, the pen or pencil may be supplied with the vehicle when the vehicle is purchased and available as a spare part. For example, the workpiece may include a plurality of planar sides 1956 so that the workpiece will not roll when placed on a planar work surface in the vehicle and/or may include a tether. In addition, if the workpiece is misplaced or spent, a replacement workpiece may be available as a free replacement part provided as a courtesy by the dealership when the vehicle is serviced. In this manner, the workpiece forms a promotional item for the dealership and/or the vehicle.

Provision of such workpieces (pens, Swiss Army knives, ToolMan™ tool kits, a tire pressure gauge and the like) can help enhance promotion of the automaker image/brand and the dealership image/brand. It can also enhance customer loyalty/appreciation as, should the workpiece be lost, misplaced or used up (possible for the likes of a detachable pen), the dealer can elect to replace the missing workpiece free at the interior mirror assembly (optionally with a workpiece promoting that dealership's brand/logo) when the vehicle is brought in for service, thus promoting customer loyalty. Provision of a removable workpiece as disclosed herein, while preferable at the interior mirror assembly, is also possible at other locations within the vehicle cabin such as at an overhead console or at a floor console.

Also, since many interior mirror assemblies comprise a bezel that is formed (typically by molding) separate from the casing of the mirror assembly (and typically attached thereto during the mirror assembly operation by a snap-in or by a welding operation), it is optionally desirable to form the workpiece attachment element on the bezel during molding of the bezel, as this minimizes tooling cost and allows the same casing be used with bezels that have this utility feature and with bezels that do not have this utility feature.

Referring again to FIG. 44, interior rearview mirror assembly 1910 may also include a retractable cord 1960, for coupling an accessory, such as a phone, computer, or other electrical accessories to a vehicle system, such as a vehicle phone system, power source, or the like to provide a link between the accessory and the vehicle system. In order to minimize distraction to the driver, cord 1960 is preferably fully retractable into the housing so that when the cord is not in use, it can be returned to a storage space within the mirror assembly. Devices for retracting the cord include, for example, spring loaded reels and power rewinders. Cord 1960 preferably includes a coupler 1962, which couples the respective accessory to cord 1960 and hence to the vehicle phone or power system. It should be understood, that cord 1960 may incorporate electrical wires, and/or fiber optic cables, or the like, and, more preferably, comprises a universal serial bus cable (USB). Coupler 1962 may comprise a standard coupler, but one to which adapters may be mounted to accommodate different devices, and, more preferably, comprises a universal coupler which is adaptable to couple to a wide variety of accessories.

Alternately, cord 1960 may be partially retracted into casing 1912, with coupler 1962 stored, for example, in a recessed portion or on an external snap provided on bottom wall 1934 of casing 1912. In addition, cord 1960 may, for example, permit a cell phone to couple to the vehicle antenna, with the cell phone preferably wired such that the antenna of the cell phone is disconnected once the cell phone is connected to the cable 1960 thereby removing the antenna to the exterior of the vehicle.

It can be appreciated, that retractable cord 1960 may be similarly mounted to the mounting member of the mirror casing or to a pod which is similarly mounted to the mirror casing or mounting member. Thus, the retractable cord is located at the window assembly for easy access by the driver of the vehicle.

Figure 37:
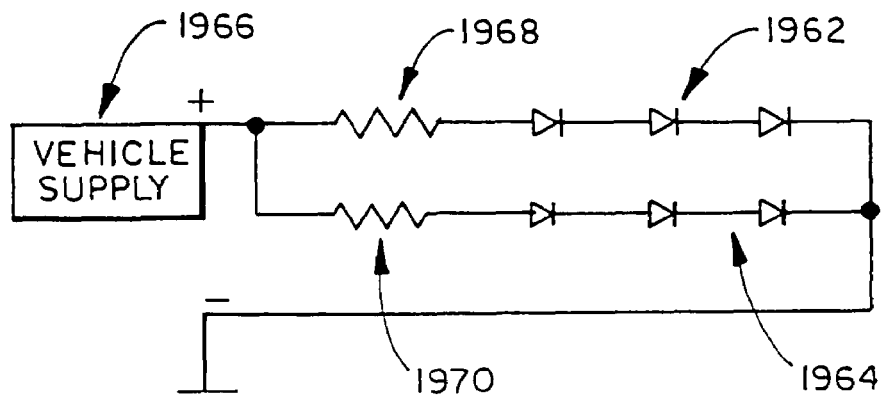
FIG. 37 is a schematic view of a drive circuit for a fixed position map light assembly of the interior rearview mirror assembly of FIGS. 34-36.

In further aspects, interior rearview mirror assembly 1910 includes a pair of map light assemblies 1940 and 1942 which include light emitting diode light sources. Preferably, each light assembly 1940, 1942 has greater than two LEDs per light assembly, more preferably, greater than four LEDs per light assembly and, most preferably, greater than six LEDs per light assembly, with at least one of the light emitting diodes emitting white light and, more preferably, each of the light emitting diodes emitting white light, such as is available from Nichia. Similar to the previous embodiment, light assemblies 1940 and 1942 preferably generate a minimum illumination intensity of about 10 lux, more preferably about 30 lux, and most preferably a minimum of about 60 lux at a distance of about 25 inches from the mirror assembly. When a plurality of light emitting diodes are incorporated, they are preferably incorporated in series such that the light emitting diodes may be powered by the vehicle power supply system, which is typically 12 volts. For example, where light emitting diodes having a forward voltage of about 4-volts are used, the LEDs may be arranged such as shown in FIG. 37. As best seen in FIG. 37, two sets 1962 and 1964 of three series LEDs are connected in parallel to the vehicle operation voltage supply 1966. In preferred form, each series of LEDs 1962, 1964 includes a circuit limiting resistor 1968, 1970, respectively, to protect the LEDs from over-voltage. Similarly, where LEDs having forward voltage drops of about 6 volts are used, three sets of two LEDs in series may be used to provide a total voltage drop of about 12-volts while still maintaining the desired number of LEDs. Similarly, where LEDs are used which have a forward voltage drop of about 2-volts, a series of six LEDs could be used which would have a total voltage drop of about 12-volts. One advantage of the LEDs coupled in series is that it takes less of a resistor to control the LEDs. As noted previously, when the LEDs are powered directly from the vehicle voltage supply, the light circuitry preferably includes a regulator circuit, such as a series resistor or voltage controlling circuit, such as a series voltage regulator. It should be understood that the number of LEDs and the type of LEDs may be mixed to achieve the desired combination of voltage drop and illuminescence.

The present invention provides a cavity or pocket created in the mirror housing or case such as by molding. This cavity or pocket provides a storage compartment for accessories, such as sunglasses, coins, parking tokens, a tape dispenser, tissue or wipe dispensers, and the like. Thus, for example, the driver on exiting the vehicle can take off a pair of sunglasses and readily and conveniently store them by placing them into the pocket storage compartment in the interior mirror casing, where the accessory is supported or stored. By locating the storage space on or in the interior mirror assembly, a high mounted storage location is provided which is away from children or pets in the car and further, may also provide a storage location that is not readily visible from outside the vehicle, therefore, enhancing the vehicle security. Also, the present invention provides storage space on or within the mirror assembly that may be open storage insofar that no door hatch or latch is provided or required, an example of which is illustrated in FIGS. 9-16 and 19-24, or may be closed storage, accessible such as by a door, hatch, latch, slider, telescoping support or the like, such as illustrated in FIGS. 1-8 and 17-18. Further, storage space is provided on the exterior of the mirror casing (or optionally, elsewhere on the rearview mirror assembly such as on the mirror support arm or on the mirror mount) for objects such as writing instruments such as pens, pencils and the like. The driver or passenger can releasably attach, for example, a pencil to the clip provided on the mirror casing. This provides a location in the vehicle interior cabin where the driver or passengers can readily find a pencil or the like.

As would be understood by those skilled in the art, modifications can be made to the various components of the several embodiments described above without departure from the spirit of the present invention. For example, the mirror casing may include an elongated recess extending into the casing which provides storage space for a tool, such as a pressure gauge or screw driver or pocket knife, or workpiece, such as a writing instrument or light pen. The storage space may comprise an open storage space in which articles are quickly insertable to or retractable from the storage space or a closed storage space, such as described in reference to mirror assembly 310, which is accessed through a door or hatch. The storage space may comprise an attachment member such as a clip for releasably retaining a writing instrument such as a pen, or the like, to the rearview mirror assembly such as to the mirror case, to the mirror bracket/mount or to the mirror support arm. The present invention provides one or more storage spaces for storing articles or accessories and is applicable to a wide variety of interior rearview mirrors including electrically operated compass mirrors such as disclosed in U.S. Pat. No. 5,253,109, electrically operated interior rearview mirrors incorporating map reading lights such as disclosed in U.S. Pat. Nos. 4,646,210; 4,733,336; 4,807,096; and 5,178,448; and electrically operated automatically dimming mirrors such as described in U.S. Pat. Nos. 4,793,690; 4,799,768; 4,886,960; and 5,193,029, mirror assemblies incorporating GPS such as disclosed in U.S. patent application Ser. No. 08/569,851, filed Dec. 8, 1995, by Roger L. Veldman and Desmond O'Farrell, entitled A VEHICLE GLOBAL POSITIONING SYSTEM NAVIGATIONAL AID, now U.S. Pat. No. 5,971,552; mirrors including head light controls, such as disclosed in U.S.

patent application Ser. No. 08/621,863, filed Mar. 25, 1996, entitled VEHICLE HEADLIGHT CONTROL USING IMAGING SENSOR, now U.S. Pat. No. 5,796,094; mirrors incorporating displays, such as disclosed in U.S. patent application Ser. No. 09/244,726, filed Feb. 5, 1999, entitled REARVIEW MIRROR ASSEMBLY INCORPORATING VEHICLE INFORMATION DISPLAY, now U.S. Pat. No. 6,172,613, and U.S. Pat. No. 5,530,240, entitled DISPLAY FOR AUTOMATIC REARVIEW MIRROR; mirrors incorporating blind spot detection systems, such as disclosed in U.S. Pat. No. 5,530,240; U.S. Pat. No. 5,576,687; and U.S. patent application Ser. No. 08/799,734, entitled VEHICLE BLIND SPOT DETECTION AND DISPLAY SYSTEM, filed Feb. 12, 1997, now U.S. Pat. No. 5,786,772; and mirrors incorporating remote frame action systems, such as disclosed in U.S. patent application Ser. No. 09/057,428, filed Apr. 8, 1998, entitled A VEHICLE MOUNTED REMOTE TRANSACTION INTERFACE SYSTEM, now U.S. Pat. No. 6,158,655; and U.S. Pat. No. 5,798,575; all commonly assigned to Donnelly Corporation, Holland Mich., and the disclosures of which are herein incorporated by reference in their entireties. In addition, the third logic line included in the circuits described in reference to FIGS. 38 and 39 may be incorporated into other dockable accessories. Furthermore, modification may include using the windshield mounting bracket, header mounting bracket, a pod or the like as a source for the various storage spaces. In other modifications, the dockable assemblies, such as cellular phones, lights, pagers, or the like described herein may be built-in to the mirror assembly, for example in the mirror casing, mounting member or in a pod. In which case, the mirror assembly preferably incorporates a digital sound processing system to eliminate noise as previously described. Changes and modifications in the specifically described embodiments can be carried out without departing from the principles of the invention, which is intended to be limited only by the scope of the appended claims, as interpreted according to the principles of patent law.

We claim:

1. An interior rearview mirror assembly for a vehicle, said mirror assembly comprising:
    a housing, a mirror reflective element disposed in said housing and a support for adjustably mounting said housing to an interior portion of a vehicle, said mirror reflective element providing a rearward field of view to a driver of the vehicle when said mirror assembly is mounted to the interior portion of the vehicle, said housing being adjustable relative to the interior portion of the vehicle to adjust the rearward field of view of said mirror reflective element to provide the driver with a driver-desired rearward field of view generally rearward and through a rear window of the vehicle;
    a retractable cord, said retractable cord for use by an occupant of the vehicle for coupling to an accessory, said retractable cord being adapted to couple the accessory to a vehicle system to provide a link between the accessory and the vehicle system; and
    wherein said retractable cord is extendable and retractable between an extended state, where a user of said mirror assembly pulls said retractable cord at least partially outward from said housing for coupling to the accessory, and a retracted state, where said retractable cord is retracted at least substantially into said housing.

2. The interior rearview mirror assembly for a vehicle according to claim 1, wherein said retractable cord includes a coupler for coupling to the accessory.

3. The interior rearview mirror assembly for a vehicle according to claim 2, wherein said housing includes a storage space, said retractable cord retractable into and extendable from said storage space.

4. The interior rearview mirror assembly for a vehicle according to claim 3, wherein said storage space comprises a first storage space, said housing including a recessed portion, said recessed portion defining a second storage space for said coupler, at least a portion of said retractable cord being retractable into said first storage space.

5. The interior rearview mirror assembly for a vehicle according to claim 4, wherein said second storage space includes a holder for said coupler when said portion of said retractable cord is retracted to said first storage space.

6. The interior rearview mirror assembly for a vehicle according to claim 3, wherein said housing includes said storage space.

7. The interior rearview mirror assembly for a vehicle according to claim 6, wherein said housing includes a bottom wall, said storage space provided at said bottom wall.

8. The interior rearview mirror assembly for a vehicle according to claim 6, wherein said storage space extends into said housing behind said reflective element.

9. The interior rearview mirror assembly for a vehicle according to claim 1, wherein said retractable cord includes at least one electrical wire.

10. The interior rearview mirror assembly for a vehicle according to claim 1, said housing further including a workpiece holder for storing a workpiece in a location accessible by an occupant of the vehicle whereby the workpiece can be inserted into or removed from said workpiece holder for use by the occupant of the vehicle.

11. The interior rearview mirror assembly for a vehicle according to claim 10, wherein said workpiece holder includes a variable engagement element for engaging the workpiece whereby said workpiece holder can hold a plurality of workpieces having varying dimensions.

12. An interior rearview mirror assembly for a vehicle, said mirror assembly comprising:
    a housing, a mirror reflective element and a support for adjustably mounting said housing to an interior portion of a vehicle, said mirror reflective element providing a rearward field of view to a driver of the vehicle when said mirror assembly is mounted to the interior portion of the vehicle, said housing being adjustable relative to the interior portion of the vehicle to adjust the rearward field of view of said mirror reflective element to provide the driver with a driver-desired rearward field of view generally rearward and through a rear window of the vehicle;
    a retractable cord, said retractable cord for use by an occupant of the vehicle for coupling to an accessory, said retractable cord being at least partially retractable into said housing and further being adapted to couple the accessory to a vehicle system to provide a link between the accessory and the vehicle system; and
    wherein said retractable cord is extendable and retractable between an extended state, where a user of said mirror assembly pulls said retractable cord at least partially outward from said housing for coupling to the accessory, and a retracted state, where said retractable cord is retracted at least substantially into said housing.

13. The interior rearview mirror assembly for a vehicle according to claim 12, wherein said housing includes a recessed portion, said retractable cord being at least partially retractable into said recessed portion.

14. The interior rearview mirror assembly for a vehicle according to claim 13, wherein said cord includes a coupler for coupling to the accessory.

15. The interior rearview mirror assembly for a vehicle according to claim 14, wherein said coupler is at least partially retractable into said recessed portion.

16. The interior rearview mirror assembly for a vehicle according to claim 15, wherein said mirror housing includes a bottom wall, said recessed portion provided in said bottom wall.

17. The interior rearview mirror assembly for a vehicle according to claim 14, wherein said coupler comprises a universal coupler.

18. The interior rearview mirror assembly for a vehicle according to claim 12, wherein said housing further includes a workpiece holder for storing a workpiece in a location accessible by an occupant of the vehicle whereby the workpiece can be inserted into or removed from said workpiece holder for use by the occupant of the vehicle.

19. An interior rearview mirror assembly system for a vehicle, said mirror assembly system comprising:
an interior rearview mirror assembly adapted for supporting one chosen from a notepad and a workpiece, said interior rearview mirror assembly comprising a housing, a mirror reflective element and a support for adjustably mounting said housing to a vehicle, said mirror reflective element providing a rearward field of view to a driver of the vehicle when said mirror assembly is mounted to the interior portion of the vehicle, said housing being adjustable relative to the interior portion of the vehicle to adjust the rearward field of view of said mirror reflective element to provide the driver with a driver-desired rearview field of view generally rearward and through a rear window of the vehicle;
a retractable cord, said retractable cord for use by an occupant of the vehicle for coupling to an accessory, said retractable cord being at least partially retractable into said interior rearview mirror assembly and further being adapted to couple the accessory to a vehicle system to provide a link between the accessory and the vehicle system; and
wherein said retractable cord is extendable and retractable between an extended state, where a user of said mirror assembly pulls said retractable cord at least partially outward from said housing for coupling to the accessory, and a retracted state, where said retractable cord is retracted at least substantially into said housing.

20. The interior rearview mirror assembly system according to claim 19, wherein said one chosen from a note pad and a workpiece is located generally adjacent said reflective element.

21. The interior rearview mirror assembly system according to claim 20, wherein said housing is adapted to support said one chosen from a notepad and a workpiece.

22. The interior rearview mirror assembly system according to claim 21, wherein said housing includes a storage space generally adjacent said reflective element for supporting a notepad.

23. An interior rearview mirror assembly for a vehicle, said mirror assembly comprising:
a housing, a mirror reflective element and a support for mounting said housing to a vehicle; and
a retractable cord, said retractable cord for use by an occupant of the vehicle for coupling to an accessory, said retractable cord being adapted to couple the accessory to a vehicle system via said housing to provide a link between the accessory and the vehicle system, wherein said retractable cord includes a coupler that is adapted for coupling to the accessory, the accessory comprising one of a phone, a computer, and fax machine.

24. An interior rearview mirror assembly for a vehicle, said mirror assembly comprising:
a housing, a mirror reflective element and a support for mounting said housing to a vehicle; and
a retractable cord, said retractable cord for use by an occupant of the vehicle for coupling to an accessory, said retractable cord being adapted to couple the accessory to a vehicle system via said housing to provide a link between the accessory and the vehicle system, wherein said retractable cord includes at least one fiber-optic cable.

25. An interior rearview mirror assembly for a vehicle, said mirror assembly comprising:
a housing, a mirror reflective element and a support for mounting said housing to a vehicle; and
a retractable cord, said retractable cord for use by an occupant of the vehicle for coupling to an accessory, said retractable cord being adapted to couple the accessory to a vehicle system via said housing to provide a link between the accessory and the vehicle system, wherein said retractable cord comprises a universal serial bus cable.

26. An interior rearview mirror assembly for a vehicle, said mirror assembly comprising:
a housing, a mirror reflective element and a support for mounting said housing to a vehicle; and
a retractable cord, said retractable cord for use by an occupant of the vehicle for coupling to an accessory, said retractable cord being at least partially retractable into said housing and further being adapted to couple the accessory to a vehicle system via said housing to provide a link between the accessory and the vehicle system, wherein said housing includes a recessed portion, said retractable cord being at least partially retractable into said recessed portion, and wherein said retractable cord includes a coupler that is adapted for coupling to the accessory, the accessory comprising one of a phone, a computer, and fax machine.

27. An interior rearview mirror assembly system for a vehicle, said mirror assembly system comprising:
an interior rearview mirror assembly adapted for supporting one chosen from a notepad and a workpiece; and
a retractable cord, said retractable cord for use by an occupant of the vehicle for coupling to an accessory, said retractable cord being at least partially retractable into said interior rearview mirror assembly and further being adapted to couple the accessory to a vehicle system via said interior rearview mirror assembly to provide a link between the accessory and the vehicle system, wherein said cord is adapted to couple to a vehicle antenna such that when a phone is coupled to said cord, said cord couples the phone to the antenna.

* * * * *

UNITED STATES PATENT AND TRADEMARK OFFICE
CERTIFICATE OF CORRECTION

PATENT NO. : 7,293,888 B2  Page 1 of 1
APPLICATION NO. : 11/145253
DATED : November 13, 2007
INVENTOR(S) : Hutzel et al.

It is certified that error appears in the above-identified patent and that said Letters Patent is hereby corrected as shown below:

Column 54
Line 50, "Tumbull" should read --Turnbull--

Column 67
Claim 19, Line 33, "rearview" should be --rearward--

Signed and Sealed this

Sixth Day of January, 2009

JON W. DUDAS
*Director of the United States Patent and Trademark Office*